(12) United States Patent
Li et al.

(10) Patent No.: US 11,074,041 B2
(45) Date of Patent: Jul. 27, 2021

(54) METHOD AND SYSTEM FOR ELASTIC PRECISION ENHANCEMENT USING DYNAMIC SHIFTING IN NEURAL NETWORKS

(71) Applicant: NOVUMIND LIMITED, Grand Cayman (KY)

(72) Inventors: Miao Li, Hayward, CA (US); Pingfan Meng, Dublin, CA (US); Yilei Li, Fremont, CA (US); Cheng-Ying Ko, Cupertino, CA (US); Jeffrey Weifung Lien, San Jose, CA (US)

(73) Assignee: NOVUMIND LIMITED, Grand Cayman (KY)

( * ) Notice: Subject to any disclaimer, the term of this patent is extended or adjusted under 35 U.S.C. 154(b) by 264 days.

(21) Appl. No.: 16/521,576

(22) Filed: Jul. 24, 2019

(65) Prior Publication Data

US 2020/0050429 A1 Feb. 13, 2020

Related U.S. Application Data

(60) Provisional application No. 62/715,758, filed on Aug. 7, 2018.

(51) Int. Cl.

| *G06F 5/01* | (2006.01) |
|---|---|
| *G06N 3/04* | (2006.01) |
| *G06F 7/556* | (2006.01) |
| *G06F 7/48* | (2006.01) |

(52) U.S. Cl.
CPC ............ *G06F 5/012* (2013.01); *G06F 7/4812* (2013.01); *G06F 7/556* (2013.01); *G06N 3/04* (2013.01)

(58) Field of Classification Search
CPC .......... G06F 5/012; G06F 7/4812; G06F 7/55; G06N 3/04
See application file for complete search history.

(56) References Cited

U.S. PATENT DOCUMENTS

| 5,774,133 A | * | 6/1998 | Neave | ..................... G06T 17/00 345/441 |
|---|---|---|---|---|
| 5,999,189 A | * | 12/1999 | Kajiya | .................. G06T 11/001 382/232 |
| 8,880,571 B2 | * | 11/2014 | Srinivasan | ........... H04N 1/6027 708/200 |
| 2018/0157961 A1 | * | 6/2018 | Henry | ..................... G06N 3/04 |
| 2019/0258921 A1 | * | 8/2019 | Lie | ....................... G06N 3/0472 |

* cited by examiner

*Primary Examiner* — Michael D. Yaary
(74) *Attorney, Agent, or Firm* — Rui Wu

(57) ABSTRACT

A multiplier for calculating a multiplication of a first fixed point number and a second fixed point number comprises a converter and a restoration circuit. The converter is configured to convert the first fixed point number to a sign, a mantissa, and an exponent. At least one of a bit width of the sign, a bit width of the mantissa, and a bit width of the exponent is dynamically configured based on a position of a layer associated with the first fixed point number in a neural network, a position of a pixel in an input feature map associated with the first fixed point number, and/or a channel associated with the first fixed point number. The restoration circuit is configured to calculate the multiplication based on the sign, the mantissa, the exponent, and the second fixed point number.

20 Claims, 28 Drawing Sheets

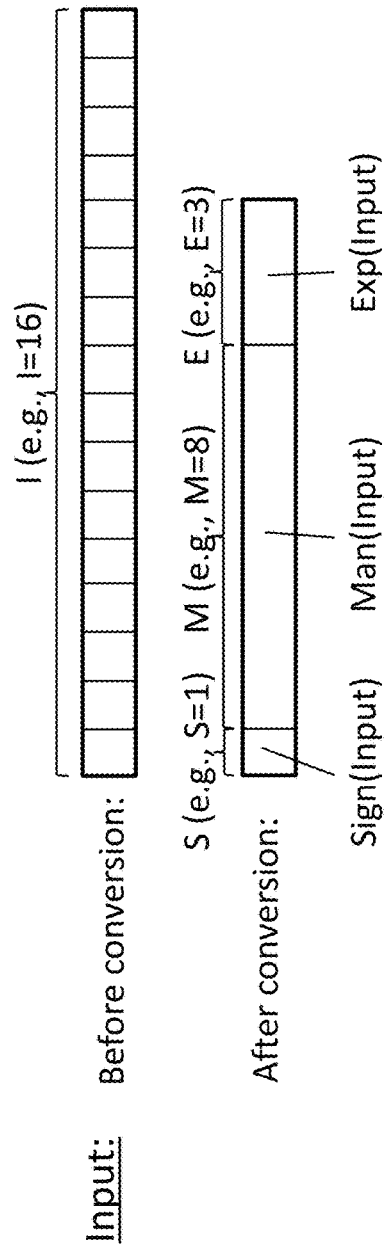
FIG. 6
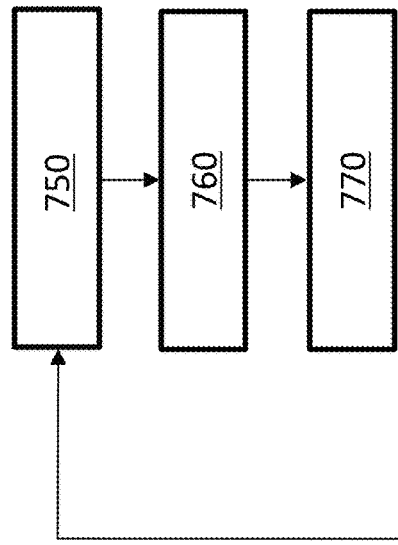
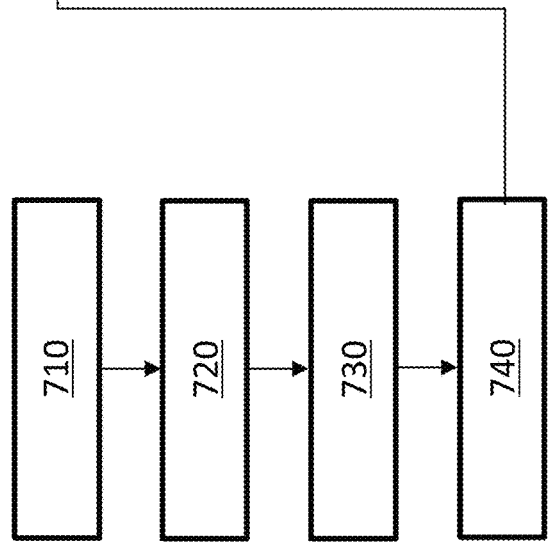
FIG. 7

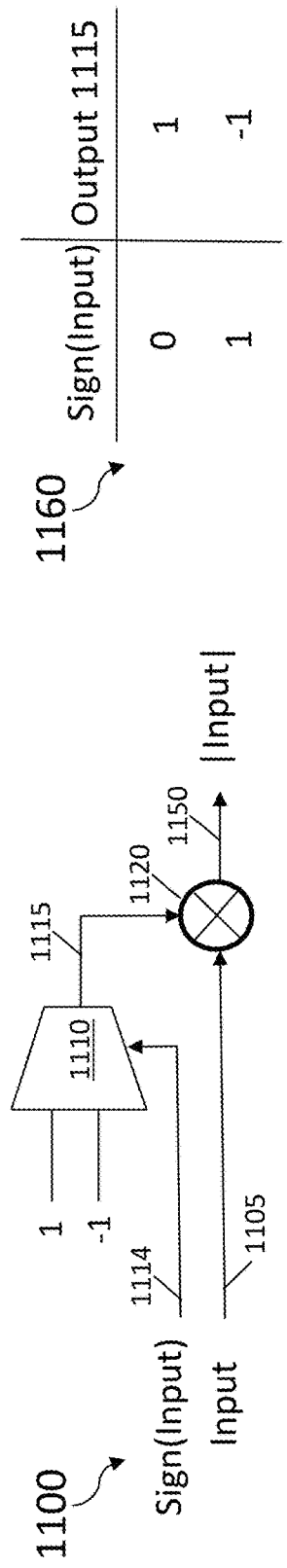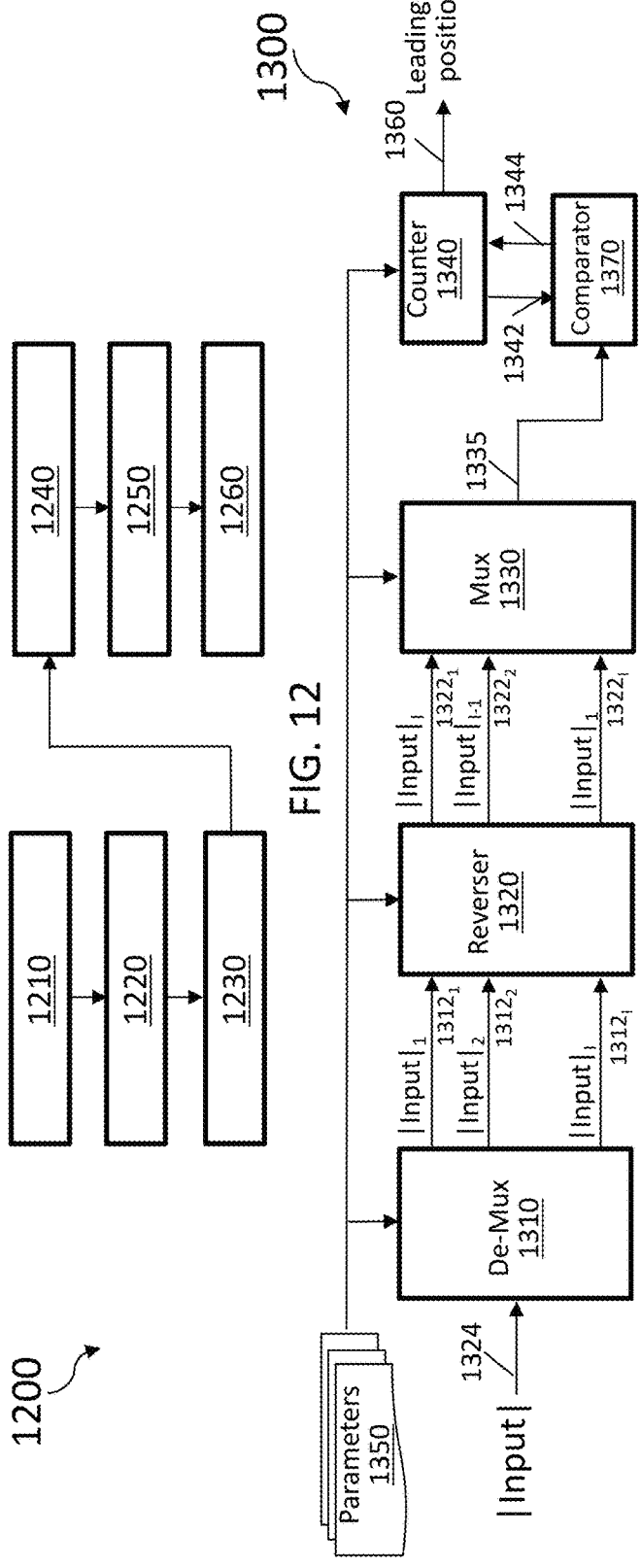
FIG. 11A
FIG. 11B
FIG. 12
FIG. 13

| \|Input\|$_{16-1}$ | Leading-1 Position |
|---|---|
| 0000000000000000 | 0000 |
| 0000000000000001 | 0001 |
| 000000000000001x | 0010 |
| 00000000000001xx | 0011 |
| 0000000000001xxx | 0100 |
| 000000000001xxxx | 0101 |
| 00000000001xxxxx | 0110 |
| 0000000001xxxxxx | 0111 |
| 000000001xxxxxxx | 1000 |
| 00000001xxxxxxxx | 1001 |
| 0000001xxxxxxxxx | 1010 |
| 000001xxxxxxxxxx | 1011 |
| 00001xxxxxxxxxxx | 1100 |
| 0001xxxxxxxxxxxx | 1101 |
| 001xxxxxxxxxxxxx | 1110 |
| 01xxxxxxxxxxxxxx | 1111 |

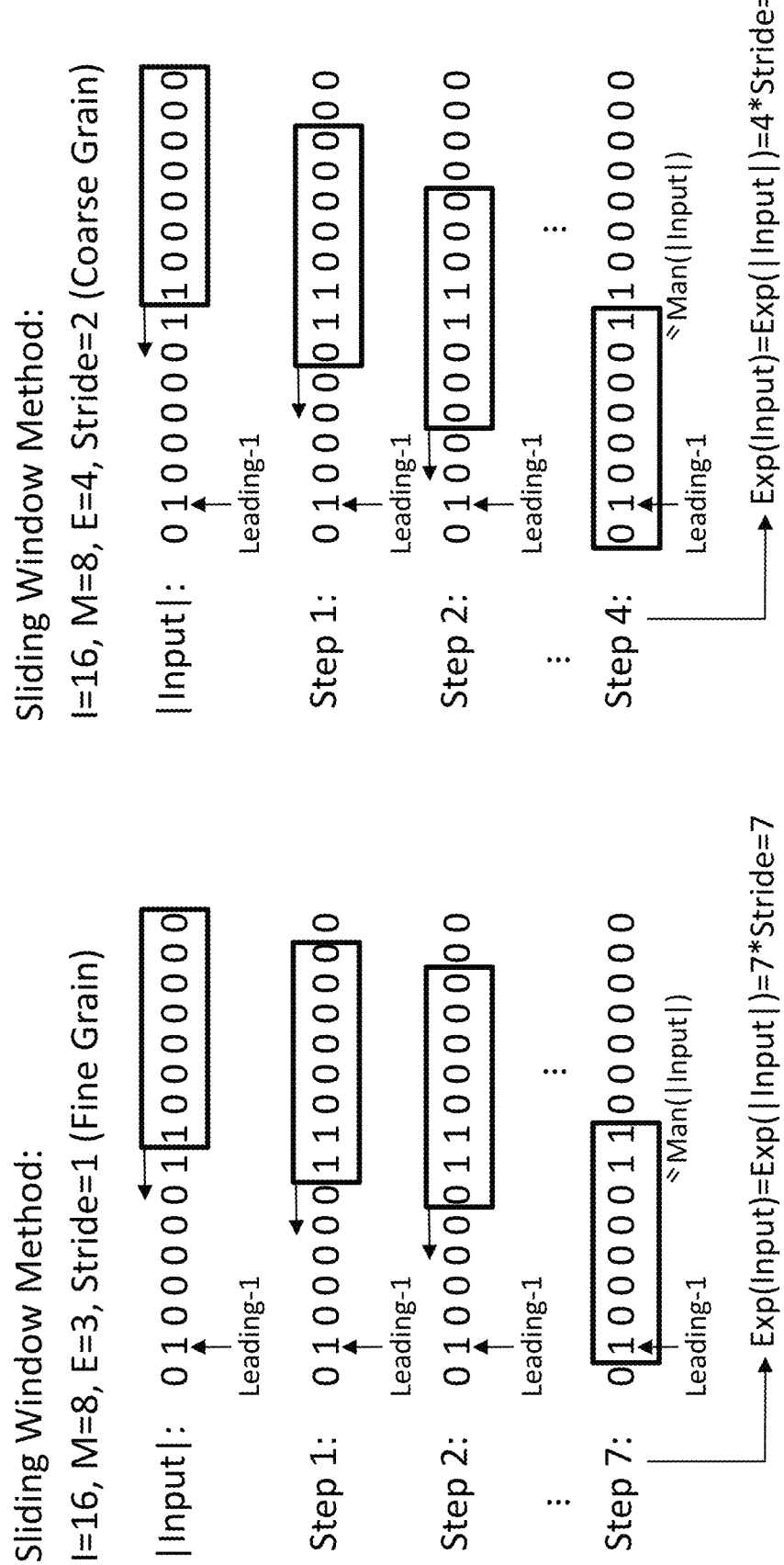

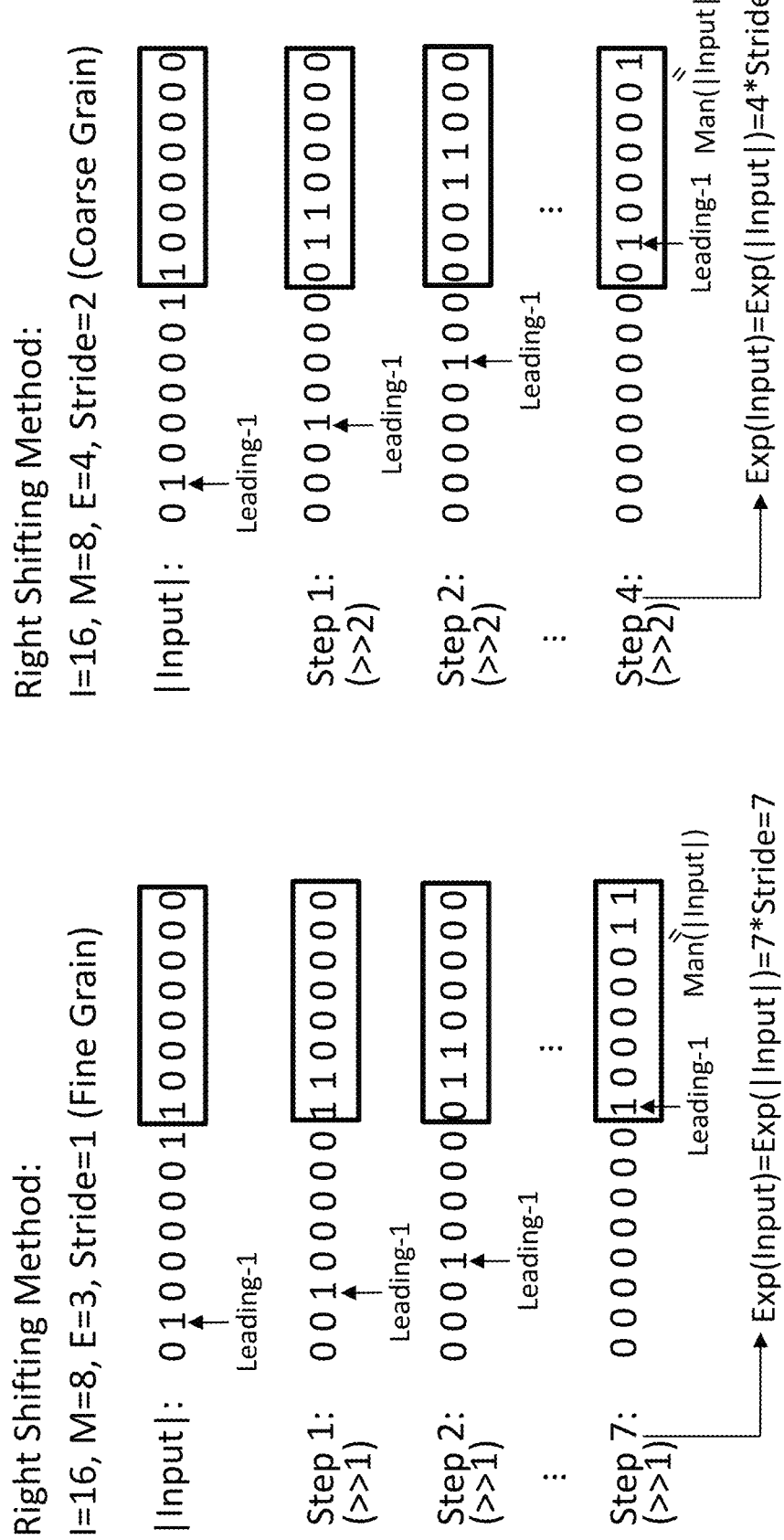

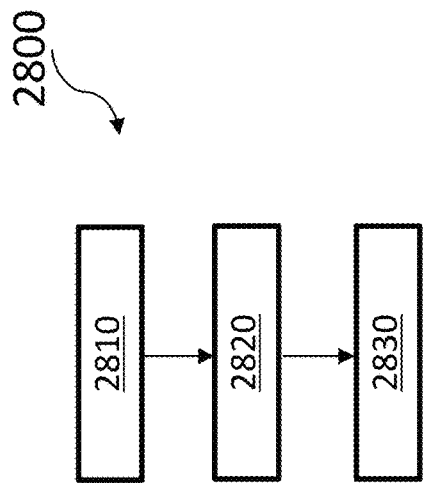
FIG. 27
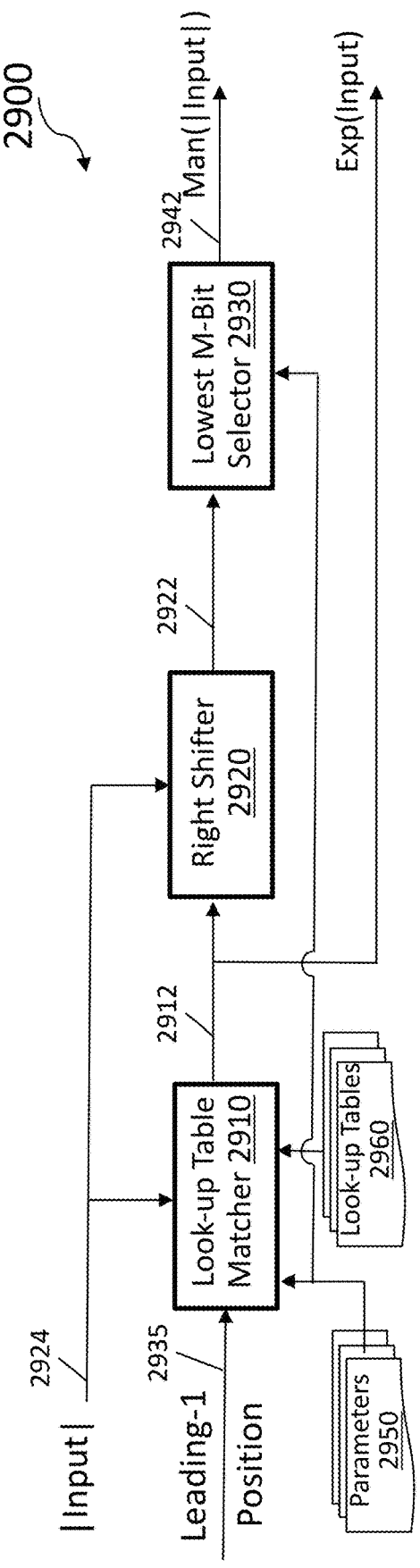
FIG. 28
FIG. 29

Look-up table method: Stride=1 — 3000

| |Input|₁₆₋₉ | Leading-1 Position | Exp | Rep |
|---|---|---|---|
| 00000000 | <1001 | 000 | 000 |
| 00000001 | 1001 | 001 | 001 |
| 0000001x | 1010 | 010 | 010 |
| 000001xx | 1011 | 011 | 011 |
| 00001xxx | 1100 | 100 | 100 |
| 0001xxxx | 1101 | 101 | 101 |
| 001xxxxx | 1110 | 110 | 110 |
| 01xxxxxx | 1111 | 111 | 111 |

Look-up table method: Stride=2 — 3100

| |Input|₁₆₋₉ | Leading-1 Position | Exp | Rep |
|---|---|---|---|
| 00000000 | <1001 | 0000 | - |
| 00000001 | 1001 | 0010 | 00 |
| 0000001x | 1010 | 0010 | 00 |
| 000001xx | 1011 | 0100 | 01 |
| 00001xxx | 1100 | 0100 | 01 |
| 0001xxxx | 1101 | 0110 | 10 |
| 001xxxxx | 1110 | 0110 | 10 |
| 01xxxxxx | 1111 | 1000 | 11 |

Look-up table method: Stride=4 — 3200

| |Input|₁₆₋₉ | Leading-1 Position | Exp | Rep |
|---|---|---|---|
| 00000000 | <1001 | 0000 | - |
| 00000001 | 1001 | 0100 | 0 |
| 0000001x | 1010 | 0100 | 0 |
| 000001xx | 1011 | 0100 | 0 |
| 00001xxx | 1100 | 0100 | 0 |
| 0001xxxx | 1101 | 1000 | 1 |
| 001xxxxx | 1110 | 1000 | 1 |
| 01xxxxxx | 1111 | 1000 | 1 |

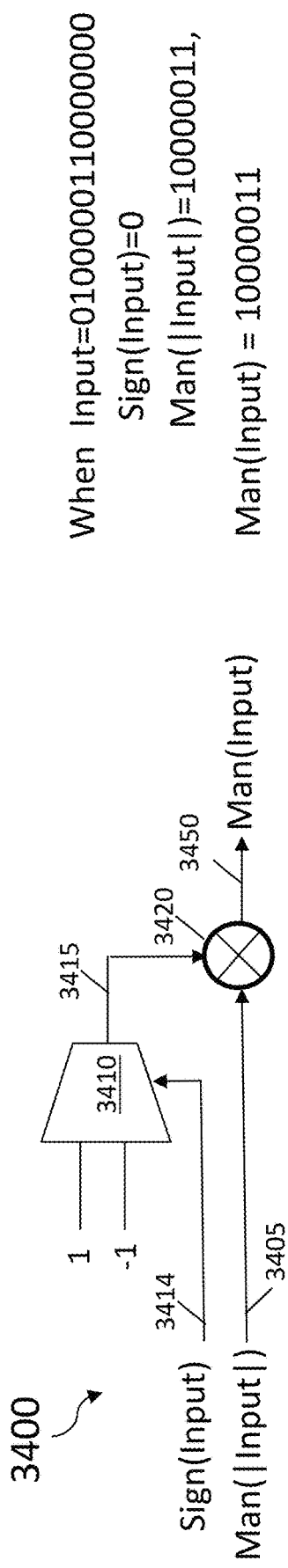
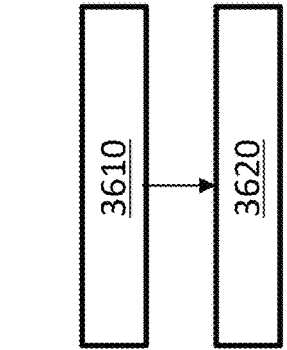
FIG. 35A
FIG. 35B
FIG. 34
FIG. 36

METHOD AND SYSTEM FOR ELASTIC PRECISION ENHANCEMENT USING DYNAMIC SHIFTING IN NEURAL NETWORKS

CROSS REFERENCE TO RELATED APPLICATION

This application claims the benefit of U.S. Provisional Application No. 62/715,758, filed on Aug. 7, 2018, entitled "Elastic Precision Enhancement Using Dynamic Shifting in Deep Learning Neural Networks," which application is hereby incorporated herein by reference.

BACKGROUND

1. Field of the Invention

This disclosure relates generally to method and apparatus for performing multiplication of two fixed point numbers from a neural network.

2. Description of Related Art

Machine learning techniques using neural networks, including without limitation deep neural networks or convolutional neural networks, have gained increased importance in applications related to analyzing a large amount of data, such as object recognition applications and speech recognition applications. The performance of the machine learning techniques is limited at least in part by the effectiveness and efficiency of performing multiplications of fixed point numbers, particularly those with long bit-widths in a processing element of a chip. This is because multiplications of long bit-width fixed point numbers normally result in high power consumption, high hardware cost, and a requirement of a large area for the processing element in an integrated circuit.

Thus, there is a need for effective and efficient approaches to perform multiplications of fixed point numbers from a neural network, for example, a convolutional neural network.

SUMMARY

The present disclosure overcomes the limitations of the prior art by providing a multiplier for calculating a multiplication of a first fixed point number and a second fixed point number. In an embodiment, both the first fixed point number and the second fixed point number have long bit-widths. Accordingly, the multiplier is also referred to as a long bit-width multiplier.

In an embodiment, the first fixed point number is associated with a pixel of an input feature map corresponding to one of a plurality of channels with respect to a layer of a neural network having a plurality of layers. The second fixed point number is associated with a filter corresponding to the one of the plurality of channels with respect to the layer of the neural network. The long bit-width multiplier comprises a first converter configured to convert the first fixed point number to a first sign, a first mantissa, and a first exponent. A bit width of the first fixed point number, a bit width of the first mantissa, a bit width of the first exponent, a bit width of the first sign, a value of a first base number that represents the first fixed point number, and/or a value of a first stride number may be dynamically configured with respect to the first fixed point number based on one or more factors selected from a group consisting of a first relative position of the layer in the neural network, a second relative position of the pixel in the input feature map, and the one of the plurality of channels. In an embodiment, the first fixed point number is converted to the first sign, the first mantissa, and the first exponent using a fine grain mode when the first stride number is equal to 1, and using a coarse grain mode when the first stride number is greater than 1.

In an embodiment, the bit width of the first mantissa is layer dependent. For example, the bit width of the first mantissa, when the first fixed point number is associated with a layer at the center of the neural network or near a center layer of the neural network, may be shorter than converted from a third fixed point number associated with an earlier layer with respect to the layer, and may be shorter than that converted from a fourth fixed point number associated with a later layer with respect to the layer. For example, the bit width of the first mantissa, when the first fixed point number is associated with one of the first half of layers of the neural network, may be shorter than that converted from a sixth fixed point number associated with an earlier layer with respect to the one of the first half of layers, and may be longer than that converted from a seventh fixed point number associated with a later layer with respect to the one of the first half of layers. For example, the bit width of the first mantissa, when the first fixed point number is associated with one of the second half of layers of the neural network, may be longer than that converted from an eighth fixed point number associated with an earlier layer with respect to the one of the second half of layers, and may be shorter than that converted from a ninth fixed point number associated with a later layer with respect to the one of the second half of layers.

In an embodiment, the bit width of the first mantissa is pixel dependent. For example, the bit width of the first mantissa, when the first fixed point number is associated with a first pixel, may be shorter than that converted from a tenth fixed point number associated with a second pixel that is closer than the first pixel with respect to the center of the input feature map, and may be longer than that converted from an eleventh fixed point number associated with a third pixel that is farther than the first pixel with respect to the center of the input feature map.

In an embodiment, the bit width of the first mantissa is channel dependent. For example, the bit width of the first mantissa, when the first fixed point number is associated with a first channel of the plurality of channels, may be longer than that that converted from a twelfth fixed point number associated with a second channel of the plurality of channels because a higher degree of precision is desirable with respect to the first channel of the plurality of channels compared with the second channel of the plurality of channels. For example, the bit width of the first mantissa, when the first fixed point number is associated with a third channel of the plurality of channels, may be shorter than that converted from a thirteenth fixed point number associated with a fourth channel of the plurality of channels because a lower degree of precision is tolerable with respect to the third channel of the plurality of channels compared with the fourth channel of the plurality of channels.

The bit width of the first exponent is configurable based on the bit width of the first mantissa and a bit width of the first fixed point number. The long bit-width multiplier further comprises a restoration circuit configured to calculate and output the multiplication of the first fixed point number and the second fixed point number based on the first sign, the first mantissa, the first exponent, and the second fixed point number.

The long bit-width multiplier further comprises a second converter configured to convert the second fixed point number to a second sign, a second mantissa, and a second exponent. In an embodiment, the second exponent is different than the first exponent, and the second mantissa is different than the first mantissa.

In an embodiment, a bit width of the second fixed point number, a bit width of the second mantissa, a bit width of the second exponent, a bit width of the second sign, a value of a second base number that represents the second fixed point number, and/or a value of a second stride number may be dynamically configured with respect to the second fixed point number based on one or more factors selected from a group consisting of the first relative position of the layer in the neural network, a third relative position of the data point having the value of the second fixed point number in a corresponding filter, and the one of the plurality of channels. In an embodiment, the second fixed point number is converted to the second sign, the second mantissa, and the second exponent using the fine grain mode when the second stride number is equal to 1, and using the coarse grain mode when the second stride number is greater than 1.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIG. 6 illustrates conversions of a fixed point number to a sign, a mantissa and an exponent;

FIG. 7 is a flowchart of an exemplary process for performing multiplication of two long bit-width fixed point numbers according to an embodiment of the disclosure;

FIG. 11A is a schematic diagram of an embodiment of an absolute value generator;

FIG. 11B is a truth table with respect to a conditional selector according to an embodiment of the disclosure;

FIG. 12 is a flowchart of an exemplary process for converting a long bit-width fixed point number to a sign, a mantissa and an exponent using a converter according to an embodiment of the disclosure;

FIG. 13 is a schematic diagram of an embodiment of a leading-1 detector;

FIG. 16A is an example look-up table in FIG. 15;

FIG. 19 illustrates a sliding window method of determining a mantissa and an exponent with respect to an absolute value of a fixed point number when a fine grain mode is on (stride=1);

FIG. 20 illustrates a sliding window method of determining a mantissa and an exponent with respect to an absolute value of a fixed point number when a coarse grain mode is on (stride>1, for example, stride=2);

FIG. 23 illustrates a right shifting method of determining a mantissa and an exponent with respect to an absolute value of a fixed point number when a fine grain mode is on (stride=1);

FIG. 24 illustrates a right shifting method of determining a mantissa and an exponent with respect to an absolute value of a fixed point number when a coarse grain mode is on (stride>1, for example, stride=2);

FIG. 27 is an example look-up table in FIG. 26;

FIG. 28 is a flowchart of an exemplary process for converting a step number to an exponent according to an embodiment of the disclosure;

FIG. 29 is a schematic diagram of an embodiment of an exponent generator;

FIG. 34 is a schematic diagram of an embodiment of a mantissa generator;

FIG. 35A illustrates an example of determining a mantissa of a fixed point number based on a sign of the fixed point number and a mantissa of an absolute value of the fixed point number;

FIG. 35B illustrates an example of determining a mantissa of a fixed point number based on a sign of the fixed point number and a mantissa of an absolute value of the fixed point number;

FIG. 36 is a flowchart of an exemplary process for determining a mantissa of a fixed point number using a mantissa generator according to an embodiment of the disclosure;

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
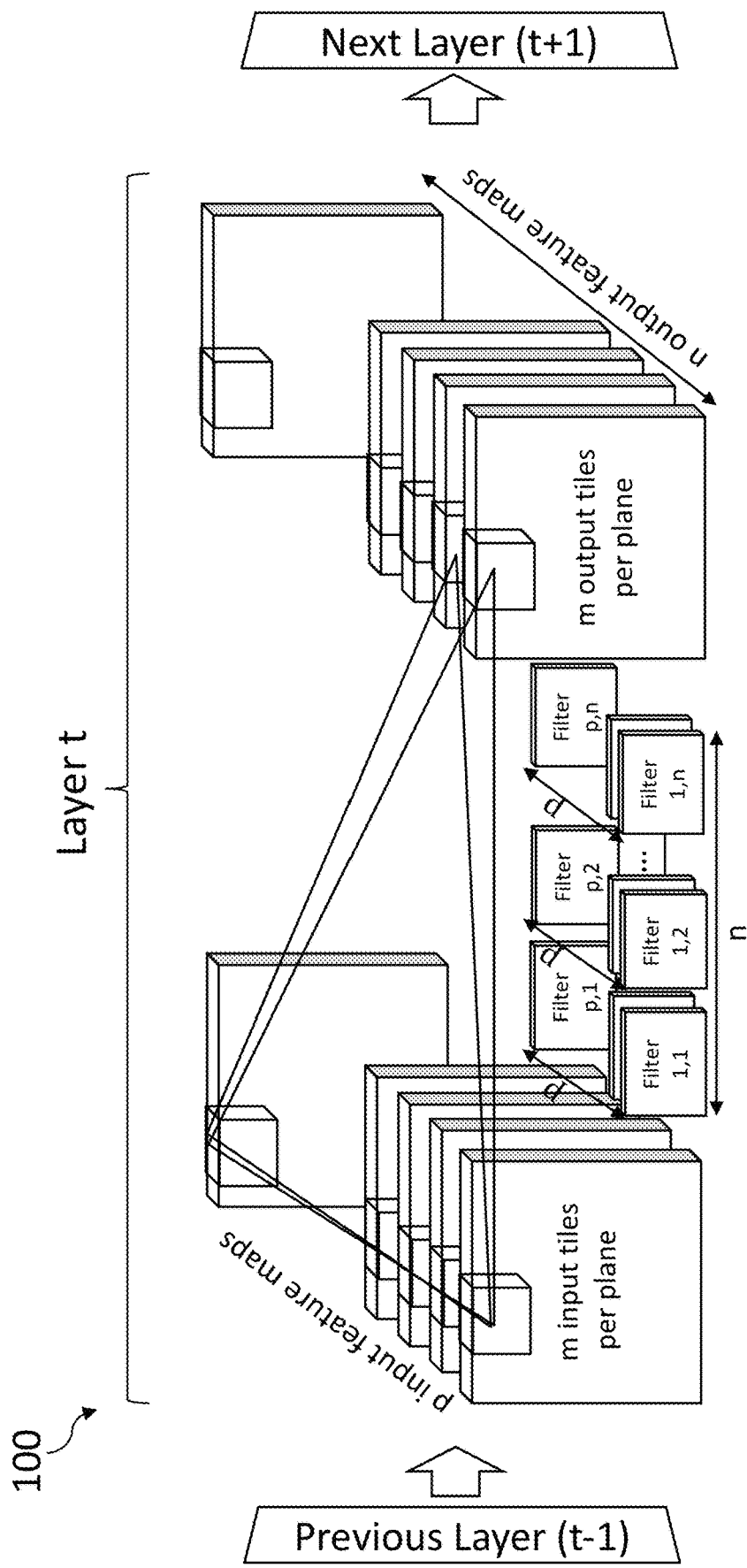
FIG. 1 is a diagram of a layer of a neural network.

Many machine learning models or neural networks, for example, deep neural network and convolutional neural network, have a multi-layer architecture with tensor processing between the layers. FIG. 1 is a diagram of one layer, denoted by layer t (where t is an integer), of a neural network 100. In an embodiment, the neural network 100 is a convolutional neural network. In an embodiment, the neural network 100 is any other suitable kind of neural network. In this example, the previous layer, denoted by layer (t−1), provides p input feature maps (input planes), each with m input tiles per plane. In an embodiment, each of the p input feature maps includes v pixels, each pixel corresponding to a data point, arranged in m input tiles, where p, v, m are integers. Accordingly, each of the m input tiles may include v/m pixels. Each of the p input feature maps of layer t corresponds to a channel of layer t. Accordingly, layer t includes p channels, and the p input feature maps are also referred to as the p channels of input feature maps. The p input planes are filtered by a p×n bank of filters, yielding a next layer, denoted by layer (t+1) with n output feature maps (output planes), each with m output tiles per plane. In an embodiment, layer t includes p channels of filters, each channel of filters having n filters. Accordingly, each channel of the p input feature maps is filtered by a corresponding channel of the p channels of filters, each channel of filters having n filters, where n is an integer. In an embodiment, each of the p channels of input feature maps has one-to-one correspondence with one of the p channels of filters. In an embodiment, the neural network includes T layers (where T is an integer, and $1 \leq t \leq T$). Specifically, when t=1, layer t represents the first layer of the neural network 100 and the previous layer (t−1) does not exist. In addition, when t=T, layer t represents the last layer of the neural network and the next layer (t+1) does not exist.

The processing between layers typically includes a tensor contraction, or processing that can be expressed as a tensor contraction. Tensor contraction is the extension of the matrix cross product to higher-dimensional tensors. In a tensor contraction TX×TY=TZ, the two inputs tensors TX and TY each have multiple dimensions, some of which are common and are eliminated in the contraction. The eliminated dimensions are referred to as the contraction indices, and the non-eliminated dimensions are referred to as the free indices. The product tensor TZ has dimensionality determined by the free indices. In an embodiment, the input tensor TX is from the input feature maps, and the input tensor TY is from the filters. In an embodiment, the input tensor TX is from the filters, and the input tensor TY is from the input feature maps.

In addition to tensor contraction, the processing often also includes element-by-element operations between tensors of the same size and "activation" functions applied to tensors. A common element-by-element operation is the linear combination of two tensors, expressed as aTX+bTY=TZ, where the inputs tensors TX and TY and output tensor TZ are all the same size, and a and b are scalars. A common activation function is $\sigma(TX)=TZ$, where $\sigma(\ )$ is a non-linear function applied to each element of input tensor TX to yield the output tensor TZ.

Between tensor contraction, element-wise operations and activation functions, the computation and communication burden is typically dominated by tensor contraction. Tensor contraction typically requires significantly more computations than the other two operations, and also typically requires significantly more moving around of tensor elements in order to complete those calculations. All of these operations may be implemented in software but, given the size of machine learning models, it is preferable to accelerate these calculations by implementing the functions in hardware, such as in integrated circuits. However, the hardware preferably uses an architecture that has the flexibility and scalability to expand its capacity to accommodate different size tensors.

Figure 2:
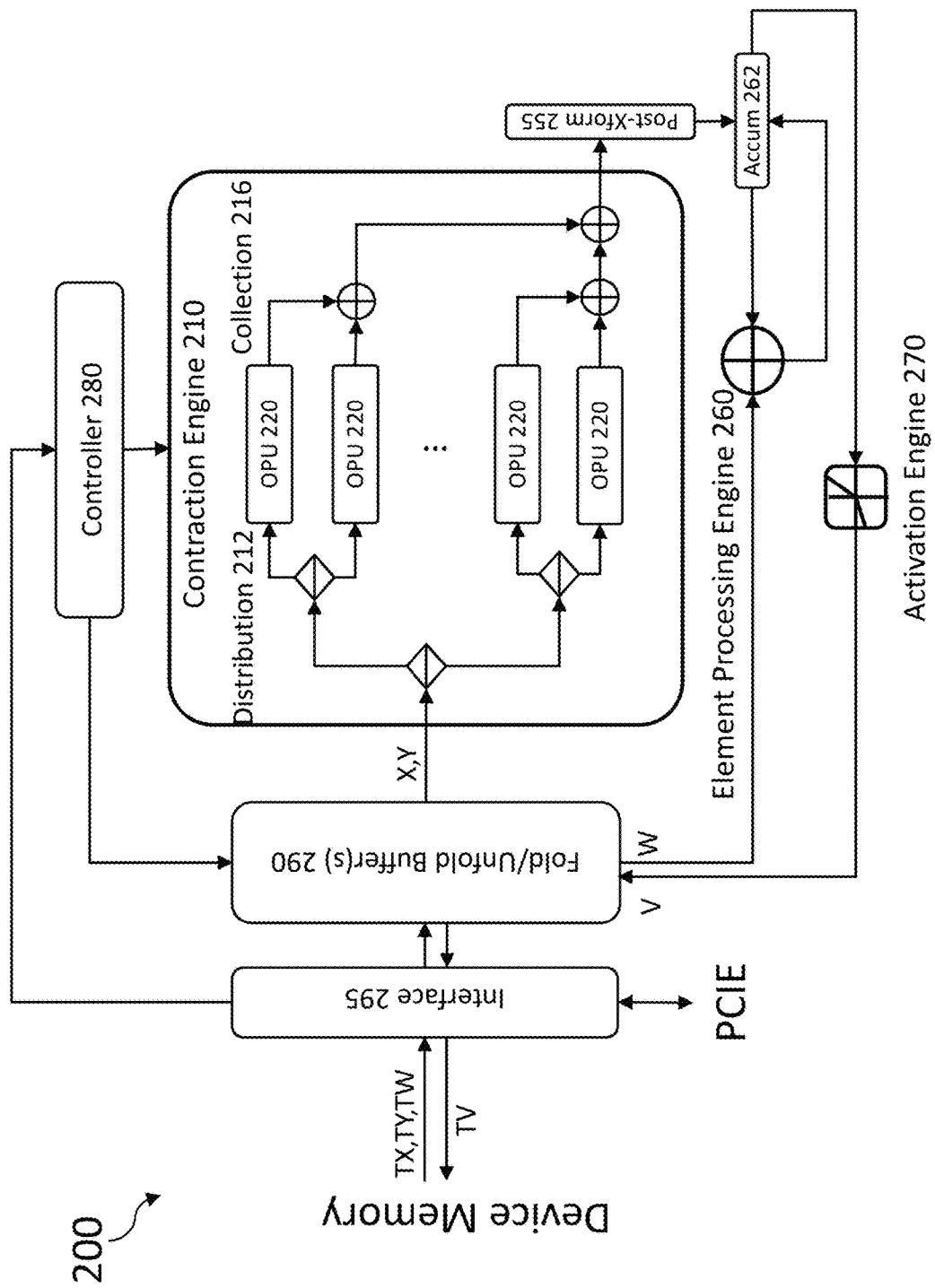
FIG. 2 is a schematic diagram of an embodiment of a native tensor processor.

FIG. 2 is a block diagram of one embodiment of a native tensor processor 200, preferably implemented as a single integrated circuit. The native tensor processor 200 includes a contraction engine 210, and optionally also an element-wise processing engine 260 and an activation engine 270. The native tensor processor 200 also includes a controller 280, input and output buffer(s) 290 and interface(s) 295 to other parts of the computer system. In this example, the interfaces 295 are used to communicate with a device memory where the tensor elements are stored and also to communicate with a host processor using PCIExpress or any other suitable interfaces.

The device memory stores tensor elements for tensors TX, TY and TW. The native tensor processor 200 retrieves these elements from the device memory and calculates the output tensor TV=σ(a(TX×TY)+b(TW)). The contraction engine 210 calculates the contraction TX×TY=TZ and outputs this to the element-wise processing engine 260. The element-wise processing engine 260 (using accumulator 262) calculates the linear combination a(TZ)+b(TW) and outputs this to the activation engine 270, which applies the nonlinear function σ( ). The resulting tensor TV is output via interface 295 back to the device memory.

Figure 3:
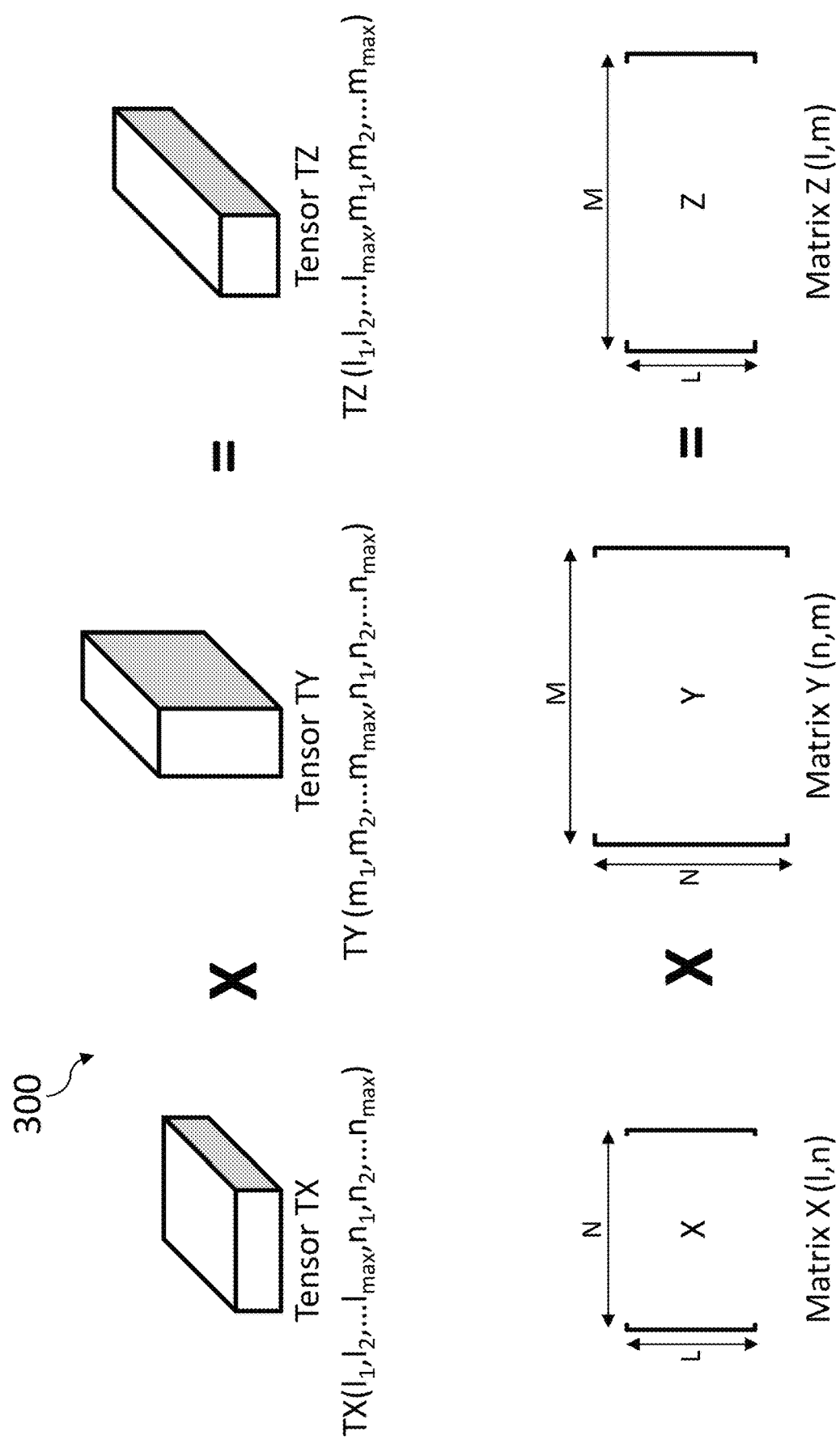
FIG. 3 illustrates conversion of a tensor contraction to a matrix cross product (matrix multiplication)

Tensor operations can be described as equivalent matrix operations. FIG. 3 illustrates conversion of a tensor contraction TX×TY=TZ to an equivalent matrix cross product (matrix multiply) X×Y=Z. In the tensor version, tensor TX has dimensions $(l_1, l_2, \ldots, l_{max}, n_1, n_2, \ldots, n_{max})$ and tensor TY has dimensions $(m_1, m_2, \ldots, m_{max}, n_1, n_2, \ldots, n_{max})$. The indices $\{l_1, l_2, \ldots, l_{max}\}$ and $\{m_1, m_2, \ldots, m_{max}\}$ are the free indices, and the indices $\{n_1, n_2, \ldots, n_{mx}\}$ are the contraction indices. To convert the tensors to equivalent matrices, reorder each set of indices as a single dimension. Let $l=\{l_1, l_2, \ldots, l_{max}\}$, $m=\{m_1, m_2, \ldots, m_{max}\}$ and $n=\{n_1, n_2, \ldots, n_{max}\}$, where $l=1 \ldots L$, $m=1 \ldots M$ and $n=1 \ldots N$, and where L, M, N are all integers. The equivalent matrices X(l,n), Y(n,m), Z(l,m) then have dimensions L×N, N×M and L×M, respectively. For the matrix multiply shown in FIG. 3, the free indices are l,m, and the contraction index is n.

The process of converting from tensors to equivalent matrices is referred to as unfolding and the reverse process is referred to as folding. In traditional approaches, tensors are expressly unfolded into their matrix equivalents, for example the tensor elements may be read from memory and then restored in an order conducive to matrix operations. Matrix operations are then performed on the elements stored in matrix order. The matrix results are then expressly folded back to tensor form. However, this folding and unfolding can become unwieldy and require large amounts of inefficient and repetitive data transfer as the tensors become large.

Much of the function of native tensor processor 200 is described using matrices based on this tensor-matrix equivalency. However, the native tensor processor 200 does not expressly unfold and fold between tensor and matrix forms. This is because the architecture of the contraction engine 210 does not require the reading of large numbers of elements from a matrix storage order. Rather, the contraction engine 210 consumes elements in relatively small chunks, so the chunks can be retrieved directly from their tensor storage format without first expressly unfolding them into a matrix order. This is effected by the controller 280 controlling the order of retrieval of tensor elements into the input buffer 290. For this reason, the input buffer 290 will sometimes be referred to as an unfold buffer, although it is really the controller 280 (or the host processor) that effectively implements the unfolding by retrieving tensor elements in the order consumed by the contraction engine. Similarly, the output buffer 290 will sometimes be referred to as a fold buffer. In FIG. 2, the block 290 includes both the input and output buffers. This implicit in-line hardware unfolding and folding resulting from the control of tensor elements into and out of the buffers 290 is advantageous because it decouples how the tensor elements are arranged in memory from how they are consumed in the native tensor processor. This, in turn, avoids unnecessary data copying and transfer compared to approaches that implement express folding/unfolding.

In one design, the input and output buffers 290 are double buffers. The input buffer 290 includes a first buffer that buffers the retrieval of tensor elements from the device memory. It also includes a second buffer that buffers transmission of the retrieved tensor elements to the contraction engine 210. The contraction engine 210 may consume elements in a different order than they are retrieved from the device memory or the tensor elements may be retrieved from the device memory in data chunks that are different size (typically larger) than those used to transmit the tensor elements to the contraction engine. Double buffering can be used to efficiently bridge these differences. For similar reasons but in the reverse direction, the output buffer 290 may also be a double buffer.

Referring again to FIG. 2, the contraction engine 210 calculates the contraction of tensors TX×TY=TZ by executing calculations that effect a matrix multiply of the equivalent matrices X×Y=Z. It uses a sum of outer products to perform the matrix multiply. The contraction engine 210 includes a distribution section 212, a processing section that includes a plurality of outer product units (OPUs) 220, and a collection section 216. The OPUs 220 calculate the outer products. The distribution section 212 partitions the full matrix multiply X×Y into component outer product calculations, which are performed by the OPUs 220. The collection section 216 sums the component outer products into the full product Z for the matrix multiply X×Y.

The distribution 212 and collection 216 sections include a plurality of collective streaming elements (CEs), which will be described in greater detail below. CEs in distribution sections typically perform scattering and/or broadcasting. CEs in collection sections typically perform gathering and/or reduction. The CEs in the distribution section 212 of FIG. 2 are primarily scattering, and those in the collection section 216 of FIG. 2 are primarily reduction.

Referring again to FIG. 2, the native tensor processor 200 optionally also includes a pre-transform engine (not shown in FIG. 2) and a post-transform engine 255. In FIG. 2, the pre-transform engines are in the OPUs prior to the matrix multiply circuitry, and the post-transform engine 255 is after the collection section 216. The pre-transform engine applies a transform before performing the matrix multiply, and the post-transform engine 255 then applies the inverse transform to the result. In this way, operations that are not matrix multiplies can be performed by the contraction engine 210. Some examples are given below in the discussion of FIG. 4.

Figure 4:
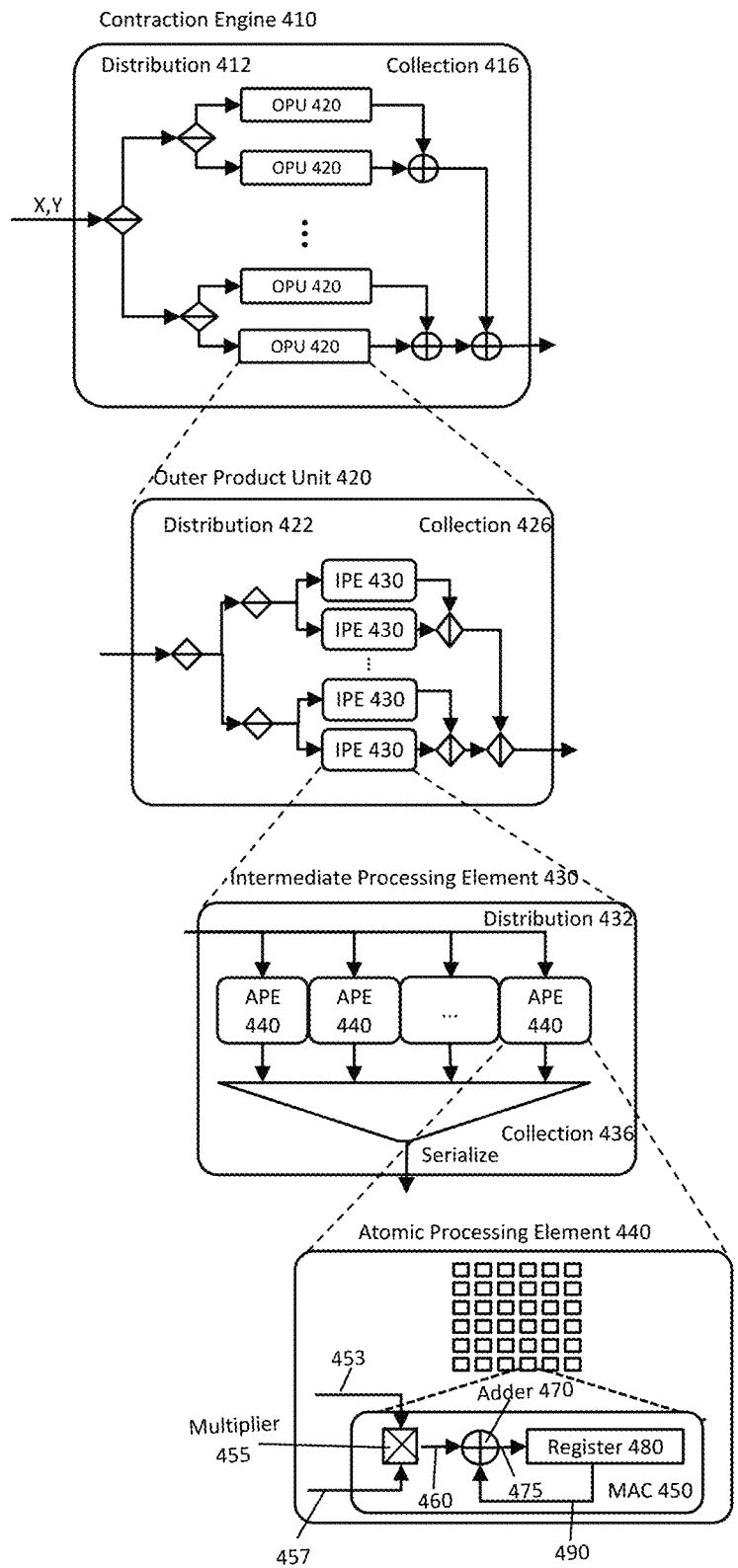
FIG. 4 illustrates an example implementation of a contraction engine.

FIG. 4 illustrates an example implementation of a contraction engine 410, which uses a hierarchical architecture. In an embodiment, the contraction engine 410 is the contraction engine 210 in FIG. 2. The contraction engine 410 includes a parallel array of outer product units (OPUs) 420. Each OPU 420 includes a parallel array of intermediate processing elements (IPEs) 430. Each IPE 430 includes multiple atomic processing elements (APEs) 440. Each APE 440 uses multiply-accumulate circuits (MACs) 450. Thus, the contraction engine 410 provides a certain level of hardware parallelism down to the APEs 440. The APEs 440 are data independent of each other, in the sense that the data required by each APE for its calculation does not depend on the results of the calculation of any other APE. Time division multiplexing may be used to accommodate larger size tensors if the hardware parallelism alone is not sufficient.

At a high level, the contraction engine 410 partitions the full matrix multiply XxY into outer products that can be handled by the OPUs 420. The distribution section 412 and collection section 416 implement the partitioning and its reversal, which scatters 412 and reduces 416 with respect to the contraction index k. Within the OPU, the atomic outer product calculations are ultimately performed by the APEs 440. Because the APEs 440 include MACs 450, they can perform the multiplies to calculate the atomic outer products but they can also accumulate element-wise sums across the contraction index k. The IPEs 430 are an intermediate layer that implements the partitioning from the OPU level down to the APE level. In this example, there is one intermediate layer, which scatters/broadcasts 422,432 and gathers 426, 436 only with respect to the free indices i,j, but other OPU designs can use different numbers of intermediate layers and may also partition with respect to the contraction index k.

In the contraction engine shown in FIG. 4, the scattering along the contraction index k is implemented by the contraction engine—OPU hardware partitioning and also by time division multiplexing and the accumulate function in the APEs. The scattering along the free indices i,j is implemented by the OPU-IPE and IPE-APE hardware partitions, and also by additional time division multiplexing as needed.

As shown in FIG. 4, each MAC 450 includes a multiplier 455 and an adder 470. In an embodiment, the multiplier 455 performs multiplication of a first number 453 and a second number 457 and output the multiplication result 460 to the adder 470. The adder 470 sums the multiplication result 460 and a third number 490 from a register 480 and output the summation result 475 to the register 480. In an embodiment, the third number 490 is a summation result from a previous operation that is stored in the register 480. In an embodiment, the first number 453 is sometimes referred to as a first operand of the multiplier 455, and the second number 457 is sometimes referred to as a second operand of the multiplier 455. In an embodiment, the first number 453, the second number 457, and the third number 490 are all fixed point numbers. Accordingly, the first number 453 is referred to as a first fixed point number 453, the second number 457 is referred to as a second fixed point number 457, and the third number 490 is referred to as a third fixed point number 490. In an embodiment, the first fixed point number 453, the second fixed point number 457, and the third fixed point number all include a long bit-widths. For example, the first fixed point number 453 includes 16 bits or more, the second fixed point number 457 includes 14 bits or more, and the third fixed point number 490 includes 30 bits or more. In an embodiment, a fixed point number is a long bit-width fixed point number when a bit-width of the fixed point number is 8-bit or more. In an embodiment, a fixed point number is a long bit-width fixed point number when a bit-width of the fixed point number is 10-bit or more. In an embodiment, a fixed point number is a long bit-width fixed point number when a bit-width of the fixed point number is 12-bit or more. In an embodiment, a fixed point number is a long bit-width fixed point number when a bit-width of the fixed point number is 14-bit or more. In an embodiment, a fixed point number is a long bit-width fixed point number when a bit-width of the fixed point number is 16-bit or more.

Figure 5A:
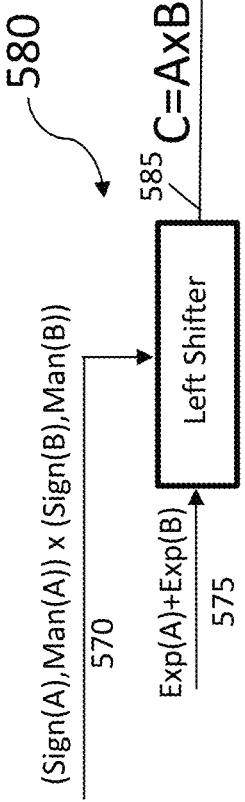
FIG. 5A illustrates a multiplication of two long bit-width fixed point numbers using a long bit-width multiplier.

FIG. 5A illustrates a multiplication of two long bit-width fixed point numbers using a long bit-width multiplier 500. In an embodiment, the long bit-width multiplier 500 performs direct fixed-point multiplications of a first long bit-width fixed point number 502, denoted by A, and a second long bit-width fixed point number 504, denoted by B, and output the result 506, denoted by C=A×B. Since both A and B have long bit widths, the fixed point multiplication using the long bit-width multiplier 500 involves a great amount of calculations, which results in a high power consumption, high hardware cost, and relatively large latency. Additionally, the long bit-width multiplier 500 normally consumes a very large area on an integrated circuit.

Figure 5C:
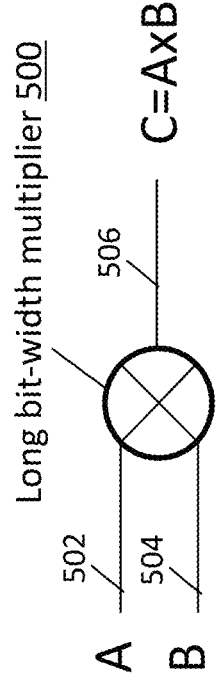
FIG. 5C illustrates an embodiment of a restoration circuit.
Figure 5B:
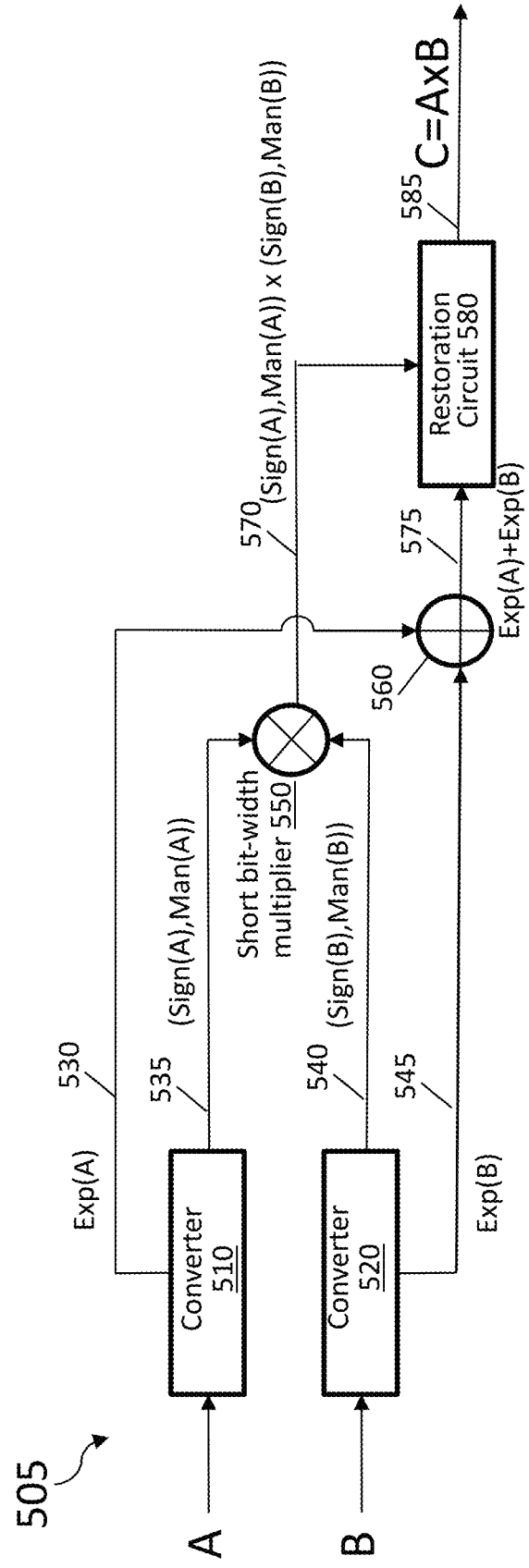
FIG. 5B is a schematic diagram of an embodiment of a multiplier.
Figure 38:
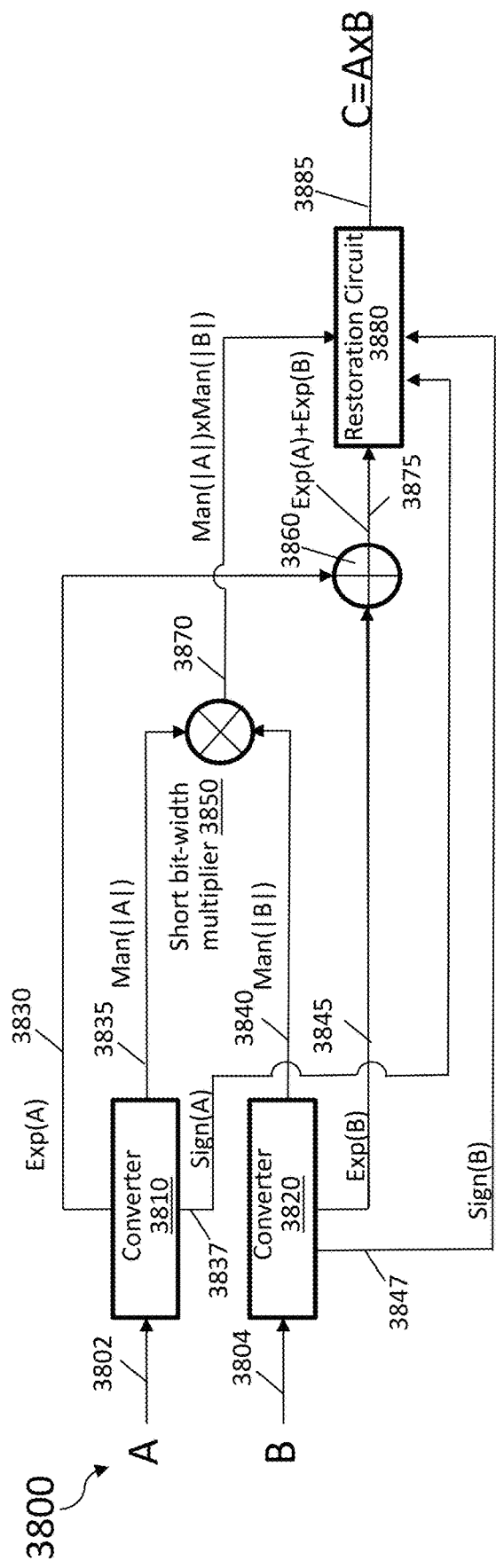
FIG. 38 is a schematic diagram of an embodiment of a multiplier.

FIG. 5B and FIG. 38 discloses two different embodiments of multipliers 505, 3800 which can perform multiplications of fixed point numbers more effectively and efficiently than the long bit-width multiplier 500. The consumed energy for performing multiplications of the same fixed point numbers is greatly reduced by using the multipliers 505, 3800 in FIG. 5B and FIG. 38 than the long bit-width multiplier 500. In addition, the hardware cost and the consumed physical area of the multipliers 505, 3800 in FIG. 5B and FIG. 38 are greatly reduced than the long bit-width multiplier 500. Specifically, the consumed physical area of the multipliers 505, 3800 in FIG. 5B and FIG. 38 can be reduced by more than 25% than the long bit-width multiplier 500. In an embodiment, the multipliers 505, 3800 are also referred to as long bit-width multipliers.

FIG. 5B is a schematic diagram of an embodiment of a multiplier 505. In an embodiment, the multiplier 505 is the multiplier 455 in FIG. 4. The multiplier 505 performs multiplication of a first fixed point number 502, denoted by A, and a second fixed point number 504, denoted by B, and output the multiplication result 585, denoted by C=A×B. In an embodiment, C is a fixed point number. As shown in FIG. 1, for example, the first fixed point number 502 is associated with a pixel from one of the p channels of input feature maps at layer t, and the second fixed point number 504 is associated with a filter from one of the p channels of filters at layer t. At least one of A and B is a long bit-width fixed point number. In an embodiment, both A and B are long bit-width fixed point numbers. For example, both A and B are 16-bit fixed point numbers. For example, A is a 16-bit fixed point number, and B is a 14-bit fixed point number.

The multiplier 505 includes a first converter 510. The first converter 510 receives the first fixed point number A and converts A to a first sign, which is denoted by Sign(A), a first mantissa, which is denoted by Man(A), and a first exponent 530, which is denoted by Exp(A). The first converter 510 further outputs the first exponent 530, and outputs a combination 535 of the first sign and the first mantissa. In an embodiment, the first combination 535 of the first sign and the first mantissa is obtained by concatenating the first sign to the left of the first mantissa. In an embodiment, the first combination 535 of the first sign and the first mantissa is denoted by (Sign(A), Man(A)) as shown in FIG. 5B.

The multiplier 505 also includes a second converter 520. The second converter 520 receives the second fixed point number B and converts B to a second sign, which is denoted by Sign(B), a second mantissa, which is denoted by Man(B), and a second exponent 545, which is denoted by Exp(B). The second converter 520 further outputs the second exponent 545, and outputs a combination 540 of the second sign and the second mantissa. In an embodiment, the second combination 540 of the second sign and the second mantissa is obtained by concatenating the second sign to the left of the second mantissa. In an embodiment, the second combination 540 of the second sign and the second mantissa is denoted by (Sign(B), Man(B)) as shown in FIG. 5B.

FIG. 6 illustrates conversion of a fixed point number to a sign, a mantissa and an exponent. In an embodiment, the fixed point number is a long bit-width fixed point number. As shown, before conversion, the fixed point number has a bit width denoted by I. In this example, I=16. I may be any other suitable number in other examples.

After conversion, the fixed point number, denoted by Input, is converted to a sign, a mantissa, and an exponent. The sign is denoted by Sign(Input), and the bit width of the sign is denoted by S. In an embodiment, the sign has a single bit. Accordingly, S=1. In an embodiment, Sign(Input) is the left most bit of the fixed point number. In an embodiment, Sign(Input)=1 when the fixed point number is a negative number, and Sign(Input)=0 when the long bit-width fixed point number is 0 or a positive number. The mantissa is denoted by Man(Input), and the bit width of the mantissa is denoted by M. In this example, M=8. M may be any other suitable number in some other examples. The exponent is denoted by Exp(Input), and the bit width of the exponent is denoted by E. In this example, E=3. E may be any other suitable number in some other examples.

The fixed point number, denoted by Input, can be expressed or approximated by:

$$\text{Input}' = (-1)^{\text{Sign(Input)}} \times \text{Man(Input)} \times W^{\text{Exp(Input)}} \quad (1)$$

where W is a base number of the fixed point number, and W is an integer no less than two. In an embodiment, W is also referred to as a base of the fixed point number. In an embodiment, the fixed point number is a W-ary number. In an embodiment, the fixed point number is referred to as a number in base W, or a base W number. For example, W=2 when the fixed point number is a binary number. It should be noted that sometimes, Input is not equal to Input'. In other words, Input' is equal to Input, or is an approximation of Input. When the parameters associated with Input (as discussed in greater details in relation to FIG. 9, including without limitation, M, E, and Stride) are properly configured and selected, Input' is approximately equal to Input, or is a good approximation or representation for Input so that the difference between Input and Input' is tolerable in the calculation related to the neural network. In an embodiment, a high degree of precision for representing Input using Input' is achieved when the difference between Input' and Input is small or below a specific predetermined threshold. A low degree of precision for representing Input using Input' is achieved when the difference between Input' and Input is large or below another specific predetermined threshold. A higher degree of precision for representing Input using Input' is achieved when an absolute value of the difference between Input' and Input becomes smaller. A lower degree of precision for representing Input using Input' is achieved when the absolute value of the difference between Input' and Input becomes greater.

The relationship between M, E, and I can be expressed by:

$$E \geq E_{min} = \lfloor \log_W(I-S-M) \rfloor \quad (2)$$

where $E_{min}$ is an integer representing a minimal bit width of the first exponent, and wherein $\lfloor \log_W(I-S-M) \rfloor$ is a nearest integer that a value of $\log_W(I-S-M)$ rounds up to.

In an embodiment, the bit width of the mantissa (i.e., M) and the bit width of the exponent (i.e., E) can be dynamically configured and/or adjusted, for example, according to the precision requirement. When a higher degree of precision for the multiplication is necessary, M may be longer. When a lower degree of precision is tolerable for the multiplication, M may be shorter. In an embodiment, the value of M is layer dependent. In an embodiment, the value of M is channel dependent. In an embodiment, the value of M is pixel dependent. In an embodiment, the value of M is dynamically configured and/or adjusted subject to a combination of the layer, the channel, and the pixel associated with the fixed point number. The exponent may be accordingly configured and/or adjusted based on equation (2). More details will be discussed with regard to FIG. 9. In an embodiment, S+M+E<I.

Returning to FIG. 5B, the multiplier 505 further includes a short bit-width multiplier 550, an adder 560 and a restoration circuit 580. In an embodiment, the short bit-width multiplier 550 is a signed multiplier, which suggests each input and output of the short bit-width multiplier 550 may be a positive number, 0, or a negative number. An input of the short bit-width multiplier 550 is negative when the left most bit (i.e., the most significant bit, or MSB) of the input is 1, and the input of the short bit-width multiplier 550 is 0 or positive when the left most bit ((i.e., the most significant bit, or MSB) of the input is 0. The short bit-width multiplier 550 performs multiplication of the first combination 535 of the first sign and the first mantissa and the second combination 540 of the second sign and the second mantissa. The short bit-width multiplier 550 is named so because both operands have shorter bit widths than their original fixed point numbers as illustrated in FIG. 6. The short bit-width multiplier 550 further outputs the multiplication result 570 of the first combination 535 and the second combination 540, i.e., (Sign(A),Man(A))×(Sign(B),Man(B)), to the restoration circuit 580.

The adder 560 performs summation of the first exponent 530 (i.e., Exp(A)) and the second exponent 545 (i.e., Exp (B)), and outputs a summation result 575, i.e., Exp(A)+Exp (B), to the restoration circuit 580.

The restoration circuit 580 calculate multiplication of the first fixed point number and the second fixed point number, i.e., C=A×B based on the multiplication results 570 and the summation result 575. Mathematically, C can be expressed by:

$$C = (\text{Sign}(A), \text{Man}(A)) \times (\text{Sign}(B), \text{Man}(B)) \times W(A)^{Exp(A)} \times W(B)^{Exp(B)} \quad (3)$$

where W(A) is a base number of A, and W(B) is a base number of B. For example, W(A)=2 when A is a binary number, and W(B)=2 when B is a binary number.

When W(A)=W(B)=W, C can be expressed by:

$$C = (\text{Sign}(A), \text{Man}(A)) \times (\text{Sign}(B), \text{Man}(B)) \times W^{Exp(A)+Exp(B)} \quad (4)$$

FIG. 5C illustrates an embodiment of the restoration circuit 580. As shown, the restoration circuit 580 is a left shifter. Specifically, the restoration circuit 580 calculates C by left shifting the multiplication result 570 by a number of bits equal to the summation results 575.

FIG. 7 is a flowchart of an exemplary process 700 for performing multiplication of two long bit-width fixed point numbers according to an embodiment of the disclosure. The process 700 may be implemented by the multiplier 505. At step 710, a first fixed point number, A, is converted, for example, by the first converter 510, to Sign(A), Exp(A), and Man(A). At step 720, Exp(A), and (Sign(A),Man(A)) are outputted, for example, by the first converter 510, to an adder, for example, the adder 560, and a short bit-width multiplier, for example, the short bit-width multiplier 550, respectively. At step 730, a second fixed point number, B, is converted, for example, by the second converter 520, to Sign(B), Exp(B), and Man(B). At step 740, Exp(B), and (Sign(B),Man(B)) are outputted, for example, by the second converter 520, to the adder, for example, the adder 560, and the short bit-width multiplier, for example, the short bit-width multiplier 550, respectively.

At step 750, a multiplication result of (Sign(A),Man(A)) and (Sign(B),Man(B)), i.e., (Sign(A),Man(A))×(Sign(B),Man(B)) is calculated and outputted by the short bit-width multiplier, for example, by the short bit-width multiplier 550, to a restoration circuit, for example, the restoration circuit 580. At step 760, a summation result of Exp(A) and Exp(B), i.e., Exp(A)+Exp(B), is calculated and outputted by the adder, for example, by the adder 560, to the restoration circuit, for example, the restoration circuit 580. At step 770, a multiplication C=A×B is calculated and outputted, for example, by the restoration circuit 580 based on the multiplication result from step 750 and the summation result of step 760 using equation (4). In an embodiment, W(A)=W(B)=W=2 in equation (4).

Figure 8:
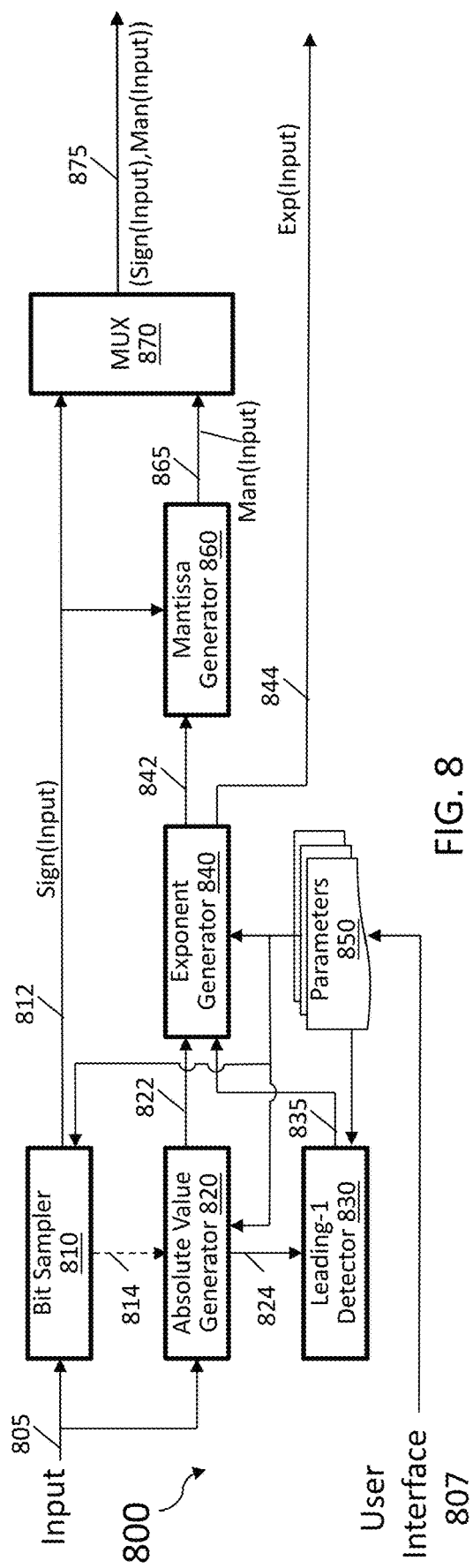
FIG. 8 is a schematic diagram of an embodiment of a converter.

FIG. 8 is a schematic diagram of an embodiment of a converter 800. The converter 800 may be the first converter 510 and/or the second converter 520. The converter 800 includes a bit sampler 810 and an absolute value generator 820 both receive a fixed point number 805, denoted by Input. The fixed point number 805 may be the first fixed point number 502, i.e., A and/or the second fixed point number 504, i.e., B as discussed above.

The bit sampler 810 outputs the sign of Input 805, denoted by Sign(Input). In an embodiment, Sign(Input) is the left most bit of Input 805. Specifically, Sign(Input)=1 when Input is a negative number, and Sign(Input)=0 when Input is 0 or a positive number. Accordingly, the bit sampler 810 obtains and outputs Sign(Input) to a multiplexer 870 by sampling the left most bit of Input 805. The absolute value generator 820 determines the absolute value 822,824 of Input 805, denoted by |Input|, and outputs |Input| 822, 824 to an exponent generator 840 and a leading-1 detector 830, respectively. In an embodiment, W=2, which means Input 805 is a binary number. In an embodiment, when W=2 and Input is a negative number, |Input| 822, 824 is two's complement of Input 805, which is obtained by flipping each bit of Input 805 and incrementing the resulted number by 1. Flipping a bit means changing bit 1 to bit 0 and changing bit 0 to bit 1. For example, when Input=1000110, which is a negative number, |Input|=0111010. When Input is not a negative number, |Input|=Input.

In an embodiment, the leading-1 detector 830 determines a position 835 of the left most non-zero bit of Input 830 and outputs the position 835 of the left most non-zero bit of Input 830 to the exponent generator 840. The left most non-zero bit of Input 830 is referred to as a leading-1 bit of Input 830. The position 835 of the left most non-zero bit of Input 830 is referred to as a position of the leading-1 bit or a leading-1 position. Specifically, the leading-1 detector 830 determines a position 835 of the left most bit 1 of Input 830 (i.e., the leading-1 bit is the left most bit 1 of Input 830 when W=2), and output the position 835 of the left most bit 1 to the exponent generator 840 when Input 805 is a binary number (W=2).

In an embodiment, each bit of |Input| 830 is designated with a position number. For example, the position number is designated from 1 to I from the right most bit to the left most bit of Input 830. Accordingly, the position 835 of the leading-1 bit is the position number associated with the left most non-zero bit of Input 830. In an embodiment, the leading-1 position of Input 830 is zero if |Input|=0.

The exponent generator 840 determines the exponent converted from Input 822, denoted by Exp(|Input|), and outputs Exp(Input) 844 as Exp(Input)=Exp(|Input|). The exponent generator 840 also determines the mantissa of Input 822, denoted by Man(|Input|) 842, to a mantissa generator 860, which subsequently determines the mantissa of Input 805, i.e., Man(Input) 865 based on Sign(Input) 812 and Man(|Input|) 842, and outputs Man(Input) 865 to the multiplexer 870. The multiplexer 870 outputs a combination 875 of Sign(Input) 812 and Man(Input) 865, denoted by (Sign(Input),Man(Input)) 875. In an embodiment, the combination 875 is generated by concatenating Sign(Input) 812 to the left of Man(Input) 865.

As shown in FIG. 8, the converter 800 further includes a parameter database 850 stored in a memory (not shown). The parameter database 850 includes one or more parameters, which will be discussed in great detail in FIG. 9. The parameter database 850 may be updated through a user interface 807. In an embodiment, at least a portion of the one or more parameters included in the parameter database 850 are determined, uploaded, and/or updated by a user or a programmer through the user interface 807 before or during operation of the converter 800. In an embodiment, at least a portion of the one or more parameters included in the parameter database 850 are determined, uploaded, and/or updated through the user interface 807 by executing a computer algorithm on a host computer before or during operation of the converter 800. In an embodiment, the host computer is the host 4750 in FIG. 47. The parameter database 850 may be accessible by the bit sampler 810, the absolute value generator 820, the leading-1 detector 830, and the exponent generator 840. In an embodiment, the bit sampler 810 obtains the bit width of Sign(Input) 812, i.e., S, from the parameter database 850. In an embodiment, the absolute value generator 820 obtains the base number W and the bit width of Input 805, i.e., I, from the parameter database 850. In an embodiment, the leading-1 detector 830 obtains the bit width of Input 805, i.e., I, from the parameter database 850. In an embodiment, the exponent generator 840 obtains the bit width of Input 805, i.e., I, the bit width of the exponent of Input 805 or |Input| 822, i.e., E, the bit width of the mantissa of Input 805 or |Input| 822, i.e., M from the parameter database 850, and the value of the stride number, i.e., Stride (will be discussed in greater details below).

Figure 9:
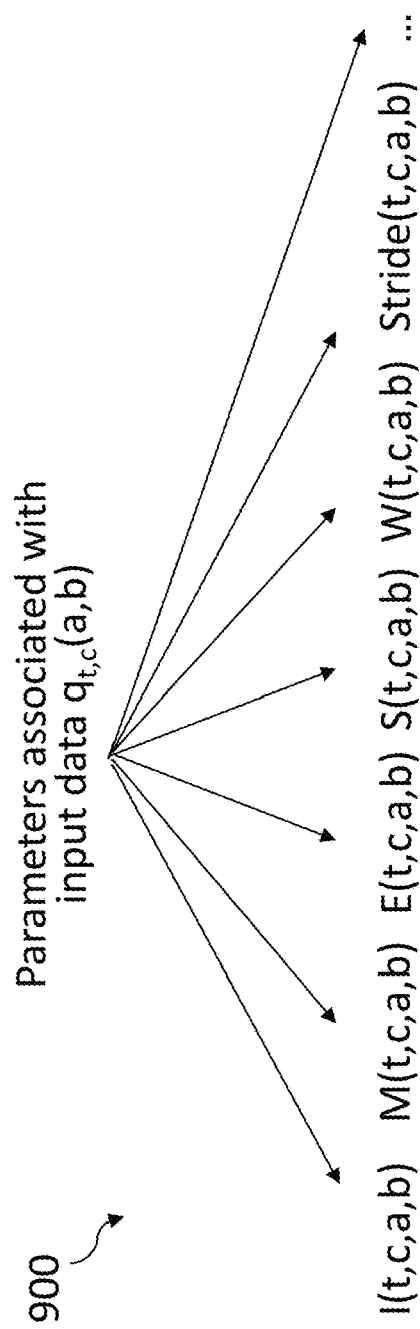
FIG. 9 illustrates exemplary parameters corresponding to a fixed point number.

FIG. 9 illustrates exemplary parameters 900 stored in a parameter database corresponding to a fixed point number. In an embodiment, the fixed point number is a long bit-width fixed point number. In an embodiment, the parameter database is the parameter database 850 in FIG. 8.

In an embodiment, the fixed point number, denoted by $q_{t,c}(a,b)$ as shown in FIG. 9, is Input 805. The number $q_{t,c}(a,b)$ represents a fixed point number associated with layer t, channel c, and an effective coordinate (a,b) of a data point having the value of $q_{t,c}(a,b)$ in the equivalent matrix, for example matrix X or Y in FIG. 3. In an embodiment, the number $q_{t,c}(a,b)$ is a first fixed point number (e.g., the first fixed point number 502) associated with a pixel having an effective coordinate (a, b) in a equivalent matrix unfolded from a tensor representing channel c of the input feature maps in layer t. In an embodiment, the number $q_{t,c}(a,b)$ is a second fixed point number (e.g., the second fixed point number 504) associated with an data point of channel c of the filters having an effective coordinate (a, b) in a equivalent matrix unfolded from a tensor representing channel c of the filters in layer t.

As shown, each fixed point number, for example, the fixed point number $q_{t,c}(a,b)$, is associated with a plurality of parameters 900 included in the parameter database including without limitation, I(t,c,a,b), M(t,c,a,b), E(t,c,a,b), S(t,c,a,b), W(t,c,a,b), and Stride(t,c,a,b). This suggests that the parameters 900 including without limitation, the bit width of the fixed point number denoted by I, the bit width of the mantissa denoted by M, the bit width of the exponent denoted by E(t,c,a,b), the bit width of the sign denoted by S, a value of the base number denoted by W, and a value of the stride number denoted by Stride are subject to change with respect to layer t, channel c, and effective coordinate (a,b) in an equivalent matrix. In an embodiment, the fixed point number is converted to the sign, the mantissa, and the exponent using a fine grain mode when Stride=1, or using a coarse grain mode when Stride>1. In the fine grain mode, the sign, mantissa, and the exponent may be converted from the fixed point number slower than that in the coarse grain mode. However, the degree of precision for the mantissa converted using the fine grain mode may be greater than that converted using the coarse grain mode. More details regarding Stride, the fine grain mode and the coarse grain mode will be discussed in greater detail below.

In an embodiment, at least one or more of the plurality of parameters including I(t,c,a,b), M(t,c,a,b), E(t,c,a,b), S(t,c,a,b), W(t,c,a,b), and Stride(t,c,a,b) are layer dependent. In an embodiment, the precision requirement for the multiplication of the two fixed point numbers and/or representing the fixed point number that is used to be converted to the sign, mantissa, and the exponent, decreases with the increase of layer index, t, from the first layer to the middle layer (or called center layer) of the neural network, for example, the neural network 100. In addition, the precision requirement for the multiplication of the two fixed point numbers increases with the increase of the layer index, t, from the middle layer to the last layer of the neural network. Accordingly, in an embodiment, the bit width of the mantissa, M(t,c,a,b) decreases with the increase of t from the first layer to the middle layer. The bit width of the mantissa, M(t,c,a,b) further increases with the increase of t from the middle layer to the last layer of the neural network. In an embodiment, the minimal bit width of the exponent converted from the first fixed point number, $E_{min}(t,c,a,b)$ is subject to the same direction of variation of M(t,c,a,b) with respect to the change of t as determined by equation (2). E(t,c,a,b) is an integer no smaller than $E_{min}(t,c,a,b)$. In an embodiment, the stride number, denoted by Stride(t,c,a,b) and used to determine the mantissa and the exponent as will be discussed in detail below, is subject to the opposite direction of variation of M(t,c,a,b) with respect to the change of t. In an embodiment, Stride(t,c,a,b) is an integer no smaller than 1.

In an embodiment, the bit width of the mantissa, denoted by M(t,c,a,b), which is converted from a first fixed point number, when the first fixed point number is associated with a layer at the center of the neural network or near a middle layer of the neural network, may be shorter than that converted from a second fixed point number associated with an earlier layer with respect to the layer, and may be shorter than that converted from a third fixed point number associated with a later layer with respect to the layer. In an embodiment, the minimal bit width of the exponent converted from the first fixed point number, $E_{min}(t,c,a,b)$ is subject to the same direction of variation of M(t,c,a,b) with respect to the change of t as determined by equation (2). E(t,c,a,b) is an integer no smaller than $E_{min}(t,c,a,b)$. In an embodiment, the stride number, denoted by Stride(t,c,a,b) and used to determine the mantissa and the exponent as will be discussed in detail below, is subject to the opposite direction of variation of M(t,c,a,b) with respect to the change of t.

In an embodiment, the bit width of the mantissa, denoted by M(t,c,a,b), which is converted from a first fixed point number, when the first fixed point number is associated with one of the first half of layers of the neural network, may be shorter than that converted from a second fixed point number associated with an earlier layer with respect to the one of the first half of layers, and may be longer than that converted from a third fixed point number associated with a later layer with respect to the one of the first half of layers. The minimal bit width of the exponent converted from the first fixed point number, $E_{min}(t,c,a,b)$ is subject to the same direction of variation of M(t,c,a,b) with respect to the change of t as determined by equation (2). E(t,c,a,b) is an integer no smaller than $E_{min}(t,c,a,b)$. The stride number, Stride(t,c,a,b), used to determine the mantissa and the exponent, as will be discussed in detail below, is subject to the opposite direction of variation of M(t,c,a,b) with respect to the change of t.

In an embodiment, the bit width of the mantissa, M(t,c,a,b), which is converted from a first fixed point number, when the first fixed point number is associated with one of the second half of layers of the neural network, may be longer than that converted from a second fixed point number associated with an earlier layer with respect to the one of the second half of layers, and may be shorter than that converted from a third fixed point number associated with a later layer with respect to the one of the second half of layers. In an embodiment, the minimal bit width of the exponent converted from the first fixed point number, $E_{min}(t,c,a,b)$ is subject to the same direction of variation of M(t,c,a,b) with respect to the change of t as determined by equation (2). E(t,c,a,b) is an integer no smaller than $E_{min}(t,c,a,b)$. In an embodiment, the stride number, denoted by Stride(t,c,a,b) and used to determine the mantissa and the exponent as will be discussed in detail below, is subject to the opposite direction of variation of M(t,c,a,b) with respect to the change of t.

In an embodiment, at least one or more of the plurality of parameters including I(t,c,a,b), M(t,c,a,b), E(t,c,a,b), S(t,c,a,b), W(t,c,a,b), and Stride(t,c,a,b) are coordinate (a,b) dependent or position dependent. As discussed above, coordinate (a,b) associated with a fixed point number refers to the position or the effective coordinate of the data point having the value of the fixed point number that is used to be converted to the sign, mantissa and exponent in an equivalent matrix unfolded from a corresponding tensor in channel c and layer t. In an embodiment, the data point is a pixel in an input feature map at channel c and layer t. Accordingly, the corresponding tensor is an input feature map at channel c and layer t. As such, the at least one or more of the plurality of parameters above may also be referred to as pixel dependent. In an embodiment, the data point is a data point in a filter at channel c and layer t. Accordingly, the corresponding tensor is a filter at channel c and layer t. In an embodiment, the precision requirement for representing the fixed point number decreases with the coordinate (a,b) being farther away from the center of the equivalent matrix at channel c and layer t, and increases with the coordinate (a,b) being closer to the center of the equivalent matrix at channel c and layer t. In an embodiment, the precision requirement for representing the fixed point number decreases with the position of the data point having a value of the fixed point number being farther away from the center of the corresponding tensor at channel c and layer t, and increases with the position of the data point having the value of the fixed point number being closer to the center of the corresponding tensor at channel c and layer t. Accordingly, in an embodiment, the bit width of the mantissa, denoted by $M(t,c,a,b)$, decreases with the coordinate $(a,b)$ being farther away from the center of the corresponding tensor at channel c and layer t, and increases with the coordinate $(a,b)$ being closer to the center of the corresponding tensor at channel c and layer t. In an embodiment, the minimal bit width of the exponent converted from the fixed point number, $E_{min}(t,c,a,b)$ is subject to the same direction of variation of $M(t,c,a,b)$ with respect to the change of the position or the coordinate $(a,b)$ as determined by equation (2). $E(t,c,a,b)$ is an integer no smaller than $E_{min}(t,c,a,b)$. In an embodiment, the stride number, denoted by $Stride(t,c,a,b)$ and used to determine the mantissa and the exponent as will be discussed in detail below, is subject to the opposite direction of variation of $M(t,c,a,b)$ with respect to the change of the position or the coordinate $(a,b)$.

In an embodiment, at least one or more of the plurality of parameters including $I(t,c,a,b)$, $M(t,c,a,b)$, $E(t,c,a,b)$, $S(t,c,a,b)$, $W(t,c,a,b)$, and $Stride(t,c,a,b)$ are channel dependent. In an embodiment, the precision requirement for the multiplication of the two fixed point numbers and/or representing the fixed point number that is used to be converted to the sign, the mantissa, and the exponent varies with respect to different channels (with different channel c) in layer t at the effective coordinate $(a,b)$. In an embodiment, the minimal bit width of the exponent converted from the fixed point number, $E_{min}(t,c,a,b)$ is subject to the same direction of variation of $M(t,c,a,b)$ with respect to the change of c as determined by equation (2). $E(t,c,a,b)$ is an integer no smaller than $E_{min}(t,c,a,b)$. In an embodiment, the stride number, denoted by $Stride(t,c,a,b)$ and used to determine the mantissa and the exponent as will be discussed in detail below, is subject to the opposite direction of variation of $M(t,c,a,b)$ with respect the change of c. In an example, the precision requirement with respect to channel $c_1$ is lower than that with respect to channel $c_2$ at layer t and the effective coordinate $(a,b)$. Accordingly, in an embodiment, $M(t,c_1,a,b)<M(t,c_2,a,b)$, $E_{min}(t,c_1,a,b)<E_{min}(t,c_2,a,b)$, and $Stride(t,c_1,a,b)>Stride(t,c_2,a,b)$.

Figure 10:
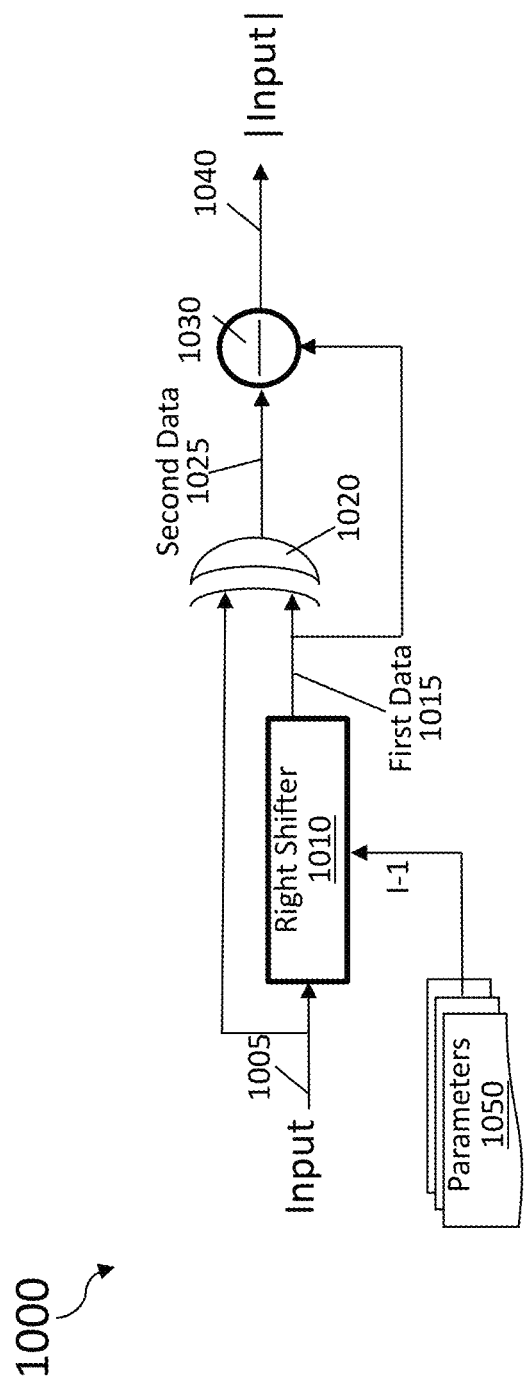
FIG. 10 is a schematic diagram of an embodiment of an absolute value generator.

FIG. 10 is a schematic diagram of an embodiment of an absolute value generator 1000. In an embodiment, the absolute value generator 1000 is the absolute value generator 820. As such, the absolute value generator 820 is not coupled to the bit sampler 810 in FIG. 8. The absolute value generator 1000 receives an input, denoted by Input 1005, and output the absolute value of Input, denoted by |Input| 1040. In an embodiment, Input 1005 is a fixed point number. As shown, the absolute value generator 100 includes a right shifter 1010, an XOR gate 1020, and a substractor 1030. The right shifter 1010 generates a first data 1015 by performing shift shifts of Input 1005 with a number of bits equal to (I–1), where I is the bit width of Input 1005 and obtained from the parameter database 1050. The right shifter 1010 further outputs the first data 1015 to the XOR gate 1020. In an embodiment, the parameter database 1050 is similar to the parameter database 850. In an embodiment, the parameter database 1050 includes a plurality of parameters related to Input 1005 as described in relation to FIG. 9.

The XOR gate 1020 generates a second data 1025 by performing an XOR operation of Input 1005 and the first data 1015, where each bit of the second data 1025 is equal to 0 when the bit of Input 1005 is the same as the bit of the first data 1015, and the bit of the second data 1025 is equal to 1 when the bit of Input 1005 is different than the bit of the first data 1015. The substractor 1030 outputs |Input| 1040 by subtracting the first data 1015 from the second data 1025. An numerical example showing how the absolute value generator 1000 works is illustrated in FIG. 10.

FIG. 11A is a schematic diagram of an embodiment of an absolute value generator 1100. In an embodiment, the absolute value generator 1100 is the absolute value generator 820 as shown in FIG. 8. As such, the absolute value generator 820 is coupled to the bit sampler 810 in FIG. 8. As shown in FIG. 11A, the absolute value generator 1100 includes a conditional selector 1110 and a short bit-width multiplier 1120. The conditional selector 1110 receives the sign of Input, denoted by Sign(Input) 1114, and outputs a selection number 1115 to the short bit-width multiplier 1120. As shown in the truth table 1160 with respect to the conditional selector 1110 in FIG. 11B, the selection number 1115 is equal to 1 when Sign(Input)=0, and equal to –1 when Sign(Input)=1. In an embodiment, the short bit-width multiplier 1120 performs multiplications involving at least on having a short bit width. The short bit-width multiplier 1120 has a first input port configured to receive Input 1105, and a second input port configured to receive the selection number 1115. The short bit-width multiplier 1120 further has an output port configured to output |Input| 1150, which is a product of Input 1105 and the selection number 1115. In an embodiment, the short bit-width multiplier 1120 is replaced by a conditional inverter which includes a first input port configured to receive Input 1105, a second input port configured to receive the selection number 1115, and an output port configured to output |Input| 1150, where |Input| 1150 is Input 1105 when the selection number 1115 is 1, and |Input| 1150 is the two's complement of Input 1105 when the selection number 1115 is –1.

FIG. 12 is a flowchart of an exemplary process 1200 for converting a long bit-width fixed point number to a sign, a mantissa and an exponent using a converter according to an embodiment of the disclosure. In an embodiment, the exemplary process 1200 may be implemented by the converter 800 in FIG. 8. At step 1210, a sign of the long bit-width fixed point number is obtained, for example, by the bit sampler 810 in FIG. 8, by sampling the left most bit of the long bit-width fixed point number. In an embodiment, the left most bit of the long bit-width fixed point number is also referred to as the most significant bit (MSB) of the long bit-width fixed point number. At step 1220, an absolute value of the long bit-width fixed point number is determined, for example, by the absolute value generator 820 in FIG. 8. At step 1230, a leading-1 position of the absolute value of the long bit-width fixed point number is determined, for example, by the leading-1 detector 830 in FIG. 8. At step 1240, a mantissa of the absolute value of the long bit-width fixed point number is determined, and a exponent of the absolute value of the long bit-width fixed point number is outputted as the exponent of the long bit-width fixed point number, for example, by the exponent generator 840 in FIG. 8. At step 1250, the mantissa of the long bit-width fixed point number is generated, for example, by the mantissa generator 860 in FIG. 8. At step 1260, a combination of the sign of the long bit-width fixed point number and the mantissa of the long bit-width fixed point number is outputted, for example, by the multiplexer 870 in FIG. 8.

FIG. 13 is a schematic diagram of an embodiment of a leading-1 detector 1300. In an embodiment, the leading-1 detector 1300 is the leading-1 detector 830 in FIG. 8. The leading-1 detector 1300 receives |Input| 1324 and outputs a leading-1 position 1360 of |Input| 1324. In an embodiment, the leading-1 position 1360 is a position number designated to the left most non-zero bit of |Input| 1324. In an embodiment, the left most non-zero bit of |Input| 1324 is referred to as a leading-1 or a leading-1 bit. A unique position number is designated to each bit of |Input| 1324. For example, the right most bit of |Input| 1324 has a position number of 1, the second bit from the right of |Input| 1324 has a position number of 2, and so on. When |Input| 1324 is a binary number, the leading-1 position 1360 is the position number designated to the left most bit 1 of |Input| 1324. In an embodiment, when |Input| 1324 is 0 and there is no non-zero bit in |Input| 1324, the leading-1 position 1360 is 0. In an embodiment, the leading-1 position 1360 may be determined by counting the number of bits from the left most bit to the left most non-zero bit of |Input| 1324, subtracting the number from the bit width of |Input| 1324, and incrementing the result by one. In an embodiment, the leading-1 position 1360 may be determined by counting the number of bits from the right most bit to the left most non-zero bit of |Input| 1324. In an embodiment, |Input| 1324 is a fixed point number. In an embodiment, |Input| 1324 is a binary number. In an embodiment, |Input| 1324 is a not a binary number As shown the leading-1 detector 1300 includes a de-multiplexer 1310, a reverser 1320, a multiplexer 1330, a counter 1340, and a comparator 1370. Each of the de-multiplexer 1310, the reverser 1320, the multiplexer 1330, and the counter 1340 obtains the bit width of the |Input|, i.e., I, from the parameter database 1350, which is substantially similar to the parameter database 850 in FIG. 8. In an embodiment, the counter 1340 may further obtain the bit width of the mantissa from the parameter database 1350.

The de-multiplexer 1320 outputs each bit of |Input| 1324, denoted by $|Input|_1 \; 1312_1$, $|Input|_2 \; 1312_2$, . . . , $|Input|_I \; 1312_I$, to the reverser 1320. In an embodiment, $|Input|_1 \; 1312_1$ is the right most bit of |Input| 1324, $|Input|_2 \; 1312_2$ is the second bit from the right of |Input| 1324, . . . , and $|Input|_I \; 1312_I$ is the left most bit of |Input| 1324. The reverser 1320 reverses the orders of the bits and outputs the bits $|Input|_I \; 1322_I$, $|Input|_{I-1} \; 1322_2$, . . . , $|Input|_I \; 1322_I$, to the multiplexer 1330. The multiplexer 1330 concatenates the bits $1322_{1, 2, \ldots, I}$ and outputs a reversed input 1335 to the comparator 1370. The bits in the reversed input 1335 have a reversed order with respect to the bits in |Input| 1324. In an embodiment, the de-multiplexer 1310, the reverser 1320, or the multiplexer 1330 designates a position number to each bit of the |Input|, i.e., $1312_{1, 2, \ldots, I}$ and/or $1322_{1, 2, \ldots, I}$. For example, $|Input|_1$ is designated with a position number equal to 1, $|Input|_2$ is designated with a position number equal to 2, . . . , and $|Input|_I$ is designated with a position number equal to I.

The comparator 1370 compares each bit of the reversed input 1335 starting from the right most bit with 0. In an embodiment, if the current bit is 0, the comparator 1370 sends a first instruction through a first communication channel 1344 to the counter 1340. Upon receipt of the first instruction, the counter 1340 decreases a count number by 1 and then sends a second instruction through a second communication channel 1342 to the comparator 1370. The second instruction may include the counter number. The count number is initially set to I. Upon receipt of the second instruction, the comparator 1370 selects the next bit (i.e., the left bit) as the current bit, compares it with zero, and repeats the process above. If the current bit is not zero or the current bit is $|Input|_1 = 0$, the comparator 1370 sends a third instruction through the first communication channel 1344 to the counter 1340, the counter 1340 outputs the count number as the leading-1 position 1360.

In an embodiment, if the current bit is 0, the comparator 1370 selects the next bit (i.e., the left bit) as the current bit and compares it with 0 without sending the first instruction to the counter 1360. The process repeats until the comparator 1370 determines the current bit is not zero or the current bit does not exist, after which the comparator 1370 sends the third instruction to the counter 1340, which outputs the position number designated with the current bit as the leading-1 position. When the current bit does not exist, the leading-1 position is zero. Alternatively, in this embodiment, the counter 1340 may not be needed. Accordingly, the process repeats until the comparator 1370 determines the current bit is not zero or the current bit does not exist, after which the comparator 1370 outputs the position number designated with the current bit as the leading-1 position. When the current bit does not exist, the leading-1 position is zero.

In an embodiment, the reverser 1320 and the multiplexer 1330 are not needed or included in the leading-1 detector 1300. Accordingly, the de-multiplexer 1310 outputs the bits $|Input|_{1, 2, \ldots, I} 1312_{1, 2, \ldots, I}$ to the comparator 1370 directly. Then the comparator 1370 compares each of the bits with 0 in an order as $|Input|_I \; 1312_I$, $|Input|_{I-1} \; 1312_{I-1}$, . . . , and $|Input|_1 \; 1312_1$.

Figure 14:
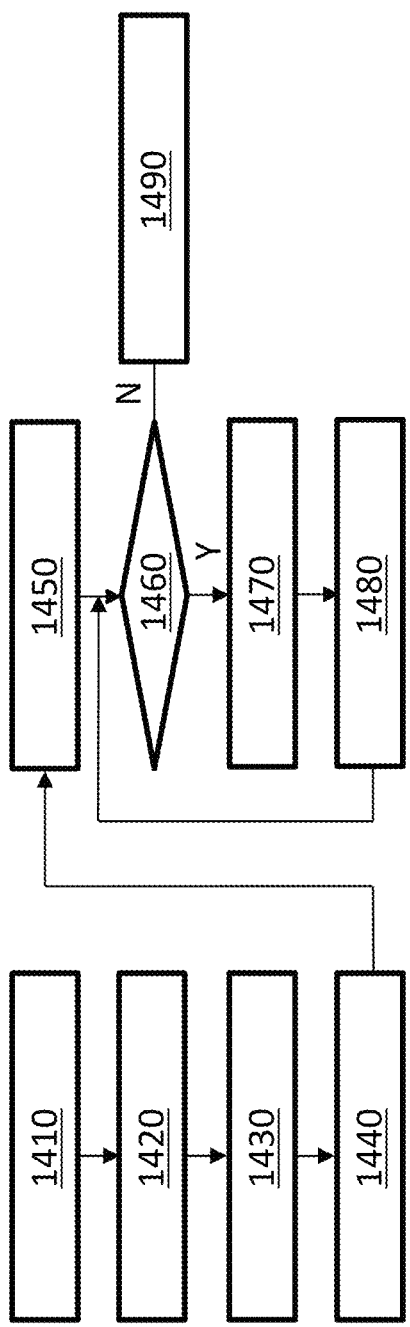
FIG. 14 is a flowchart of an exemplary process for determining a leading-1 position according to an embodiment of the disclosure.

FIG. 14 is a flowchart of an exemplary process 1400 for determining a leading-1 position according to an embodiment of the disclosure. In an embodiment, the exemplary process 1400 is implemented by the leading-1 detector 1300. At step 1410, a bit width of |Input|, denoted by I, is received by a de-multiplexer, for example, the de-multiplexer 1310. In an embodiment, |Input| is an absolute value of Input, and both Input and |Input| are fixed point numbers. In an embodiment, the bit width of |Input|, denoted by I, is also received by a reverser, a multiplexer, and a counter, for example, the reverser 1320, the multiplexer 1330, and the counter 1340 in FIG. 13. At step 1420, each bit of |Input| is provided by the de-multiplexer. At step 1430, an order of bits is reversed by the reverser, for example, the reverser 1320. At step 1440, a reversed input is obtained by concatenating the bits in a reversed order of |Input| performed by the multiplexer, for example, the multiplexer 1330. At step 1450, a right most bit of the reversed input is obtained as a current bit by a comparator, for example, the comparator 1370. At step 1460, it is determined, by the comparator, whether the current bit is bit 0 and a counter number is not equal to 1, where the counter number is initially set to I. If so, the process 1400 proceeds to step 1470. Otherwise, the process 1400 proceeds to step 1490, where a value of the counter number is outputted as a leading-1 position by the counter, for example, the counter 1340. At step 1470, a next bit to the left of the current bit of the reversed input is obtained by the comparator. At step 1480, the counter number is decreased by 1 by the counter. Then the process 1400 returns to step 1460.

Figure 15:
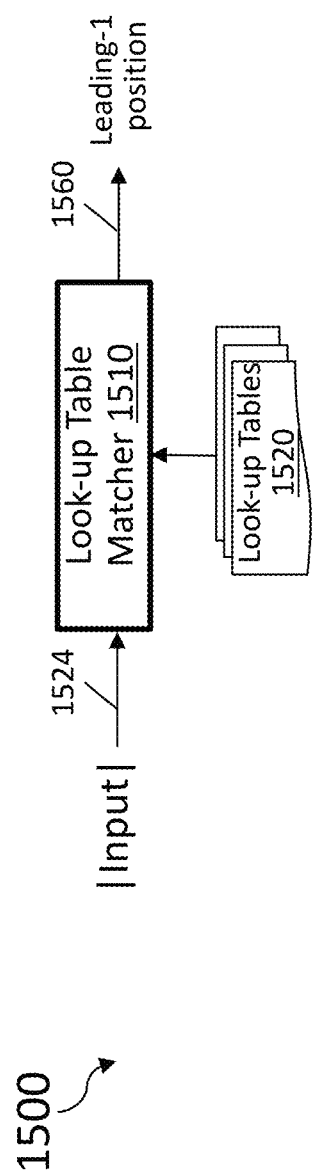
FIG. 15 is a schematic diagram of an embodiment of a leading-1 detector.

FIG. 15 is a schematic diagram of an embodiment of a leading-1 detector 1500. In an embodiment, the leading-1 detector 1500 is the leading-1 detector 830 in FIG. 8. As shown in FIG. 15, the leading-1 detector 1500 includes a look-up table matcher 1510 and a look-up table database 1520 which is accessible by the look-up table matcher 1510. The look-up table matcher 1510 determines a leading-1 position 1560 based on |Input| 1524 by searching look-up tables included in the look-up table database 1520 stored in the memory (not shown). In an embodiment, the leading-1 position 1560 is the leading-1 position 835 in FIG. 8.

A first non-limiting example look-up table 1600 included in the look-up table database 1520 is shown in FIG. 16A. In this example, the bit width of |Input| is 16 bits, and |Input| is a binary fixed point number. The look-up table 1600 as shown in FIG. 16A suggests a one-on-one mapping between each possible |Input| and a corresponding value for the leading-1 position, which is in this example represented by 4 bits. In each possible |Input|, x can be either 0 or 1.

Figure 16B:
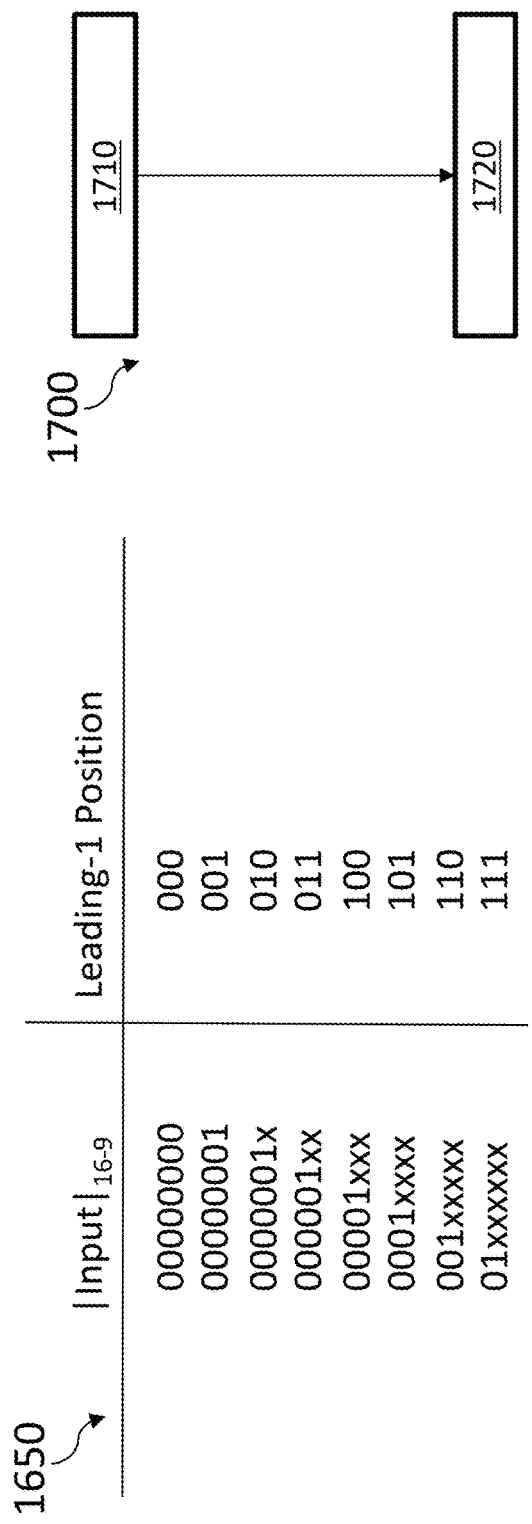
FIG. 16B is an example look-up table in FIG. 15.

A second non-limiting example look-up table 1650 included in the look-up table database 1520 is shown in FIG. 16B. In this example, the bit width of |Input|, denoted by I, is 16-bit, and |Input| is a binary fixed point number. In addition, the bit width of a mantissa, denoted by M, is 8-bit. The look-up table 1650 as shown in FIG. 16B suggests a one-on-one mapping between each possible left most (I−M=8) bits, denoted by $|Input|_{16-9}$, and a corresponding value for the leading-1 position (with an offset of m=8 bits in this example). x can be either 1 or 0. Different than the leading-1 position in FIG. 16A, the leading-1 position in FIG. 16B has a value of 0 for each |Input| having the left most (I−M=8) bits being all 0s no matter what the right most M=8 bits of |Input| are. As such, the leading-1 position in FIG. 16B is sometimes also referred to as the leading-1 position with an offset M. In an embodiment, the leading-1 position in FIG. 16B is also referred to as an offsetted leading-1 position. By doing so, each of the offsetting leading-1 position is represented by 3 bits, which is 1 bit less than that is used to represent the leading-1 position in FIG. 16A.

Figure 17:
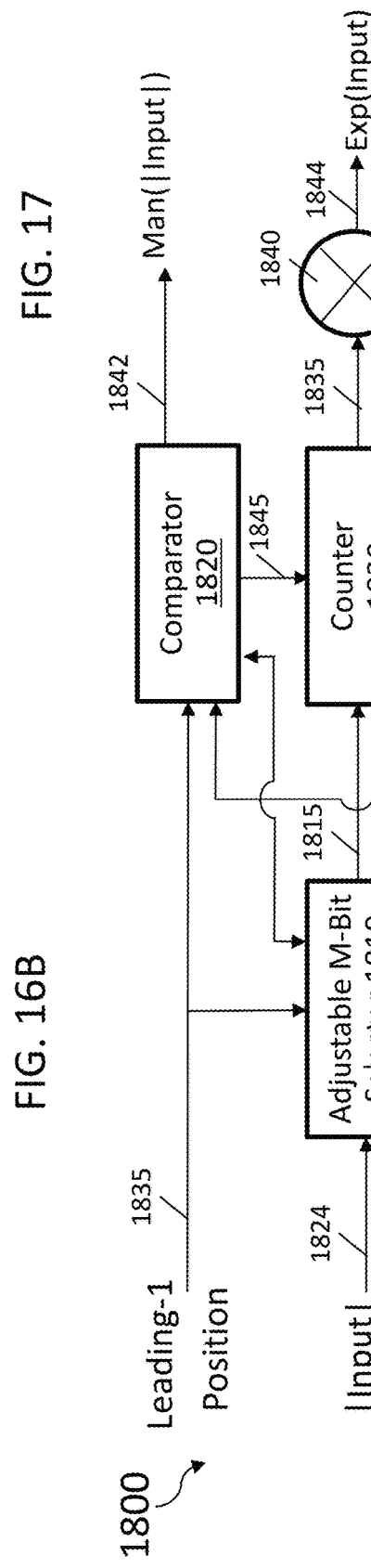
FIG. 17 is a flowchart of an exemplary process for determining a leading-1 position according to an embodiment of the disclosure.

FIG. 17 is a flowchart of an exemplary process 1700 for determining a leading-1 position according to an embodiment of the disclosure. In an embodiment, the exemplary process 1700 is implemented by the leading-1 detector 1500. At step 1710, |Input| is received by, for example, the leading-1 detector 1500. In an embodiment, the leading-1 detector 1500 is a look-up table matcher, for example, the look-up table matcher 1510. In an embodiment, |Input| is an absolute value of a fixed point number. At step 1720, the leading-1 position is determined and outputted by searching or looking up one or more look-up tables included in a look-up table database stored in a memory based on |Input| by, for example, the look-up table matcher 1510. In an embodiment, the look-up table, for example, the look-up table 1600 in FIG. 16A, designates a leading-1 position to each possible |Input|. In addition, the leading-1 position is 0 when |Input|=0. Further, each of the leading-1 positions in the look-up table, for example, the look-up table 1600 in FIG. 16A, is represented by $L_1$ bits.

In an embodiment, the look-up table, for example, the look-up table 1650 in FIG. 16B, designates a leading-1 position to each possible left most (I−M) bits of |Input|. In addition, the leading-1 position is 0 when the left most (I−M) bits are all 0s no matter what the right most M bits are. Further, each of the leading-1 positions in the look-up table, for example, the look-up table 1650 in FIG. 16B, is represented by $L_2$ bits, where $L_2 < L_1$. As shown in FIGS. 16A and 16B, $L_1 = 4$ and $L_2 = 3$.

Figure 18:
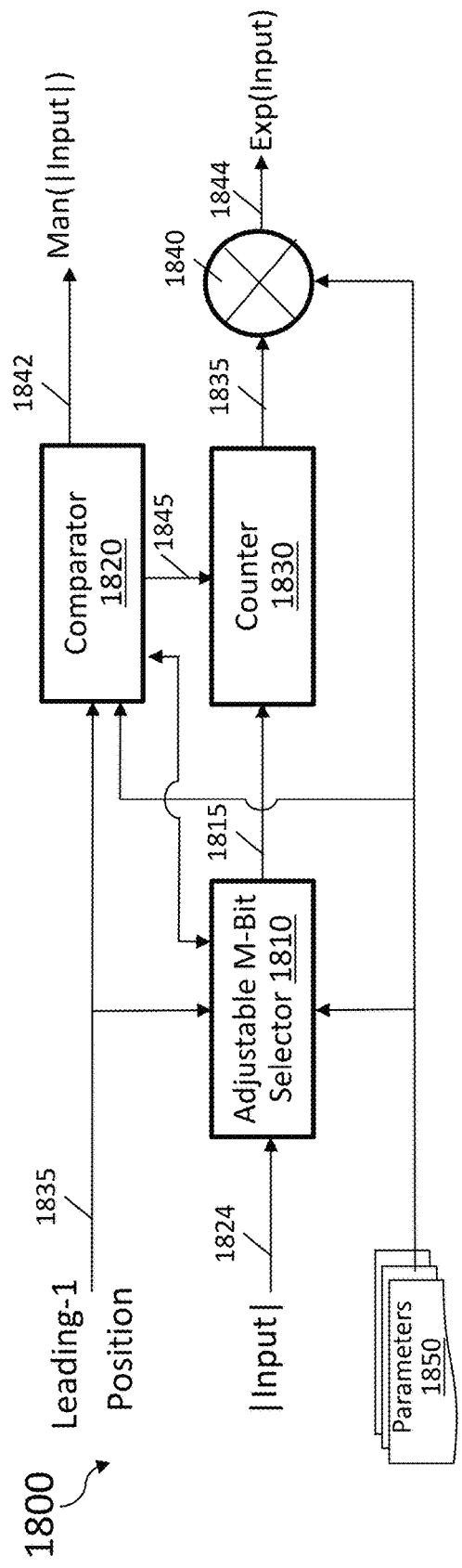
FIG. 18 is a schematic diagram of an embodiment of an exponent generator.

FIG. 18 is a schematic diagram of an embodiment of an exponent generator 1800. In an embodiment, the exponent generator 1800 is the exponent generator 840. In an embodiment, the exponent generator 1800 receives a leading-1 position 1835 and |Input| 1824, and outputs Man(|Input|) 1842, and Exp(Input) 1844. In an embodiment, the exponent generator 1800 accesses a parameter database 1850, and obtains a bit width of |Input|, denoted by I, a bit width of Man(|Input|), denoted by M, a bit width of Exp(Input), denoted by E, the base number, denoted by W, and a stride number, denoted by Stride, from the parameter database 1850. The bit width of |Input| 1824 is the same as the bit width of Input, the bit width of Man(|Input|) is the same as the bit width of Man(Input), and the bit width of Exp(Input) is the same as the bit width of Exp(|Input|). Further, Exp(Input)=Exp(|Input|). In an embodiment, the leading-1 position 1835, |Input| 1824, the parameter database 1850, Man(|Input|) 1842, and Exp(Input) 1844 are the leading-1 position 835, |Input| 822, the parameter database 850, Man(|Input|) 842, and Exp(Input) 844 in FIG. 8.

The exponent generator 1800 includes an adjustable M-bit selector 1810, a comparator 1820, a counter 1830, and a step-to-exponent converter 1840. The adjustable M-bit selector 1810 receives the leading-1 position 1835 and |Input| 1824. The adjustable M-bit selector 1810 selects M consecutive bits of |Input| 1824. The selected M-consecutive bits may be referred to as the M bits included or covered in a window. In an embodiment, the adjustable M-bit selector 1810 is initially set up to place the window to select and include the right most M bits of |Input| 1824.

Figure 26:
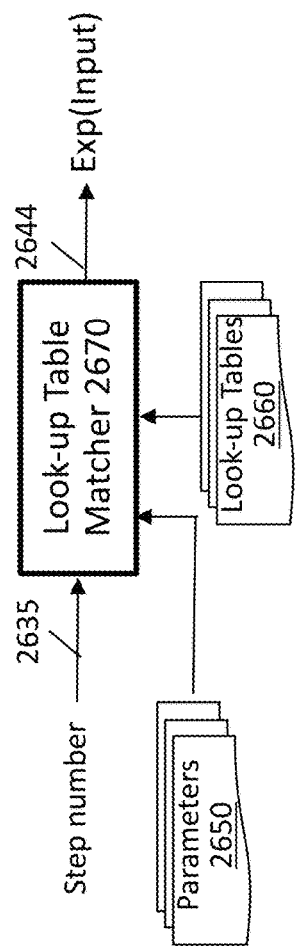
FIG. 26 is a schematic diagram of an embodiment of a step-to-exponent converter.

The comparator 1820 determines whether the leading-1 bit, which is the left most non-zero bit of |Input|, is among the M bits in the window selected by the adjustable M-bit selector 1810 based on the leading-1 position 1835. If the leading-1 bit is not in the window, the comparator 1820 instructs the adjustable M-bit selector 1810 to slide the window to the left by a stride number of bits at a step. The comparator 1820 also sends a first instruction through a communication channel 1845 to the counter 1830. Upon receipt of the first instruction, the counter 1830 increases a step number by 1, where the step number is initialized to 0. After sliding the window, the process above repeats until the comparator 1820 determines that the leading-1 bit is included in the window, when the comparator 1820 informs so to the adjustable M-bit selector 1810 and outputs the M bits in the window as Man(|Input|) 1842. The adjustable M-bit selector 1810 further transmits a second instruction through the communication channel 1845 to the counter 1830 to transmit a value of the step number 1835 to the step-to-exponent converter 1840. The step-to-exponent converter 1840 determines Exp(Input) based on the step number 1835 received from the counter 1830 and the stride number received from the parameter database 1850. In an embodiment, Exp(Input) is equal to a product of the step number 1835 and the stride number. In an embodiment, the step-to-exponent converter 1840 is a short bit-width multiplier as shown in FIG. 18 performing multiplication of the step number 1835 and the stride number. In an embodiment, the step-to-exponent converter 1840 is a look-up table matcher 2670 as shown in FIG. 26. In an embodiment, because the window slides to the left by the stride number of bits each step, the window is also referred to as a sliding window. The method described above implemented by the various components included in the exponent generator 1800 is referred to as a sliding window method.

The stride number, denoted by Stride, is an integer no less than 1. When the stride number is equal to 1, the sliding window method is performed in a fine grain mode. In the fine grain mode, the left most bit of Man(|Input|) is the leading-1 bit. Accordingly, the highest degree of precision given M and E is achieved. Further, $E=E_{min}$. However, it may take many steps until the leading-1 bit is in the window. As such, it may take a longer time and more power for completing the sliding window method. When the stride number is greater than 1, the sliding window method is performed in a coarse grain mode. In the coarse grain mode, the left most bit of Man(|Input|) may not necessarily the leading-1 bit. In some embodiment, $E=E_{min}$. In some embodiment, $E > E_{min}$. It is likely the left most bit of Man(|Input|) is bit 0. Accordingly, the degree of precision given M and E may be, but not necessarily, compromised. However, it will take fewer steps than the fine grain mode until the leading-1 bit is in the window. As such, it will take a shorter time and less power for completing the sliding window method. With an increase of the stride number in the coarse grain mode, the degree of precision given M and E may be, but not necessarily, further compromised. However, it will take even fewer step until the leading-1 bit is in the window. And it will take a much shorter time and much less power for completing the sliding window method. As discussed in relation to FIG. 9, the stride number may be subject to change with respect to layer t, channel c, and effective coordinate (a,b) in an equivalent matrix of Input. Since Exp(Input) is a product of the stride number and the step number, Exp(Input) determined in the coarse grain mode can be represented by a representation number with a number of bit less than $E_{min}$ in the coarse grain mode. More details regarding the representation number will be discussed further in relation to FIGS. 31 and 32.

FIG. 19 illustrates a sliding window method of determining a mantissa and an exponent with respect to an absolute value of a fixed point number when a fine grain mode is on (stride=1). In this example, |Input|=0100000110000000, I=16, M=8, E=3, and Stride=1. The leading-1 bit, as indicated by an arrow labeled as leading-1, has a position number of 15 (the second bit from the left). Initially, the sliding window includes the right most M=8 bits of |Input|. Since the leading-1 bit is not included in the sliding window, the sliding window slides to left by Stride=1 bit at step 1, after which the leading-1 bit is still not in the sliding window. The sliding window continues to slide to left by Stride=1 bit at each step until at step 7, after which the leading-1 bit is included in the sliding window. The M=8 bits included in the sliding window after step 7, i.e., 10000011, is determined as Man(|Input|). Accordingly, Exp(Input)=Exp(|Input|)=stride number×step number=1×7=7 in decimal, which can be represented in binary as 111 as an E=3-bit exponent.

FIG. 20 illustrates a sliding window method of determining a mantissa and an exponent with respect to an absolute value of a fixed point number when a coarse grain mode is on (stride>1, for example, stride=2). In this example, |Input|=0100000110000000, I=16, M=8, E=4(>$E_{min}$=3), and stride=2. The leading-1 bit, as indicated by an arrow labeled as leading-1, has a position number of 15 (the second bit from the left). Initially, the sliding window includes the right most M=8 bits of |Input|. Since the leading-1 bit is not included in the sliding window, the sliding window slides to left by Stride=2 bit at step 1, after which the leading-1 bit is still not in the sliding window. The sliding window continues to slide to left by Stride=2 bits at each step until at step 4, after which the leading-1 bit is included in the sliding window. The M=8 bits included in the sliding window after step 4, i.e., 01000001, is determined as Man(|Input|). Accordingly, Exp(Input)=Exp(|Input|)=stride number×step number=2×4=8 in decimal, which can be expressed in binary as 1000 as an E=4-bit exponent.

Figure 21:
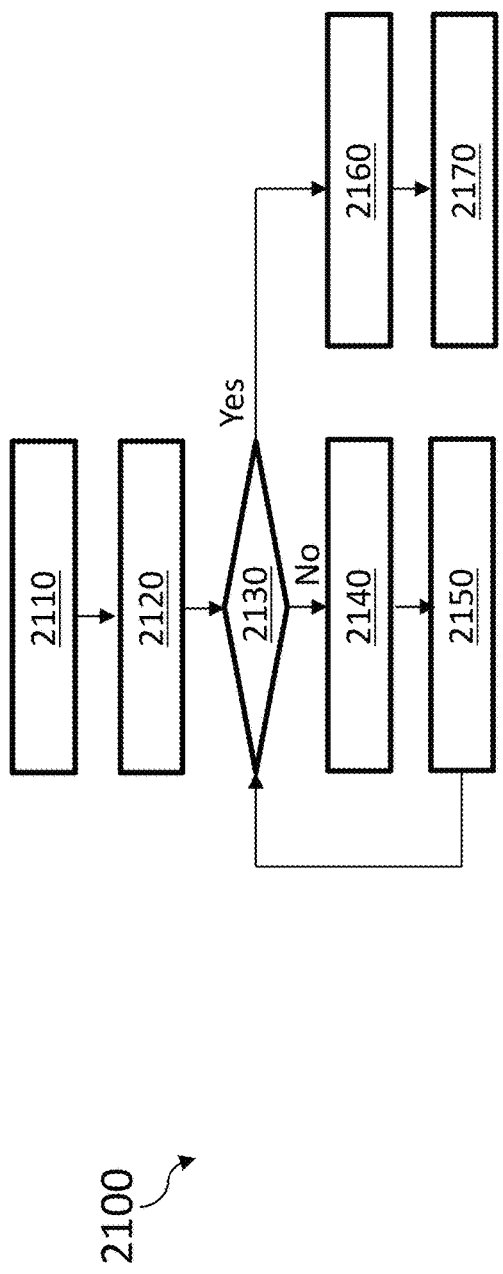
FIG. 21 is a flowchart of an exemplary process for performing a sliding window method using an exponent generator according to an embodiment of the disclosure.

FIG. 21 is a flowchart of an exemplary process 2100 for performing a sliding window method using an exponent generator according to an embodiment of the disclosure. In an embodiment, the exponent generator is the exponent generator 1800. In an embodiment, the exemplary process 2100 is implemented by the exponent generator, for example, the exponent generator 1800. At step 2110, the right most M bits of |Input| are selected and included in a sliding window by an adjustable M-bit selector, for example, the adjustable M-bit selector 1810, upon receipt of |Input|. At step 2120, a bit width of |Input|, denoted by I, a bit width of Man(|Input|), denoted by M, a bit width of Exp(Input), denoted by E, and a stride number, denoted by Stride, are obtained by the adjustable M-bit selector, for example, the adjustable M-bit selector 1810, a comparator, for example, the comparator 1820, and a step-to-exponent converter, for example, the step-to-exponent converter 1840 from a parameter database, for example, the parameter database 1850. At step 2130, it is determined, by the comparator, for example, the comparator 1820, whether a leading-1 bit of |Input| is included in the sliding window upon receipt of the leading-1 position by the adjustable M-bit selector. If so, the process 2100 proceeds to step 2160. Otherwise, the process 2100 proceeds to step 2140. At step 2140, the sliding window is slided, by the adjustable M-bit selector, to the left by a stride number of bits to select another M bits of |Input|. At step 2150, a step number, which is initiately set to 0, is incremented by the stride number, i.e., Stride, by a counter, for example, the counter 1830. Then the process 2100 returns to step 2130. At step 2160, the M-bits in the sliding window are outputted as Man(|Input|) by the comparator. At step 2170, Exp(Input) having E bits is determined and outputted by the step-to-exponent converter, for example, the step-to-exponent converter 1840. Exp(Input) is equal to a product of the stride number and the step number.

Figure 22:
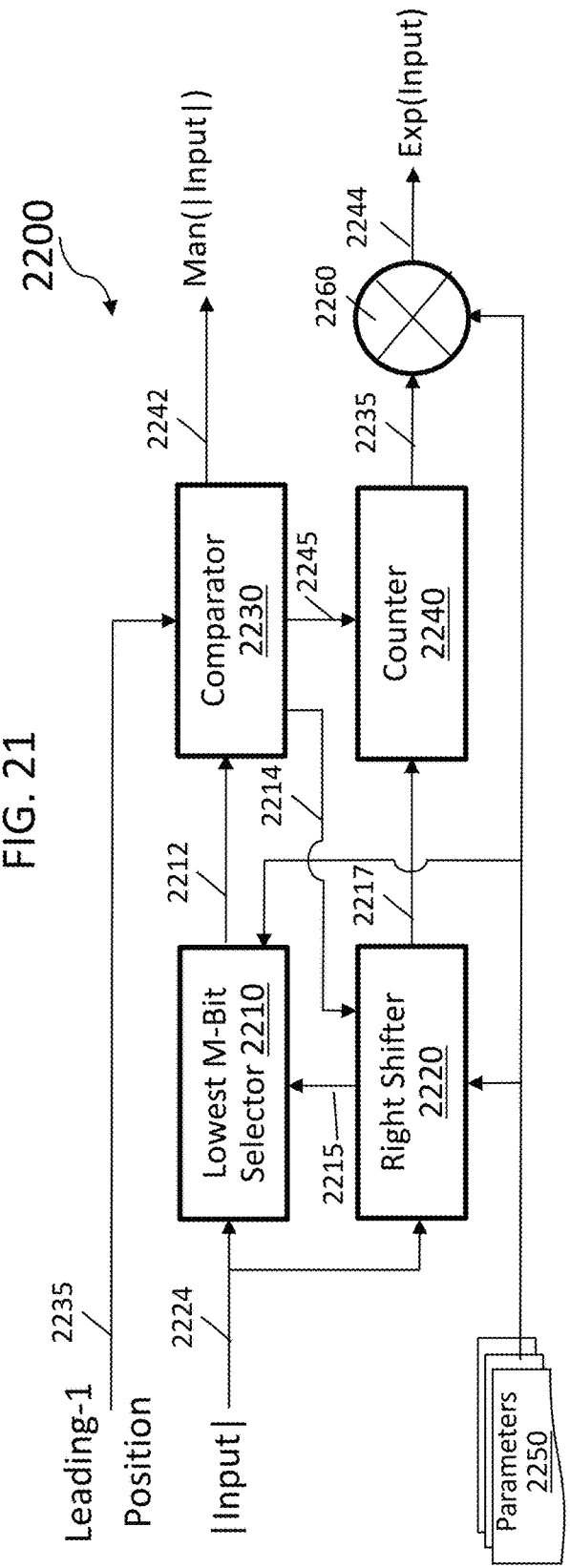
FIG. 22 is a schematic diagram of an embodiment of an exponent generator.

FIG. 22 is a schematic diagram of an embodiment of an exponent generator 2200. In an embodiment, the exponent generator 2200 is the exponent generator 840. In an embodiment, the exponent generator 2200 receives a leading-1 position 2235 and |Input| 2224, and outputs Man(|Input|) 2242, and Exp(Input) 2244. In an embodiment, the exponent generator 2200 accesses a parameter database 2250, and obtains a bit width of |Input|, denoted by I, a bit width of Man(|Input|), denoted by M, a bit width of Exp(Input), denoted by E, and a stride number, denoted by Stride, from the parameter database 2250. The bit width of |Input| 2224 is the same as the bit width of Input, the bit width of Man(|Input|) is the same as the bit width of Man(Input), and the bit width of Exp(Input) is the same as the bit width of Exp(Input). Further, Exp(Input)=Exp(|Input|). In an embodiment, the leading-1 position 2235, |Input| 2224, the parameter database 2250, Man(|Input|) 2242, and Exp(Input) 2244 are the leading-1 position 835, |Input| 822, the parameter database 850, Man(|Input|) 842, and Exp(Input) 844 in FIG. 8.

The exponent generator 2200 includes a lowest M-bit selector 2210, a right shifter 2220, a comparator 2230, a counter 2240, and a step-to-exponent converter 2260. In an embodiment, the comparator 2230, the counter 2240, and the step-to-exponent converter 2260 are substantially similar to the comparator 1820, the counter 1830, and the step-to-exponent converter 1840. The lowest M-bit selector 2210 receives |Input| 2224. The lowest M-bit selector 1810 selects the lowest (i.e., the right most) M consecutive bits of |Input| 2224. The selected lowest M-consecutive bits may be referred to as the M bits included or covered in a window. Different than the sliding window with respect to the adjustable M-bit selector 1810 in FIG. 18, the window with respect to the lowest M-bit selector 2210 is not slidable.

The lowest M-bit selector 2210 transmits the lowest (i.e., the right most) M consecutive bits 2212 included in the window to the comparator 2230. The comparator 2230 determines whether the leading-1 bit, which is the left most non-zero bit of |Input| 2224, is among the received M consecutive bits in the window based on the leading-1 position 2235. For example, the comparator 2230 may determine that the leading-1 bit is not among the received M consecutive bits in the window when the leading-1 position 2235 is greater than M. Otherwise, the comparator 2230 may determine that the leading-1 bit is among the received M consecutive bits in the window. If the leading-1 bit is not in the window, the comparator 2230 transmits a first instruction through a first communication channel 2214 to the right shifter 2220 to right shift |Input| 2224 by a number of bits equal to the stride number at a step. The comparator may also decrease the leading-1 position by a number equal to the stride number. The right shifter 2220 also transmits a second instruction through a second communication channel 2217 to the counter 2240. Upon receipt of the second instruction 2217, the counter 2240 increases a step number by 1, where the step number is initially set to 0. Upon completion of each right shift operation, the right shifter 2220 transmits the |Input| updated through the right shift operation 2215 to the lowest M-bit selector 2210, which subsequently selects the lowest (i.e., the right most) M consecutive bits 2212 of |Input| (i.e., |Input| updated through the right shift operation 2215) through the window, and transmits them to the comparator 2230. The process described above repeats until the comparator 2230 determines that the leading-1 bit is included in the window (or among the right most M consecutive bits of |Input| after one or more right shift operations), and the comparator 2230 outputs the M bits in the window as Man(|Input|) 2242. The comparator 2230 also transmits a third instruction through a third communication channel 2245 to the counter 2240 to transmit a value of the step number 2235 to the step-to-exponent converter 2260. The step-to-exponent converter 2260 determines Exp(Input) based on the step number 2235 received from the counter 2240 and the stride number received from the parameter database 2250. In an embodiment, Exp(Input) is equal to a product of the step number 2235 and the stride number. In an embodiment, the step-to-exponent converter 2260 is a short bit-width multiplier as shown in FIG. 22 performing multiplication of the step number 2235 and the stride number. In an embodiment, the step-to-exponent converter 2260 is a look-up table matcher 2670 as shown in FIG. 26. In an embodiment, the method described above performed by the various components included in the exponent generator 2200 is referred to as a right shifting method.

The stride number, denoted by Stride, is an integer no less than 1. When the stride number is equal to 1, the right shifting method is performed in a fine grain mode. In the fine grain mode, the left most bit of Man(|Input|) is the leading-1 bit. Accordingly, the highest degree of precision given M and E is achieved. Further, $E=E_{min}$. However, it may take many steps until the leading-1 bit is in the window. As such, it may take a longer time and more power for completing the right shifting method. When the stride number is greater than 1, the right shifting method is performed in a coarse grain mode. In the coarse grain mode, the left most bit of Man(|Input|) may not necessarily the leading-1 bit. In some embodiment, $E=E_{min}$. In some embodiment, $E>E_{min}$. It is likely the left most bit of Man(|Input|) is bit 0. Accordingly, the degree of precision given M and E may be, but not necessarily, compromised. However, it will take fewer steps than the fine grain mode until the leading-1 bit is in the window. As such, it will take a shorter time and less power for completing the right shifting method. With an increase of the stride number in the coarse grain mode, the degree of precision given M and E may be, but not necessarily, further compromised. However, it will take even fewer step until the leading-1 bit is in the window. And it will take a much shorter time and much less power for completing the right shifting method. As discussed in relation to FIG. 9, the stride number may be subject to change with respect to layer t, channel c, and effective coordinate (a,b) in an equivalent matrix of Input. Since Exp(Input) is a product of the stride number and the step number, Exp(Input) determined in the coarse grain mode can be represented by a representation number with a number of bit less than $E_{min}$ in the coarse grain mode. More details regarding the representation number will be discussed further in relation to FIGS. 31 and 32.

FIG. 23 illustrates a right shifting method of determining a mantissa and an exponent with respect to an absolute value of a fixed point number when a fine grain mode is on (stride=1). In this example, |Input|=0100000110000000, I=16, M=8, E=3, and Stride=1. The leading-1 bit, as indicated by an arrow labeled as leading-1, has a position number of 15 (the second bit from the left). The window includes the lowest (i.e., the right most) M=8 bits of |Input|. Since the leading-1 bit is not included in the window (this is because the leading-1 position=15>M=8), |Input| is right shifted by Stride=1 bit at step 1, and the leading-1 position is decreased by 1 when the leading-1 bit is still not in the window (this is because the leading-1 position=14>M). |Input| is continued to be right shifted by Stride=1 bit at each step until at step 7, the leading-1 bit is included in the sliding window (this is because the leading-1 position at step 7 is equal to 8, which is no longer greater than M=8). The M=8 bits included in the window after step 7, i.e., 10000011, is determined as Man(|Input|). Accordingly, Exp(Input)=Exp(|Input|)=stride number×step number=1×7=7 in decimal, which can be represented in binary as 111 as an E=3-bit exponent.

FIG. 24 illustrates a right shifting method of determining a mantissa and an exponent with respect to an absolute value of a fixed point number when a coarse grain mode is on (stride>1, for example, stride=2). In this example, |Input|=0100000110000000, I=16, M=8, E=4, and Stride=2. The leading-1 bit, as indicated by an arrow labeled as leading-1, has a position number of 15 (the second bit from the left). The window includes the lowest (i.e., the right most) M=8 bits of |Input|. Since the leading-1 bit is not included in the window (this is because the leading-1 position=15>M=8), |Input| is right shifted by Stride=2 bit at step 1, and the leading-1 position is decreased by Stride=2 bits when the leading-1 bit is still not in the window (this is because the leading-1 position=13>M). |Input| is continued to be right shifted by Stride=2 bits at each step until at step 4, the leading-1 bit is included in the sliding window (this is because the leading-1 position at step 4 is equal to 7, which is no longer greater than M=8). The M=8 bits included in the window after step 4, i.e., 01000001, is determined as Man (|Input|). Accordingly, Exp(Input)=Exp(|Input|)=stride number×step number=2×4=8 in decimal, which can be represented in binary as 1000 as an E=4-bit exponent.

Figure 25:
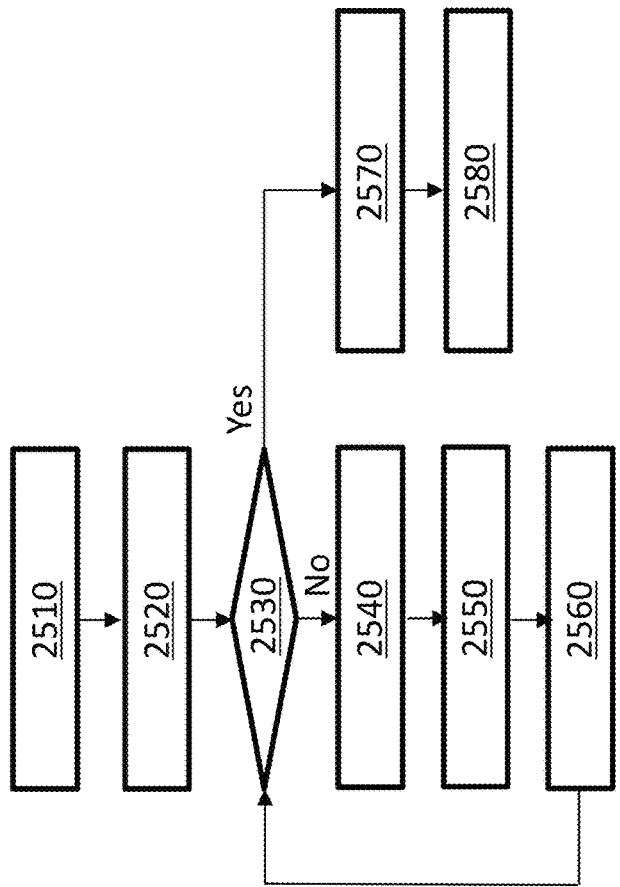
FIG. 25 is a flowchart of an exemplary process for performing a right shifting method using an exponent generator according to an embodiment of the disclosure.

FIG. 25 is a flowchart of an exemplary process 2500 for performing a right shifting method using an exponent generator according to an embodiment of the disclosure. In an embodiment, the exponent generator is the exponent generator 1800. At step 2510, the right most M bits of |Input| are selected and included in a window by an lowest M-Bit selector, for example, the lowest M-bit selector 2210, upon receipt of |Input|. At step 2520, a bit width of |Input|, denoted by I, a bit width of Man(|Input|), denoted by M, a bit width of Exp(Input), denoted by E, and a stride number, denoted by Stride, are obtained by the lowest M-bit selector, for example, the lowest M-bit selector 2210, a right shifter, for example, the right shifter 2220, a comparator, for example, the comparator 2230, and a step-to-exponent converter, for example, the step-to-exponent converter 2260 from a parameter database, for example, the parameter database 2250. At step 2530, it is determined, by the comparator, for example, the comparator 2230, whether a leading-1 bit of |Input| is included in a window selecting the lowest M bits of |Input|, for example, by determining whether a leading-1 position is greater than M, upon receipt of the leading-1 position by the lowest M-bit selector. If so, the process 2500 proceeds to step 2570. Otherwise, the process 2500 proceeds to step 2540. At step 2540, |Input| is right shifted by a number of bits equal to the stride number by the right shifter. At step 2550, the leading-1 position is decreased by the stride number by the comparator. At step 2560, a step number, which is initiately set to 0, is incremented by the strider number, i.e., Stride, by a counter, for example, the counter 2240. Then the process 2500 returns to step 2530. At step 2570, the M-bits in the window are outputted as Man(|Input|) by the comparator. At step 2580, Exp(Input) having E bits is determined and outputted by the step-to-exponent converter, for example, the step-to-exponent converter 2260. Exp(Input) is equal to a product of the stride number and the step number.

FIG. 26 is a schematic diagram of an embodiment of a step-to-exponent converter 2600. In an embodiment, the step-to-exponent converter 2600 is the step-to-exponent converter 1840, 2260. As shown in FIG. 26, the step-to-exponent converter 2600 includes a look-up table matcher 2670 and a look-up table database 2660 including a plurality of look-up tables stored in the memory. In an embodiment, the plurality of look-up tables are also referred to as mapping relationship tables, each of which at a specific set of parameter values (for example, M, E, Stride, etc.) as described in relation to FIG. 9. The look-up table matcher 2670 receives a step number 2635 from, for example, the counter 1830 in FIG. 18 or the counter 2240 in FIG. 22. The look-up table matcher 2670 further determines and outputs Exp(Input) 2644 with a bit width, E, by searching or looking up one or more look-up tables included in the look-up table database 2660 stored in the memory based on the step number 2635 and the specific set of parameters values obtained from a parameter database 2650. In an embodiment, the parameter database 2650 is the parameter databases 1850, 2250. FIG. 27 is an example look-up table in FIG. 26 when Stride=2. For example, when the step number is 2, Exp(Input)=0100 in binary according to the look-up table 2700 when E=4 and W=2.

FIG. 28 is a flowchart of an exemplary process 2800 for converting a step number to an exponent according to an embodiment of the disclosure. In an embodiment, the exemplary process 2800 is implemented by a step-to-exponent converter, for example, the step-to-exponent converter 2600. At step 2810, a step number is received by a look-up table matcher, for example, the look-up table matcher 2670. At step 2820, Exp(Input) is determined by the look-up table matcher, for example, the look-up table matcher 2670, through searching or looking up one or more look-up tables included in the look-up table database, for example, the look-up table database 2660 stored in the memory based on the step number and one or more parameters from a parameter database, for example, the parameter database 2650. The one or more parameters includes without limitation one or more parameters selected from a group consisting of E, W, and Stride. At step 2830, Exp(Input) is outputted by the look-up table matcher, for example, the look-up table matcher 2670.

FIG. 29 is a schematic diagram of an embodiment of an exponent generator 2900. In an embodiment, the exponent generator 2900 is the exponent generator 840. In an embodiment, the exponent generator 2900 receives a leading-1 position 2935 and |Input| 2924, and outputs Man(|Input|) 2942, and Exp(Input) 2944. In an embodiment, the exponent generator 2900 accesses a parameter database 2950, and obtains a bit width of |Input|, denoted by I, a bit width of Man(|Input|), denoted by M, a bit width of Exp(Input), denoted by E, and a stride number, denoted by Stride, from the parameter database 2950. The bit width of |Input| 2924 is the same as the bit width of Input, the bit width of Man(|Input|) is the same as the bit width of Man(Input), and the bit width of Exp(Input) is the same as the bit width of Exp(|Input|). Further, Exp(Input)=Exp(|Input|). In an embodiment, the leading-1 position 2935, |Input| 2924, the parameter database 2950, Man(|Input|) 2942, and Exp(Input) 2944 are the leading-1 position 835, |Input| 822, the parameter database 850, Man(|Input|) 842, and Exp(Input) 844 in FIG. 8.

Figures 30, 31, 32, 33:
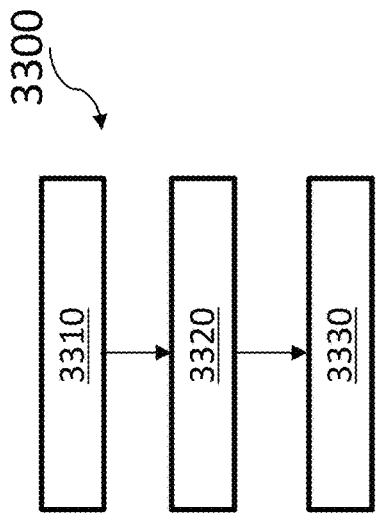
FIG. 30 is an example look-up table in FIG. 29 when stride=1.
FIG. 31 is an example look-up table in FIG. 29 when stride=2.
FIG. 32 is an example look-up table in FIG. 29 when stride=4.
FIG. 33 is a flowchart of an exemplary process for performing a look-up table method using an exponent generator according to an embodiment of the disclosure.

The exponent generator 2900 includes a lowest M-bit selector 2930, a right shifter 2920, a look-up table matcher 2910, and a look-up table database 2960. The look-up table matcher 2910 receives |Input| 2924 and/or the leading-1 position 2935. The look-up table matcher 2910 optionally receives the bit width of the mantissa, i.e., M, the bit width of the Exponent, i.e., E, and the stride number, i.e., Stride, from the parameter database 2950. The look-up tabler matcher 2910 further determines Exp(Input) by searching or looking up the look-up tables from the look-up table database 2960 based on Input 2924 and/or the leading-1 position 2935 in addition to M, E and Stride. Examples of the look-up tables 3000, 3100, 3200 included in the look-up table database 2960 are shown in FIGS. 30-32. In the look-up tables 3000, 3100, 3200, x can be either 0 or 1. Specifically, the look-up table 3000 in FIG. 30 corresponds to the fine grain mode with Stride=1, M=8, E=$E_{min}$=3, and W=2. Optionally, Each Exp(Input) has a corresponding representation number with the same bit width as Exp(Input).

The look-up tables 3100 and 3200 in FIGS. 31 and 32 correspond to the coarse grain mode both with Stride>1, M=8, E=4>$E_{min}$=3, and W=2. As shown in FIG. 31, each Exp(Input) can be represented by a corresponding representation number with a number of bits less than $E_{min}$. For example, In FIG. 31 with Stride=2, although E=4>$E_{min}$=3, Exp(Input) can be represented by a representation number having 2 bits. For example, in FIG. 32 with Stride=4, although E=4>$E_{min}$=3, Exp(Input) can be represented by a representation number having 1 bit. Compared with the fine grain mode, the coarse grain mode allows a faster and more cost and power efficient operation. However, the degree of precision is reduced accordingly with the increase of Stride. For example, in the look-up table 3000, each |Input| entry has a different Exp(Input). However, in the look-up table 3100, two different |Input| entries may have the same Exp(Input). In the look-up table 3200, four different |Input| entries may have the same Exp(Input). In the look-up tables 3100 and 3200, an |Input| entry may correspond to $2^r$|Input| values, where r is a number of x included in the |Input| entry. For example, the |Input| entry of 000001xx corresponds to $2^2$=4|Input|values because x can be either 0 or 1. In coarse grain mode, using the representation number instead of using the exponent directly may further improve the cost and power efficiency because of a reduced number of bits corresponding to Exp(Input).

Returning to FIG. 29, the look-up table matcher 2910 further transmits Exp(Input) 2912 to the right shifter 2920, and outputs Exp(Input) 2912, to for example, the mantissa generator 860 in FIG. 8. The right shifter 2920 receives Input 2924. The right shifter 2920 outputs an shifted number 2922 to the lowest M-bit selector 2930 by right shifting

|Input| 2924 by a number of bits equal to Exp(Input) 2912 upon receipt of Exp(Input) 2912. The lowest M-bit selector 2930 obtains the value of M from the parameter database 2950. The lowest M-bit selector 2930 selects and outputs the lowest (i.e., the right most) M bits of the shifted number 2922 as Man(|Input|) 2942. The method described above performed by the various components included in the exponent generator 2900 is referred to as a look-up table method.

FIG. 33 is a flowchart of an exemplary process 3300 for performing a look-up table method using an exponent generator according to an embodiment of the disclosure. In an embodiment, the exemplary process 3300 is implemented by an exponent generator, for example, the exponent generator 2900. At step 3310, Exp(Input) is determined and outputted, by a look-up table matcher, for example, the look-up table matcher 2910, by searching or looking up look-up tables from a look-up table database based on |Input| or a leading-1 position in addition to one or more parameters from a parameter database. In an embodiment, the one or more parameters includes without limitation M, E, and Stride. At step 3320, a shifted number is determined by a right shifter, for example, the right shifter 2920, by right shifting |Input| by a number of bits equal to Exp(Input). At step 3330, Man(|Input|) is determined and outputted by a lowest M-bit selector, for example, the lowest M-bit selector 2930, by selecting and outputting the lowest (i.e., the right most) M bits of the shifted number.

FIG. 34 is a schematic diagram of an embodiment of a mantissa generator 3400. In an embodiment, the mantissa generator 3400 is the mantissa generator 860. The mantissa generator 3400 includes a conditional selector 3415 and a short bit-width multiplier 3420. In an embodiment, the conditional selector 3415 is the conditional selector 1100 in FIG. 11A. The conditional selector 3415 receives Sign (Input) 3414 from, for example, the bit sampler 810. The conditional selector 3415 outputs a selection number 3415 to the short bit-width multiplier 3420 based on Sign(Input) 3414. Specifically, the selection number 3415 has a value of 1 when Sign(Input)=0, and the selection number 3415 has a value of −1 when Sign(Input)=1.

The short bit-width multiplier 3420 performs and outputs a product of the selection number 3415 and Man(|Input|) 3405 as Man(Input). Further, Man(Input)=Man(|Input|) when Sign(Input)=0. Man(Input) is the two's complement of Man(|Input|) when Sign(Input)=1.

FIG. 35A illustrates an example of determining a mantissa of a fixed point number, i.e., Man(Input), based on a sign of the fixed point number, i.e., Sign(Input), and a mantissa of an absolute value of the fixed point number, i.e., Man (|input|). In this example, Input is a positive number because Sign(Input)=0. Accordingly, the selection number 3415 is equal to 1, and Man(Input)=Man(|Input|).

FIG. 35B illustrates another example of determining a mantissa of a fixed point number, i.e., Man(Input), based on a sign of the fixed point number, i.e., Sign(Input), and a mantissa of an absolute value of the fixed point number, i.e., Man(|input|). In this example, Input is a negative number because Sign(Input)=1. Accordingly, the selection number 3415 is equal to −1, and Man(Input)=−Man(|Input|). In binary (W=2, i.e., a base-2 numeral system), Man(Input) is a two's complement of Man(|Input|).

FIG. 36 is a flowchart of an exemplary process 3600 for determining a mantissa of a fixed point number, i.e., Man (Input), using a mantissa generator according to an embodiment of the disclosure. In an embodiment, the exemplary process 3600 is implemented by the mantissa generator, for example, the mantissa generator 3400. At step 3610, a selection number is determined and outputted by a conditional selector, for example, the conditional selector 3410, to a short bit-width multiplier, for example, the short bit-width multiplier 3420 upon receipt of Sign(Input). When Sign (Input)=0, the selection number is equal to 1. When Sign (Input)=1, the selection number is equal to −1. At step 3620, Man(Input) is determined and outputted by the short bit-width multiplier, for example, the short bit-width multiplier 3420 upon receipt of Man(|Input|) and the selection number, by for example, performing multiplication of the selection number and Man(|Input|). In an embodiment, Man(Input) is a product of the selection number and Man(|Input|).

Figure 37:
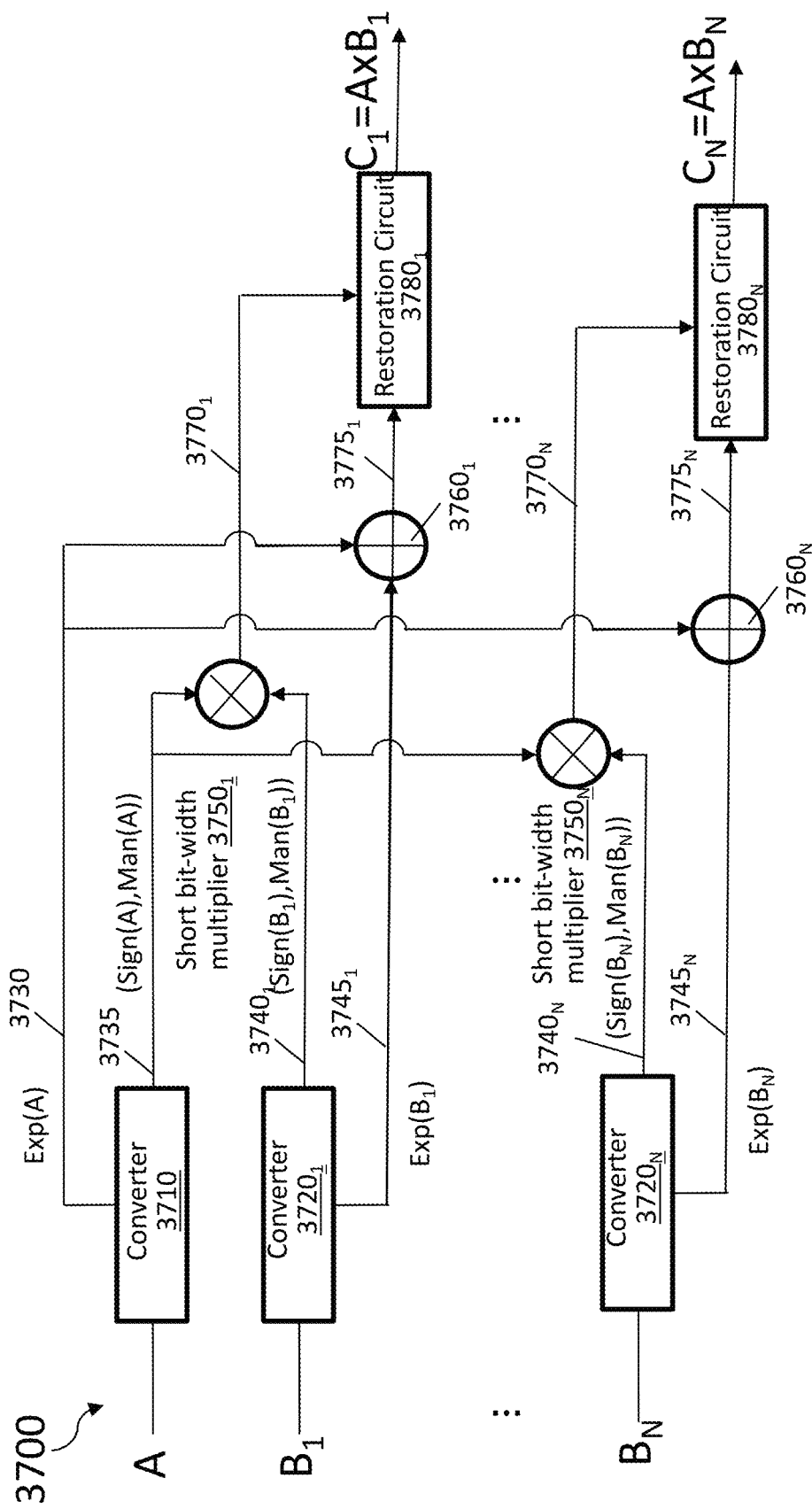
FIG. 37 is a schematic diagram of an embodiment of a multiplier for performing in parallel a plurality of multiplications involving a shared long bit-width fixed point number according to an embodiment of the disclosure.

FIG. 37 is a schematic diagram of an embodiment of a multiplier 3700 for performing in parallel a plurality of multiplications involving a shared long bit-width fixed point number according to an embodiment of the disclosure. The multiplier 3700 receives a plurality of fixed point numbers denoted by A, $B_1, B_2, \ldots, B_N$, where N is an integer greater than 1. A is the shared long bit-width fixed point number. The multiplier 3700 performs in parallel N multiplications, including $A \times B_1, A \times B_2, \ldots, A \times B_N$. The multiplier 3700 further outputs N multiplication results, including $C_1 = A \times B_1, C_2 = A \times B_2, \ldots, C_N = A \times B_N$. In an embodiment, $C_{1, 2, \ldots, N}$ are fixed point numbers.

As shown in FIG. 37, the multiplier 3700 includes a first converter 3710, and N second converters $3720_{1, 2, \ldots, N}$. In an embodiment, the first converter 3710 is the first converter 510 in FIG. 5B, and each of the second converters $3720_{1, 2, \ldots, N}$ is the second converter 520. In an embodiment, the first converter 3710 is substantially similar to each of the second converters $3720_{1, 2, \ldots, N}$. The first converter 3710 converts A to an exponent of A, denoted by Exp(A) 3730, and a combination of an sign of A and a mantissa of A, denoted by (Sign(A), Man(A)) 3735. In an embodiment, Sign(A) is concatenated to the left of Man(A) in the combination (Sign(A), Man(A)) 3735. Each second converter, denoted by $3720_i$, of the N second converters $3720_{1, 2, \ldots, N}$ $(0 \le i \le N)$, converts $B_i$ to an exponent of $B_i$, denoted by $Exp(B_i)$ $3745_i$, and a combination of an sign of $B_i$ and a mantissa of $B_i$, denoted by $(Sign(B_i), Man(B_i))$ $3740_i$. In an embodiment, for each fixed point number $B_i$, $Sign(B_i)$ is concatenated to the left of $Man(B_i)$ in the combination $(Sign(B_i), Man(B_i))$ $3740_i$.

The multiplier 3700 further includes N short bit-width multipliers $3750_{1, 2, \ldots, N}$, N adders $3760_{1, 2, \ldots, N}$, and N restoration circuit $3780_{1, 2, \ldots, N}$. Each short bit-width multiplier, denoted by $3750_i$, of the N short bit-width multipliers $3750_{1, 2, \ldots, N}$, performs a multiplication of (Sign(A),Man(A)) 3735 and $(Sign(B_i), Man(B_i))$ $3740_i$ resulting in $(Sign(A), Man(A)) \times (Sign(B_i), Man(B_i))$ $3770_i$. Each adder, denoted by $3760_i$, of the N adders $3760_{1, 2, \ldots, N}$, perform a summation of Exp(A) 3730 and $Exp(B_i)$ $3745_i$ resulting in $(Exp(A)+Exp(B_i))$ $3775_i$. Each restoration circuit, denoted by $3780_i$, of the N restoration circuit $3780_{1, 2, \ldots, N}$, perform a left shift operation resulting in $C_i = A \times B_i$ by left shifting $(Sign(A), Man(A)) \times (Sign(B_i), Man(B_i))$ $3770_i$ by a number of bits equal to $(Exp(A)+Exp(B_i))$ $3775_i$. In an embodiment, each short bit-width multiplier $3750_i$ is the short bit-width multiplier 550 in FIG. 5B. In an embodiment, each adder $3760_i$ is the adder 560 in FIG. 5B. In an embodiment, each restoration circuit $3780_i$ is the restoration circuit 580 in FIG. 5B. In an embodiment, each restoration circuit $3780_i$ is a left shifter.

FIG. 38 is a schematic diagram of an embodiment of a multiplier 3800. In an embodiment, the multiplier 3800 is the multiplier 455 in FIG. 4. The multiplier 3800 performs multiplication of a first fixed point number 3802, denoted by A, and a second fixed point number 3804, denoted by B, and output the multiplication result 3885, denoted by C=A×B. As shown in FIG. 1, for example, the first fixed point number A 3802 is associated with a pixel from one of the p channels of input feature maps at layer t, and the second fixed point number B 3804 is associated with a filter from one of the p channels of filters at layer t. At least one of A and B is a long bit-width fixed point number. In an embodiment, both A and B are long bit-width fixed point numbers. For example, both A and B are 16-bit fixed point numbers. For example, A is a 16-bit fixed point number, and B is a 14-bit fixed point number.

The multiplier 3800 includes a first converter 3810. The first converter 3810 receives the first fixed point number A 3802 and converts A 3802 to a first exponent, denoted by Exp(A) 3830, a first mantissa, denoted by Man(|A|) 3835, and a first sign, denoted by Sign(A) 3837. Man(|A|) is a mantissa of |A|, where |A| means an absolute value of A 3802. A bit width of Exp(A) 3830, a bit width of Man(A) 3835, and a bit width of Sign(A) 3837 are dynamically configured as described in details in relation to FIG. 9. The bit width of Man(|A|) 3835 is equal to a bit width of Man(A), which means a mantissa of A 3802. The bit width of Exp(|A|) 3830 is equal to a bit width of Exp(|A|), which means an exponent of |A|.

The multiplier 505 further includes a second converter 3820. In an embodiment, the second converter 3820 is substantially similar to the first converter 3810. The second converter 3820 receives the second fixed point number B 3804 and converts B 3804 to a second exponent, denoted by Exp(B) 3845, a second mantissa, denoted by Man(|B|) 3840, and a second sign, denoted by Sign(B) 3847. Man(|B|) 3840 is a mantissa of |B|, where |B| means an absolute value of B 3804. A bit width of Exp(B) 3845, a bit width of Man(|B|) 3840, and a bit width of Sign(B) 3847 are dynamically configured as described in details in relation to FIG. 9. The bit width of Man(|B|) 3840 is equal to a bit width of Man(B), which means a mantissa of B 3804. The bit width of Exp(B) 3845 is equal to a bit width of Exp(|B|), which means an exponent of |B|.

The multiplier 3800 further includes a short bit-width multiplier 3870, an adder 3860, and a restoration circuit 3880. In an embodiment, the short bit-width multiplier 3870 is an unsigned multiplier, which means the left most bit ((i.e., the most significant bit, or MSB) of any input or an output of the short bit-width multiplier 3870 is not a sign bit. In other words, the left most bit of any input or the output of the short bit-width multiplier 3870 suggests neither a positive sign nor a negative sign. In an embodiment, the short bit-width multiplier 3870 assumes each of the inputs and the output of the short bit-width multiplier 3870 is a non-negative number.

The short bit-width multiplier 3870 performs a multiplication of Man(A) 3835 and Man(|B|) 3840 resulting in (Man(|A|)×Man(|B|)) 3870. The adder 3860 performs a summation of Exp(A) 3830 and Exp(B) 3845 resulting in (Exp(A)+Exp(B)) 3875. The restoration circuit 3880 performs operation resulting in C=A×B 3885 based on Sign(A) 3837, Sign(B) 3847, (Man(|A|)×Man(|B|)) 3870, and (Exp(A)+Exp(B)) 3875. Mathematically, C can be expressed by:

$$C = (-1)^{Sign(A)\ XOR\ Sign(B)}(\text{Man}(|A|) \times \text{Man}(|B|)) \times W(A)^{Exp(A)} \times W(B)^{Exp(B)} \quad (5)$$

where W(A) is a base number of A, and W(B) is a base number of B. For example, W(A)=2 when A is a binary number, and W(B)=2 when B is a binary number. Sign(A) XOR Sign(B)=1 when Sign(A) is not equal to Sign(B). Sign(A) XOR Sign(B)=0 when Sign(A) is equal to Sign(B).

When W(A)=W(B)=W, C can be expressed by:

$$C = (-1)^{Sign(A)\ XOR\ Sign(B)} \times (\text{Man}(|A|) \times \text{Man}(|B|)) \times W^{Exp(A)+Exp(B)} \quad (6)$$

Figure 39:
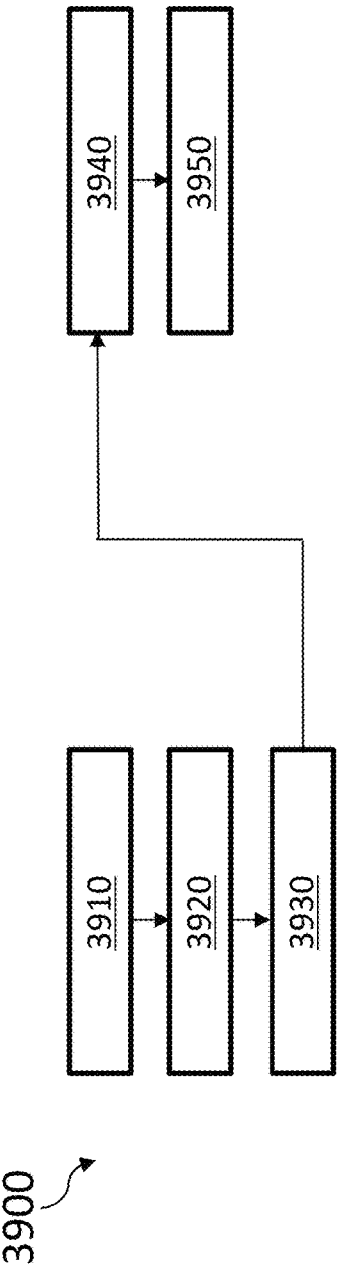
FIG. 39 is a flowchart of an exemplary process for performing multiplication of two long bit-width fixed point numbers using a multiplier according to an embodiment of the disclosure.

FIG. 39 is a flowchart of an exemplary process 3900 for performing multiplication of two long bit-width fixed point numbers using a multiplier according to an embodiment of the disclosure. In an embodiment, the multiplier is the multiplier 3800. In an embodiment, the exemplary process 3900 is performed by the multiplier 3800. At step 3910, Sign(A), Exp(A), Man(|A|) are determined upon receipt of A by a first converter, for example, the first converter 3810. In an embodiment, A is a first fixed point number. At step 3920, Sign(B), Exp(B), Man(|B|) are determined upon receipt of B by a second converter, for example, the second converter 3820. In an embodiment, B is a second fixed point number. In an embodiment, the first converter is the same as the second converter. At step 3930, (Man(|A|)×Man(|B I)) is calculated upon receipt of Man(|A|) and Man(|B|) by a short bit-width multiplier, for example, the short bit-width multiplier 3850. At step 3940, (Exp(A)+Exp(B)) is calculated upon receipt of Exp(A) and Exp(B) by an adder, for example, the adder 3860. At step 3950, a product C=A×B is determined and outputted by a restoration circuit, for example, the restoration circuit 3880 based on Sign(A), Sign(B), (Exp(A) and Exp(B)), and (Man(|A|)×Man(|B|)).

Figure 40:
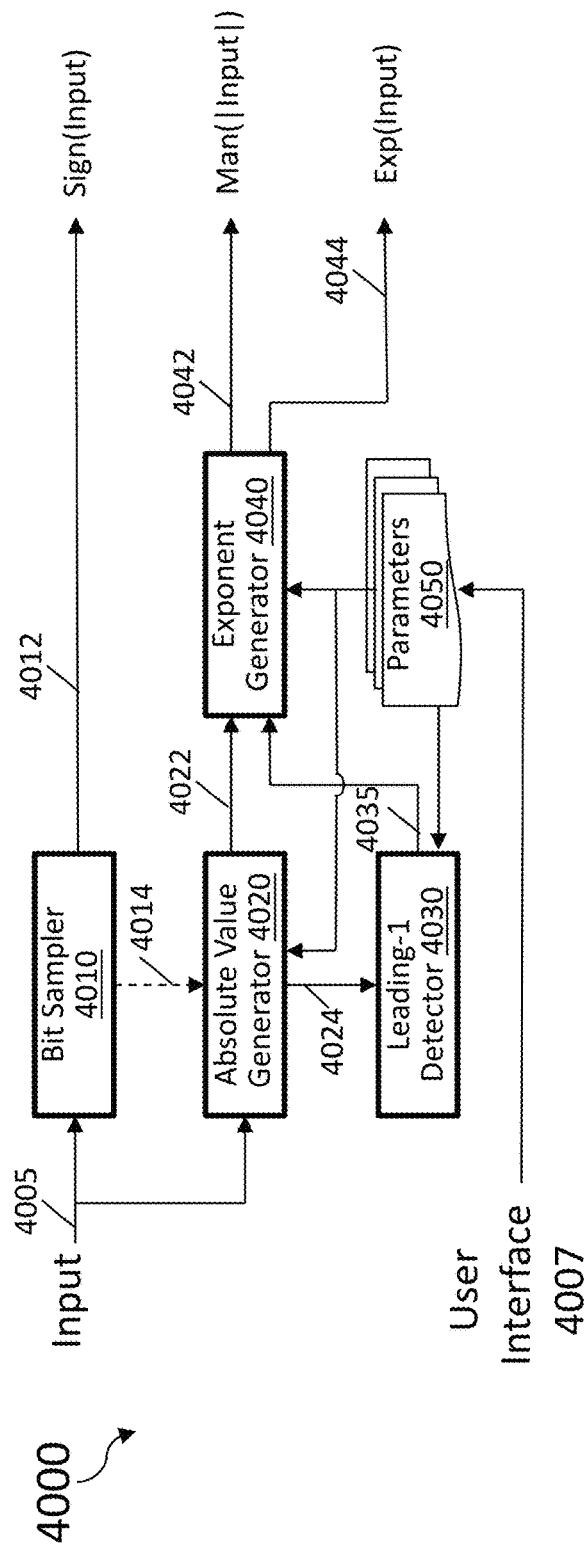
FIG. 40 is a schematic diagram of an embodiment of a converter.

FIG. 40 is a schematic diagram of an embodiment of a converter 4000. In an embodiment, the converter 4000 is the first converter 3810. In an embodiment, the converter 4000 is the second converter 3820. As shown, the converter 4000 includes a bit sampler 4010, an absolute value generator 4020, a leading-1 detector 4030, an exponent generator 4040, and a parameter database 4050. The converter 4000 is coupled to a user interface 4007. The converter 4012 receives a fixed point number, denoted by Input 4005. In an embodiment, the fixed point number is a long bit-width fixed point number. The converter 4000 further outputs Sign (Input) 4012, Man(|Input|) 4042, and Exp(Input) 4044, where Sign(Input) 4012 is a sign of input 4005, Man (|Input|)) 4042 is a mantissa of an absolute value of Input 4005, and Exp(Input) 4044 is an exponent of Input 4005.

In an embodiment, the converter 4000 is the converter 800 excluding the mantissa generator 860 and the multiplexer 870 in FIG. 8. In an embodiment, Input 4005, the user interface 4007, the bit sampler 4010, the absolute value generator 4020, the leading-1 detector 4030, the exponent generator 4040, the parameter database 4050, Sign(Input) 4012, Man(|Input|) 4042, and Exp(Input) 4044 are the same as, or substantially similar to, Input 805, the user interface 807, the bit sampler 810, the absolute value generator 820, the leading-1 detector 830, the exponent generator 840, the parameter database 850, Sign(Input) 812, Man(|Input|) 842, and Exp(Input) 844. The parameter database 4050 includes one or more parameters, as discussed in great detail in FIG. 9. The parameter database 4050 may be updated through the user interface 4007. In an embodiment, at least a portion of the one or more parameters included in the parameter database 4050 are determined, uploaded, and/or updated by a user or a programmer through the user interface 4007 before or during operation of the converter 4000. In an embodiment, at least a portion of the one or more parameters included in the parameter database 4050 are determined, uploaded, and/or updated through the user interface 4007 by executing a computer algorithm on a host computer before or during operation of the converter 4000. In an embodiment, the host computer is the host 4750 in FIG. 47. The bit sampler 4014 determines and outputs Sign(Input) 4012, 4014 upon receipt of Input 4005. Sign(Input) 4012 is the left most bit of Input 4005. The absolute value generator 4020 determines and outputs an absolute value 4022, 4024 of Input 4005 upon receipt of Input 4005. The leading-1 detector 4030 determines a leading-1 position 4035 and outputs the leading-1 position to the exponent generator 4040 based on |Input| 4024 and one or more parameters from the parameter database 4050. The one or more parameters include without limitation a bit width of Man(Input), a bit width of Exp(Input) 4044 and a stride number. The bit width of Man(Input) is equal to a bit width of Man(|Input|) 4042. The bit width of Exp(Input) 4044 is equal to a bit width of Exp(|Input|). The exponent generator 4040 determines and outputs Man(|Input|) 4042 and Exp(Input) 4044 based on one or more parameters from the parameter database 4050, the leading-1 position 4035 and |Input| 4022 using, for example, the sliding window method, the right shifting method, or the look-up table method as described above.

Figure 41:
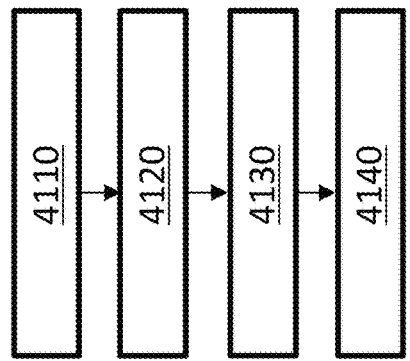
FIG. 41 is a flowchart of an exemplary process for converting a long bit-width fixed point number using a converter according to an embodiment of the disclosure.

FIG. 41 is a flowchart of an exemplary process 4100 for converting a long bit-width fixed point number using a converter according to an embodiment of the disclosure. In an embodiment, the long bit-width number is denoted by Input. In an embodiment, the converter is the converter 4000. In an embodiment, the exemplary process 4100 is implemented by the converter, for example, the converter 4000. At step 4110, Sign(Input) is determined and outputted upon receipt of Input by a bit sampler, for example, the bit sampler 4010. In an embodiment, Sign(Input) is the left most bit of Input. At step 4120, an absolute value of Input, denoted by |Input| is determined upon receipt of Input by an absolute value generator, for example, the absolute value generator 4020. At step 4130, a leading-1 position of |Input| is determined and transmitted to an exponent generator, for example, the exponent generator 4040, by a leading-1 detector, for example, the leading-1 position 4030, based on |Input| and one or more parameters from a parameter database, for example, the parameter database 4050. The one or more parameters include without limitation a bit width of Man(Input), a bit width of Exp(Input) and a stride number. The bit width of Man(Input) is equal to a bit width of Man(|Input|). The bit width of Exp(Input) is equal to a bit width of Exp(|Input|). At step 4140, Man(|Input|) and Exp(Input) are determined and outputted by the exponent generator, for example, the exponent generator 4040, based on one or more parameters from the parameter database, for example, the parameter database 4050, the leading-1 position and |Input| using, for example, the sliding window method, the right shifting method, or the look-up table method as described above.

Figures 42A, 43A:
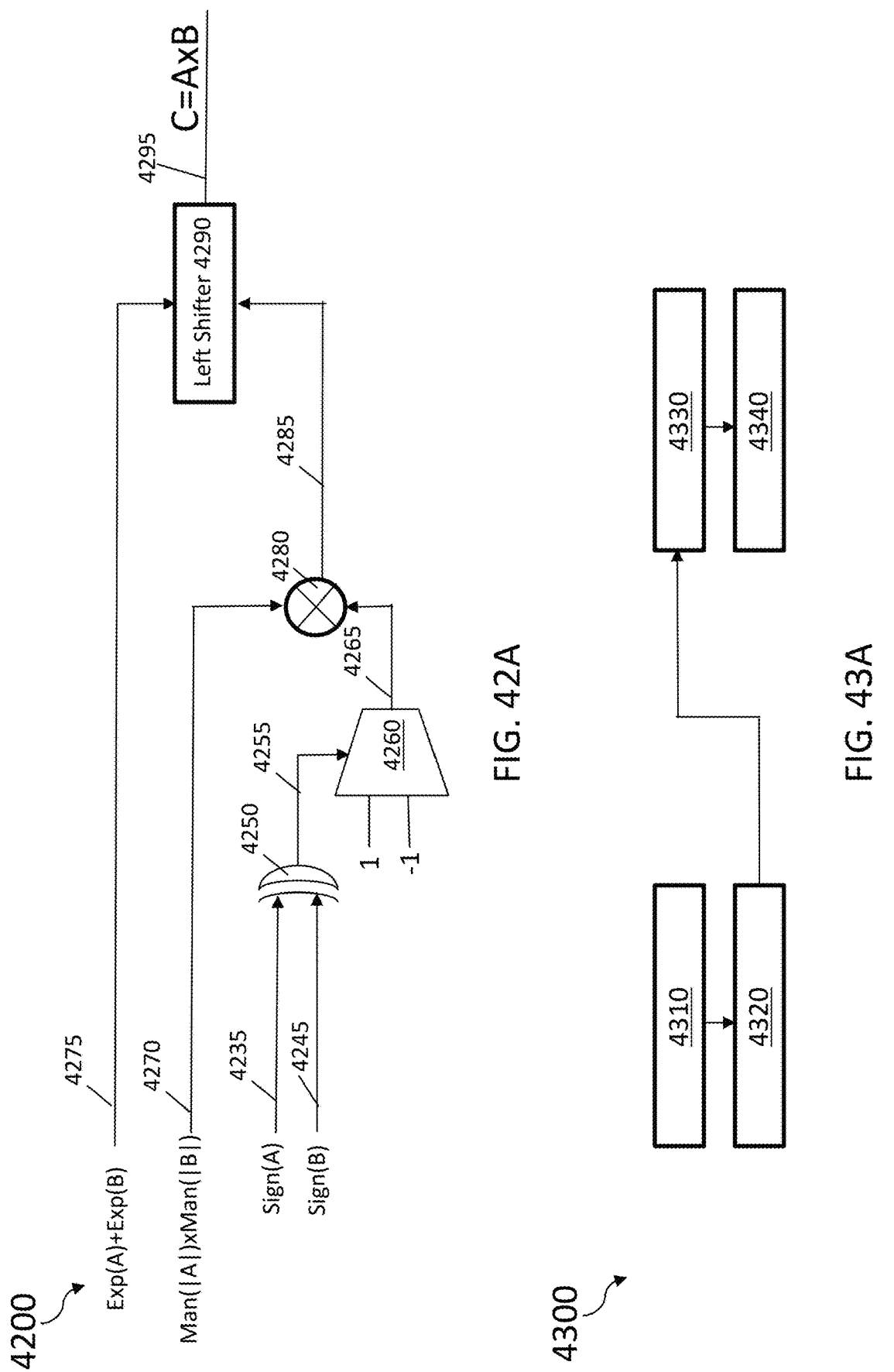
FIG. 42A is a schematic diagram of an embodiment of a restoration circuit.
FIG. 43A is a flowchart of an exemplary process for generating a result of multiplying two long bit-width fixed point numbers using a restoration circuit according to an embodiment of the disclosure.

FIG. 42A is a schematic diagram of an embodiment of a restoration circuit 4200. In an embodiment, the restoration circuit 4200 is the restoration circuit 3880 in FIG. 38. As shown, the restoration circuit 4200 includes an XOR gate 4250, a conditional selector 4260, a short bit-width multiplier 4280, and a left shifter 4290. The XOR gate 4250 receives Sign(A) 4235 and Sign(B) 4245, and outputs a selection number 4255 equal to Sign(A) 4235 XOR Sign(B) 4245. The selection number 4255 is 1 when Sign(A) 4235 is different than Sign(B) 4245, and the selection number 4255 is 0 when Sign(A) 4235 is the same as Sign(B) 4245. In an embodiment, the XOR gate 4250 is replaced by a one-bit adder (not shown), which is used to perform a summation of Sign(A) 4235 and Sign(B) 4245 and only outputs the right most bit of the summation as the selection number 4255. The conditional selector 4260 receives the selection number 4255 and outputs a selected number 4265 based on the selection number 4255. Specifically, when the selection number 4255 is equal to 1, the selected number 4265 is equal to −1. When the selection number 4255 is equal to 0, the selected number 4265 is equal to 1. In an embodiment, the selected number 4265 is also referred to as a sign value. In an embodiment, the selection number 4255 is also referred to as an XOR bit.

In an embodiment, the short bit-width multiplier 4280 is a signed multiplier. In an embodiment, the short bit-width multiplier 4280 receives Man(|A|)×Man(|B|) 4270 and the selected number 4265. The short bit-width multiplier 4280 further determines an adjusted number 4285 by performing a multiplication of Man(|A|)×Man(|B|) 4270 and the selected number 4265. The short bit-width multiplier 4280 further transmits the adjusted number 4285 to the left shifter 4290. The left shifter 4290 receives the adjusted number 4285 and (Exp(A)+Exp(B)) 4275 and outputs C=A×B 4295 by left shifting the adjusted number 4285 by a number of bits equal to (Exp(A)+Exp(B)) 4275.

Figure 42B:
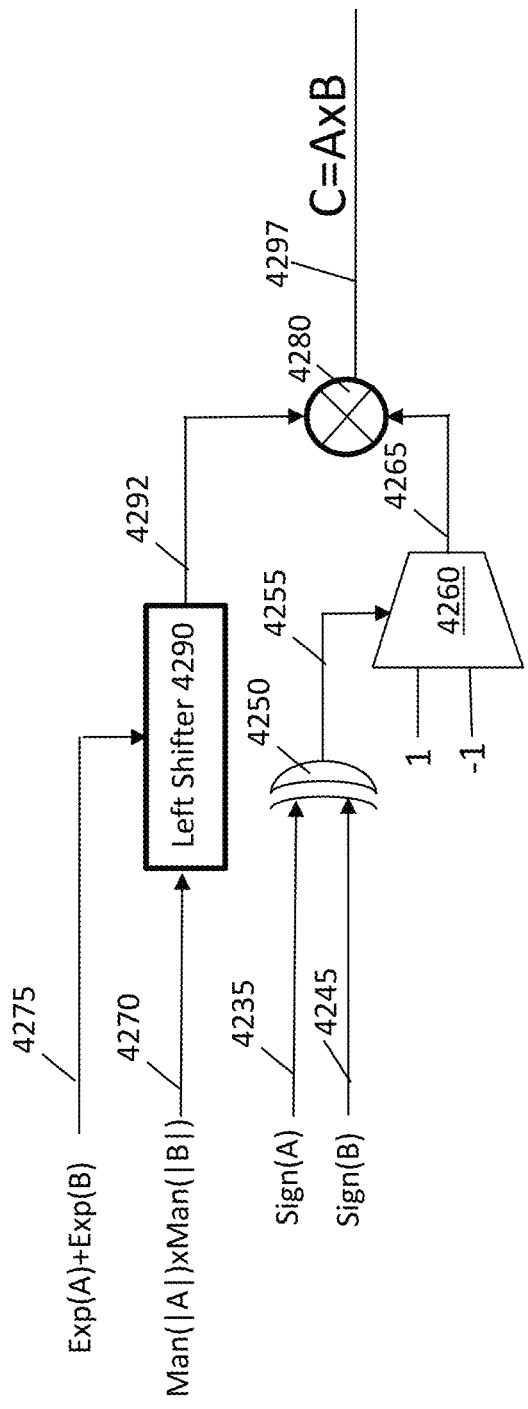
FIG. 42B is a schematic diagram of an embodiment of a restoration circuit.

FIG. 42B is a schematic diagram of an embodiment of a restoration circuit 4205. In an embodiment, the restoration circuit 4205 is the restoration circuit 3880 in FIG. 38. Similar to restoration circuit 4205, the restoration circuit 4200 includes the XOR gate 4250, the conditional selector 4260, the short bit-width multiplier 4280, and the left shifter 4290. However, the various components in the restoration circuit 4205 are arranged in a different manner than those in the restoration circuit 4200.

Similar to that in the restoration circuit 4200, the conditional selector 4260 determines the selected number 4265 and outputs the selected number 4265 to the short bit-width multiplier 4280 based on the selection number 4255, which is generated by performing XOR operation of Sign(A) 4235 and Sign(B) 4245 resulting in the selection number 4255 being equal to Sign (A) 4235 XOR Sign(B) 4245. The selection number 4255 is 1 when Sign(A) 4235 is different than Sign(B) 4245, and the selection number 4255 is 0 when Sign(A) 4235 is the same as Sign(B) 4245. In an embodiment, the XOR gate 4250 may be replaced by a one-bit adder (not shown), which performs a summation of Sign(A) 4235 and Sign(B) 4245 and only outputs the right most bit of the summation as the selection number 4255 as described in relation to FIG. 42A.

Different than that in the restoration circuit 4200, the left shifter 4290 receives (Exp(A)+Exp(B)) 4275 and Man(|A|)× Man(|B|) 4270. The left shifter 4290 further determines and transmits to the short bit-width multiplier 4280 a shifted number 4292 by left shifting Man(|A|)×Man(|B|) 4270 by a number of bits equal to (Exp(A)+Exp(B)) 4275. The short bit-width multiplier 4280 further determines and outputs C=A×B 4297 by performing a multiplication of the shifted number 4292 and the selected number 4265.

FIG. 43A is a flowchart of an exemplary process 4300 for generating a result of multiplying two long bit-width fixed point numbers using a restoration circuit according to an embodiment of the disclosure. In an embodiment, the restoration circuit is the restoration circuit 4200 in FIG. 42A. In an embodiment, the two long bit-width fixed point numbers are denoted by A and B, respectively. The result of multiplying the two long bit-width fixed point numbers is denoted by C=A×B. In an embodiment, the exemplary process 4300 is implemented by the restoration circuit 4200.

At step 4310, a selection number is determined and outputted upon receipt of Sign(A) and Sign(B). In an embodiment, the selection number is determined and outputted by an XOR gate, for example, the XOR gate 4250. In an embodiment, the selection number is equal to Sign(A) XOR Sign(B). The selection number is 1 when Sign(A) is different than Sign(B), and the selection number is 0 when Sign(A) is the same as Sign(B). In an embodiment, the selection number is determined and outputted by a one-bit adder, which is used to perform a summation of Sign(A) and Sign(B) and only outputs the right most bit of the summation as the selection number.

At step 4320, a selected number is determined based on the selection number and outputted by a conditional selector, for example, the conditional selector 4260 upon receipt of the selection number. Specifically, when the selection number is equal to 1, the selected number is equal to −1. When the selection number is equal to 0, the selected number is equal to 1.

At step 4330, an adjusted number is determined by performing a multiplication of Man(A)×Man(B|) and the selected number and transmitted to a left shifter, for example, the left shifter 4290 upon receipt of Man(A)×Man (B|) by the short bit-width multiplier, for example, the short bit-width multiplier 4280. In an embodiment, the short bit-width multiplier is a signed multiplier.

At step 4340, C=A×B is determined and outputted upon receipt of the adjusted number and (Exp(A)+Exp(B)) by left shifting the adjusted number by a number of bits equal to (Exp(A)+Exp(B)), by the left shifter, for example, the left shifter 4290.

Figure 43B:
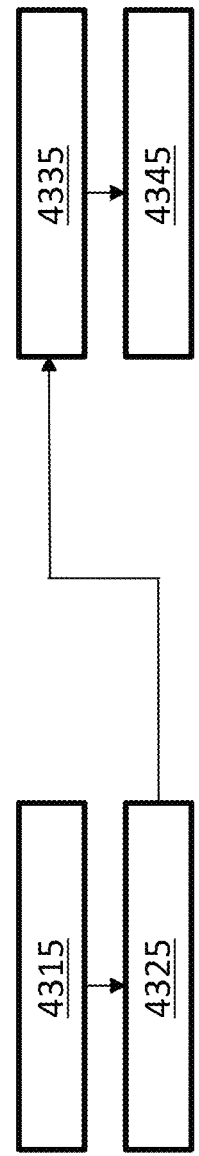
FIG. 43B is a flowchart of an exemplary process for generating a result of multiplying two long bit-width fixed point numbers using a restoration circuit according to an embodiment of the disclosure.

FIG. 43B is a flowchart of an exemplary process 4305 for generating a result of multiplying two long bit-width fixed point numbers using a restoration circuit according to an embodiment of the disclosure. In an embodiment, the restoration circuit is the restoration circuit 4205 in FIG. 42B. In an embodiment, the two long bit-width fixed point numbers are denoted by A and B, respectively. The result of multiplying the two long bit-width fixed point numbers is denoted by C=A×B. In an embodiment, the exemplary process 4305 is implemented by the restoration circuit 4205.

At step 4315, a selection number is determined and outputted upon receipt of Sign(A) and Sign(B). In an embodiment, the selection number is determined and outputted by an XOR gate, for example, the XOR gate 4250. In an embodiment, the selection number is equal to Sign(A) XOR Sign(B). The selection number is 1 when Sign(A) is different than Sign(B), and the selection number is 0 when Sign(A) is the same as Sign(B). In an embodiment, the selection number is determined and outputted by a one-bit adder, which is used to perform a summation of Sign(A) and Sign(B) and only outputs the right most bit of the summation as the selection number.

At step 4325, a selected number is determined based on the selection number and outputted by a conditional selector, for example, the conditional selector 4260 upon receipt of the selection number. Specifically, when the selection number is equal to 1, the selected number is equal to −1. When the selection number is equal to 0, the selected number is equal to 1. In an embodiment, the selected number is also referred to as a sign value.

At step 4335, a shifted number is determined and transmitted to a short bit-width multiplier, for example, the short bit-width multiplier 4280 by a left shifter, for example, the left shifter 4290 upon receipt of (Exp(A)+Exp(B)) and Man(|A|)×Man(|B|) by left shifting Man(|A|)×Man(|B|) by a number of bits equal to (Exp(A)+Exp(B)).

At step 4345, C=A×B is determined and outputted by performing a multiplication of the shifted number and the selected number by the short bit-width multiplier, for example, the short bit-width multiplier 4280.

Figure 44:
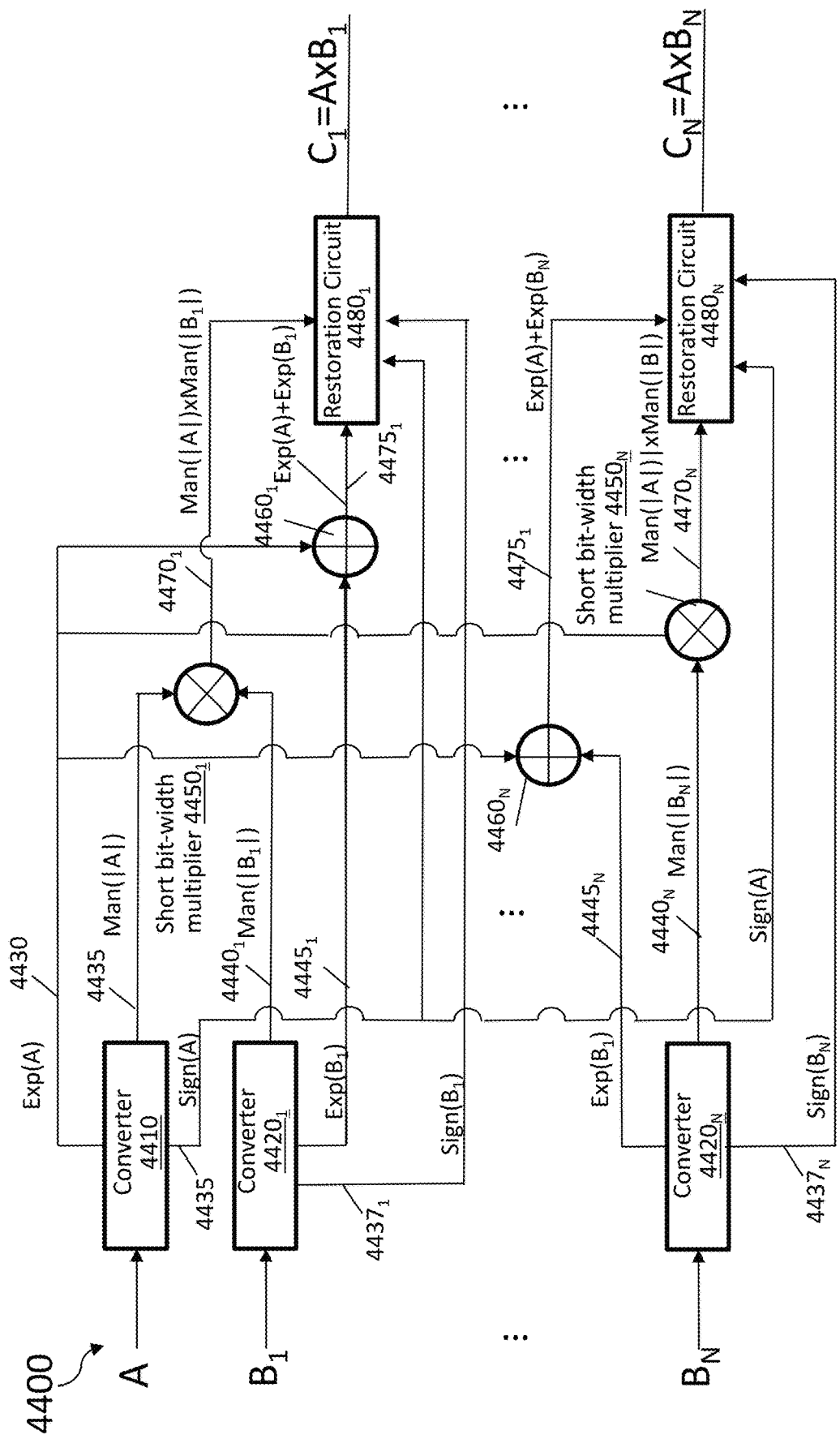
FIG. 44 is a schematic diagram of an embodiment of a multiplier for performing in parallel a plurality of multiplications involving a shared long bit-width fixed point number according to an embodiment of the disclosure.

FIG. 44 is a schematic diagram of an embodiment of a multiplier 4400 for performing in parallel a plurality of multiplications involving a shared long bit-width fixed point number according to an embodiment of the disclosure. The multiplier 4400 receives a plurality of fixed point numbers denoted by A, $B_1, B_2, \ldots, B_N$, where N is an integer greater than 1. A is the shared long bit-width fixed point number. The multiplier 4400 performs in parallel N multiplications, including $A \times B_1, A \times B_2, \ldots, A \times B_N$. The multiplier 4400 further outputs N multiplication results, including $C_1 = A \times B_1, C_2 = A \times B_2, \ldots, C_N = A \times B_N$. In an embodiment, $C_{1, 2, \ldots, N}$ are fixed point numbers.

As shown in FIG. 44, the multiplier 4400 includes a first converter 4410, and N second converters $4420_{1, 2, \ldots, N}$. In an embodiment, the first converter 4410 is the first converter 3810 in FIG. 38, and each of the second converters $4420_{1, 2, \ldots, N}$ is the second converter 3820. In an embodiment, the first converter 4410 is substantially similar to each of the second converters $4420_{1, 2, \ldots, N}$. The first converter 4410 converts A to an exponent of A, denoted by Exp(A) 4430, a mantissa of an absolute value of A, denoted by Man(|A|) 4435, and a sign of A, denoted by Sign(A) 4435. Each second converter, denoted by $4420_i$, of the N second converters $4420_{1, 2, \ldots, N}$ (0≤i≤N), converts $B_i$ to an exponent of $B_i$, denoted by $Exp(B_i)$ 4445$_i$, a mantissa of an absolute value of $B_i$, denoted by $Man(|B_i|)$ 4440$_i$, and a sign of $B_i$, denoted by $Sign(B_i)$ 4437$_i$.

The multiplier 4400 further includes N short bit-width multipliers $4450_{1, 2, \ldots, N}$, N adders $4460_{1, 2, \ldots, N}$, and N restoration circuit $4480_{1, 2, \ldots, N}$. Each short bit-width multiplier, denoted by $4450_i$, of the N short bit-width multipliers $4450_{1, 2, \ldots, N}$, performs a multiplication of Man(|A|) 4435 and $Man(|B_i|)$ 4440$_i$ resulting in $(Man(A) \times Man(|B_i|))$ 4470$_i$. Each adder, denoted by $4460_i$, of the N adders $4460_{1, 2, \ldots, N}$, performs a summation of Exp(A) 4430 and $Exp(B_i)$ 4445$_i$ resulting in $(Exp(A)+Exp(B_i))$ 4475$_i$. Each restoration circuit, denoted by $4480_i$, of the N restoration circuit $4480_{1, 2, \ldots, N}$, performs operation resulting in $C_i = A \times B_i$ based on Sign(A) 4035, $Sign(B_i)$ 4437$_i$, $(Man(A) \times Man(|B_i|))$ 4470$_i$, and $(Exp(A)+Exp(B_i))$ 4475$_i$. In an embodiment, each short bit-width multiplier $4450_i$ is the short bit-width multiplier 3850 in FIG. 38. In an embodiment, each adder $4460_i$ is the adder 3860 in FIG. 38. In an embodiment, the restoration circuit $4480_i$ is the restoration circuit 3880 in FIG. 38. In an embodiment, the restoration circuit $4480_i$ is the restoration circuit 4200 in FIG. 42A. In an embodiment, the retoration circuit $4480_i$ is the restoration circuit 4205 in FIG. 42B.

Figure 45:
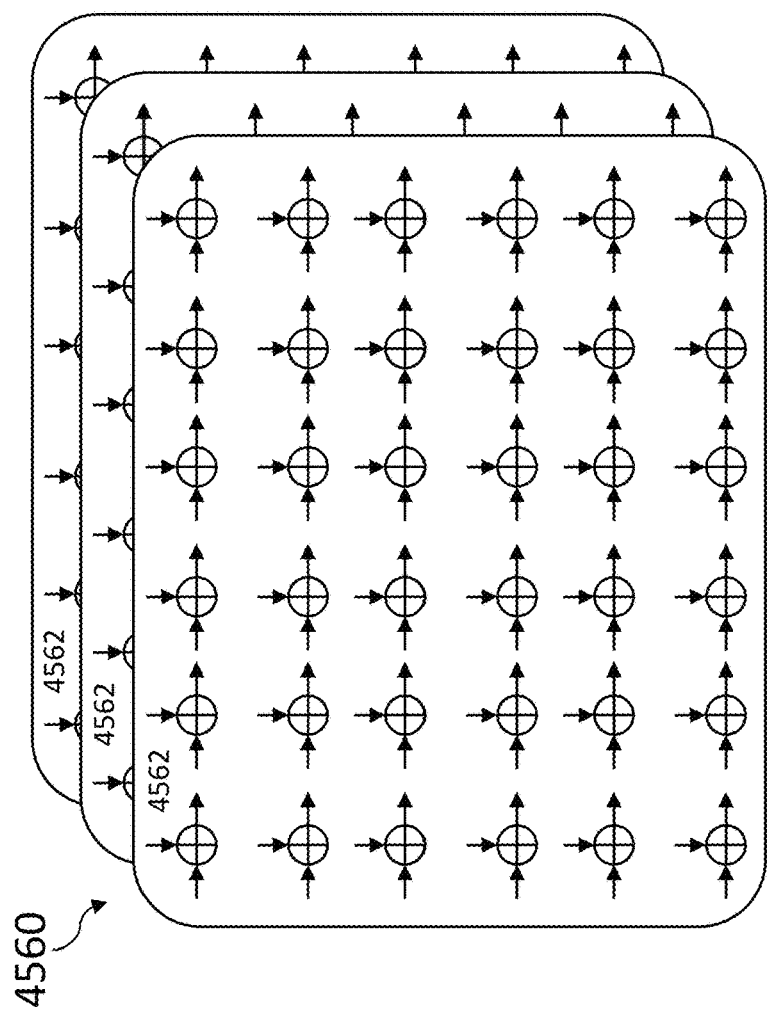
FIG. 45 is a schematic diagram of an embodiment of an element process engine.

FIG. 45 is a block diagram of an element processing engine 4560. In an embodiment, the element processing engine 4560 is the element processing engine 260 in FIG. 2. In this example, the element processing engine 4560 includes multiple 36-wide arrays 4562 that perform element-wise operations, such as add, subtract, multiply and divide. In this example, each array 4562 is a 6×6 array to match the size and shape of the APEs, which produce 6×6 outer products.

Figure 46:
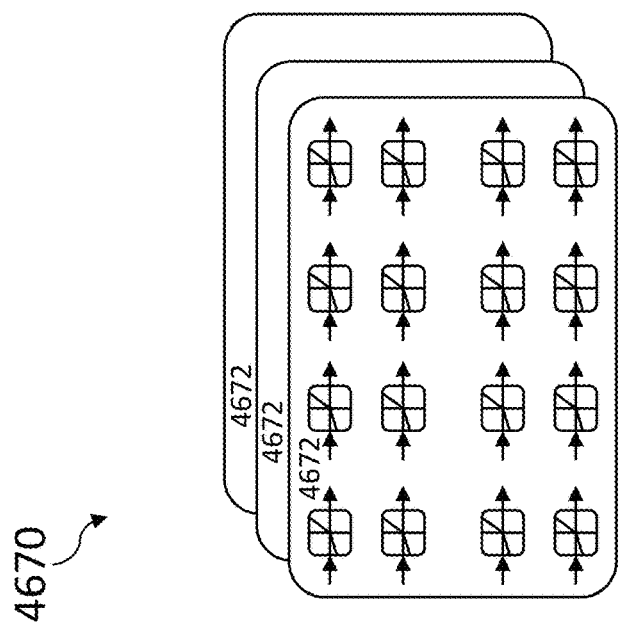
FIG. 46 is a schematic diagram of an embodiment of an activation engine.

FIG. 46 is a block diagram of an activation engine 4670. In an embodiment, the activation engine 4670 is the activation engine 270 in FIG. 2. In this example, the activation engine 4670 includes multiple 16-wide arrays 4672 that apply non-linear functions on a per-element basis.

Figure 48:
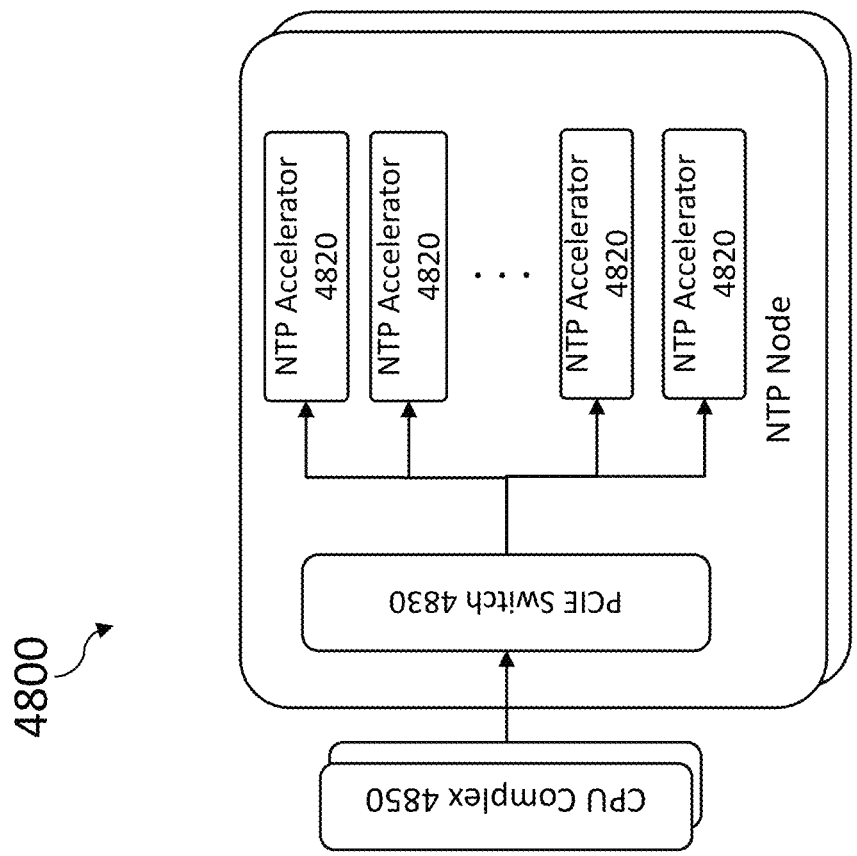
FIG. 48 is a schematic diagram illustrating native tensor processor clusters.
Figure 47:
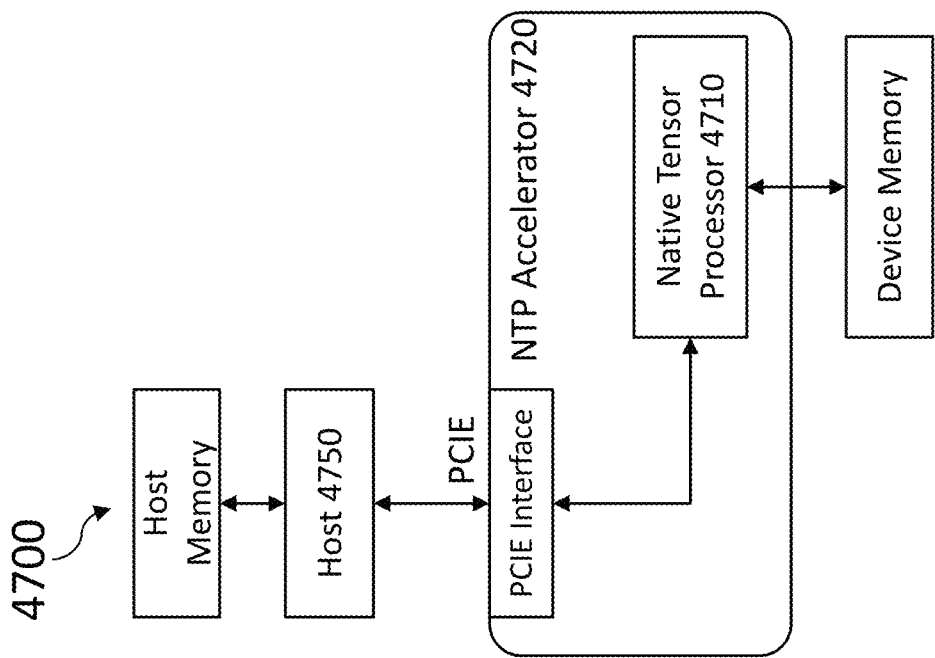
FIG. 47 is a schematic diagram of a native tensor processor used as an accelerator.

FIGS. 47-48 are examples of computer systems which includes both native tensor processors and conventional processors. FIG. 47 is a block diagram of a computer system in which the native tensor processor is used as an accelerator. The conventional processor is the host 4750, and the native tensor processor 4710 is used to accelerate tensor calculations under control of the host. Applications run on the host 4750, which identifies tensor contractions (or other tensor operations) to be executed and assigns these to the native tensor accelerator 4720 for execution. In the example of FIG. 47, the host 4750 and accelerator 4720 interface to each other using PCIExpress. They have separate memories, although they could also access a shared memory in alternate designs.

In FIG. 48, the native tensor subsystem includes multiple native tensor accelerators 4820. Both the conventional processors 4850 and the native tensor processors 4820 are organized into clusters or nodes connected by a PCIExpress switch 4830. The tensor processors can be configured and scaled according to requirements of the tensor contractions to be executed. For larger tensor operations, more tensor processors 4820 may be organized to provide more hardware capacity, as described above, or to provide redundancy against failure. The native tensor processors 4820 may also be shared by multiple processors 4850, thus increasing their overall utilization. The native tensor processors may be virtualized or made available to third parties as a cloud service.

In another application, multiple native tensor processors are connected to each other in a manner to provide native tensor supercomputer capability. The collective streaming architecture described above has many of the attributes of the collective communication approach to high performance computing.

Systems that include both tensor processors and other processors can take a variety of different forms and physical implementations. The native tensor subsystem can have one or more native tensor processors, and the processor subsystem can also have one or more processors. In order of increasing size, the conventional processors and native tensor processors could be implemented as different processors cores on a same integrated circuit, or as different die in a multi-chip module. Alternately, they may be implemented as separated integrated circuits on a printed circuit board. For larger systems, implementation might be blades or racks in a rack system, or implementation as part of a server farm.

Depending on the physical implementation, the communications between processors may also take different forms. Examples include dedicated communications channels, such as hardwired communication paths between different cores in an integrated circuit or by accessing common registers or memory locations. At the large end of the scale, examples include local area and other types of networks.

In an embodiment, there is provided a long bit-width multiplier for calculating a multiplication of a first fixed point number and a second fixed point number, the first fixed point number being associated with a pixel of an input feature map corresponding to one of a plurality of channels with respect to a layer of a neural network having a plurality of layers, and the second fixed point number being associated with a filter corresponding to the one of the plurality of channels with respect to the layer of the neural network, the long bit-width multiplier comprising: a first converter configured to convert the first fixed point number to a first sign, a first mantissa, and a first exponent, wherein at least one of a bit width of the first sign, a bit width of the first mantissa and a bit width of the first exponent is dynamically configured based on one or more factors selected from a group consisting of a first relative position of the layer in the neural network, a second relative position of the pixel in the input feature map, and the one of the plurality of channels; and a restoration circuit configured to calculate and output the multiplication of the first fixed point number and the second fixed point number based on the first sign, the first mantissa, the first exponent, and the second fixed point number.

In an embodiment, the bit width of the first mantissa, the bit width of the first exponent, and the bit width of the first fixed point number satisfy a following relationship: $E \geq E_{min} = \lfloor \log_W(I-S-M) \rfloor$, wherein E is a first integer representing the bit width of the first exponent, wherein $E_{min}$ is a second integer representing a minimal bit width of the first exponent, wherein W is a third integer representing a base number of the first fixed point number and B is no less than two, wherein I is a fourth integer representing the bit width of the first fixed point number, wherein M is a fifth integer representing the bit width of the first mantissa, wherein S is a sixth integer representing a bit width of the sign and S is no less than 1, and wherein $\lfloor \log_B(I-S-M) \rfloor$ is a nearest integer that a value of $\log_W(I-S-M)$ rounds up to. In an embodiment, both S and W are constant, where S=1, and W=2.

In an embodiment, the long bit-width multiplier further comprises a second converter configured to convert the second fixed point number to a second sign, a second mantissa, and a second exponent, the second exponent being different than the first exponent, the second mantissa being different than the first mantissa, and at least one of a bit width of the second sign, a bit width of the second mantissa, and a bit width of the second exponent being dynamically configured based on one or more factors selected from a group consisting of the first relative position of the layer in the neural network, a third relative position of a data point having a value of the second fixed point number in the filter, and the one of the plurality of channels.

In an embodiment, the bit width of the first mantissa is longer than that of a third mantissa converted from a third fixed point number associated with an earlier layer of the neural network with respect to the layer of the neural network, and wherein the bit width of the first mantissa is shorter than that of a fourth mantissa converted from a fourth fixed point number associated with a later layer of the neural network with respect the layer of the neural network.

In an embodiment, the bit width of the first mantissa is longer than that of a fifth mantissa converted from a fifth fixed point number associated with a second pixel of the input feature map that is farther than the pixel to a center of the input feature map, and wherein the bit width of the first mantissa is shorter than that of a sixth mantissa converted from a sixth fixed point number associated with a third pixel of the input feature map that is closer than the pixel to the center of the input feature map.

In an embodiment, the long bit-width multiplier further comprises: a short bit-width multiplier coupled to the first converter and the second converter, the short bit-width multiplier being configured to calculate a product of a first combination of the first sign and the first mantissa and a second combination of the second sign and the second mantissa; and an adder coupled to the first converter and the second converter, the adder being configured to calculate an addition of the first exponent and the second exponent, wherein the restoration circuit is coupled to the short bit-width multiplier and the adder, wherein the restoration circuit is configured to calculate the multiplication of the first fixed point number and the second fixed point number by left shifting the product of the first combination and the second combination by a first number of bits equal to the addition of the first exponent and the second exponent, and wherein the restoration circuit is a left shifter.

In an embodiment, the first converter comprises: a bit sampler configured to output the first sign by sampling a left most bit of the first fixed point number; an absolute value generator configured to generate an absolute value of the first fixed point number; a leading-1 detector coupled to the absolute value generator, the leading-1 detector configured to designate a left most non-zero bit of the absolute value of the first fixed point number as a leading-1 bit, and determine a position of the leading-1 bit in the absolute value of the first fixed point number; an exponent generator coupled to the absolute value generator and the leading-1 detector, the exponent generator configured to determine the first exponent and a mantissa of the absolute value of the first fixed point number; and a mantissa generator coupled to the bit sampler and the exponent generator, the mantissa generator configured to determine the first mantissa based on the mantissa of the absolute value of the first fixed point number and the first sign obtained from the bit sampler.

In an embodiment, the first converter further comprises a multiplexer coupled to the bit sampler and the mantissa generator, and wherein the multiplexer is configured to provide the first combination of the first sign and the first mantissa.

In an embodiment, the exponent generator is configured to determine a number of steps it takes until the leading-1 bit is among the lowest M bits of the absolute value of the first fixed point number with each step the absolute value of the first fixed point number right shifted by a second number of bits equal to a stride number, wherein the stride number is an integer no less than 1.

In an embodiment, the stride number depends on one or more factors selected from the group consisting of the first relative position of the layer in the neural network, the second relative position of the pixel in the input feature map, and the one of the plurality of channels, wherein the stride number is equal to 1 and $E=E_{min}$ when the long bit-width multiplier operates in a fine grain mode, wherein the stride number is greater than 1 and $E>E_{min}$ when the long bit-width multiplier operates in a coarse grain mode, and wherein the first exponent is represented by a representation number of bits less than $E_{min}$ when the long bit-width multiplier operates in the coarse grain mode, a mapping relationship between the first exponent and the representation number being stored in a memory.

In an embodiment, the exponent generator comprises a step-to-exponent convertor configured to generate the first exponent based on the number of steps, the stride number, and one or more look-up tables stored in the memory accessible by the exponent generator.

In an embodiment, the exponent generator is configured to: initiate a window covering lowest M bits of the absolute value of the first fixed point number; and determine a number of steps it takes until the leading-1 bit is included in the window with each step the window sliding to left a second number of bits equal to a stride number, wherein the stride number is an integer no less than 1, and the stride number depends on the one or more factors selected from the group consisting of the first relative position of the layer in the neural network, the second relative position of the pixel in the input feature map, and the one of the plurality of channels.

In an embodiment, the exponent generator is further configured to: generate the first exponent, wherein the first exponent is equal to a product of the number of steps and the stride number; and output M bits included in the window as the mantissa of the absolute value of the first fixed point number.

In an embodiment, the exponent generator comprises: a look-up table matcher configured to determine the first exponent based on one or more look-up tables stored in a memory, the position of the leading-1 bit and the absolute value of the first fixed point number; a right shifter coupled to the look-up table matcher, the right shifter configured to right shift the absolute value of the first fixed point number by a second number of bits equal to the first exponent; and a lowest M-bit selector coupled to the right shifter, the lowest M-bit selector configured to output the lowest M bits of the absolute value of the first fixed point number after right shifted as the mantissa of the absolute value of the first fixed point number.

In an embodiment, the long bit-width multiplier further comprising: a first short bit-width multiplier coupled to the first converter and the second converter, the short bit-width multiplier being configured to calculate a product of the first mantissa and the second mantissa; and an adder coupled to the first converter and the second converter, the adder being configured to calculate an addition of the first exponent and the second exponent, wherein the restoration circuit is coupled to the short bit-width multiplier and the adder, wherein the restoration circuit is configured to calculate the multiplication of the first fixed point number and the second fixed point number based on the first sign, the second sign, the product of the first mantissa and the second mantissa, and the addition of the first exponent and the second exponent.

In an embodiment, the first converter comprises: a bit sampler configured to output the first sign by sampling a left most bit of the first fixed point number; an absolute value generator configured to generate an absolute value of the first fixed point number; a leading-1 detector coupled to the absolute value generator, the leading-1 detector configured to designate a left most non-zero bit of the absolute value of the first fixed point number as a leading-1 bit, and determine a position of the leading-1 bit in the absolute value of the first fixed point number; and an exponent generator coupled to the absolute value generator and the leading-1 detector, the exponent generator configured to determine the first exponent and the first mantissa, wherein the first mantissa is a mantissa of the absolute value of the first fixed point number.

In an embodiment, the restoration circuit comprising an XOR gate configured to provide an XOR bit based on the first sign and the second sign, wherein the XOR bit is 1 when the first sign is different than the second sign, and the XOR bit is 0 when the first sign is not different than the second sign.

In an embodiment, the restoration circuit further comprising a conditional selector coupled to the XOR gate, wherein the condition selector is configured to output a sign value based on the XOR bit, and wherein the sign value is equal to 1 when the XOR bit is 0, and the sign value is equal to −1 when the XOR bit is 1.

In an embodiment, the restoration circuit further comprising a second short bit-width multiplier coupled to the first short bit-width multiplier and the conditional selector, wherein the second short bit-width multiplier is configured to output a multiplication of the sign value and the product of the first mantissa and the second mantissa.

In an embodiment, the restoration circuit further comprises a left shifter coupled to the second short bit-width multiplier and the adder, wherein the left shifter is configured to calculate and output the multiplication of the first fixed point number and the second fixed point number by left shifting the multiplication of the sign value and the product of the first mantissa and the second mantissa by a number of bits equal to the addition of the first exponent and the second exponent.

Figure 49:
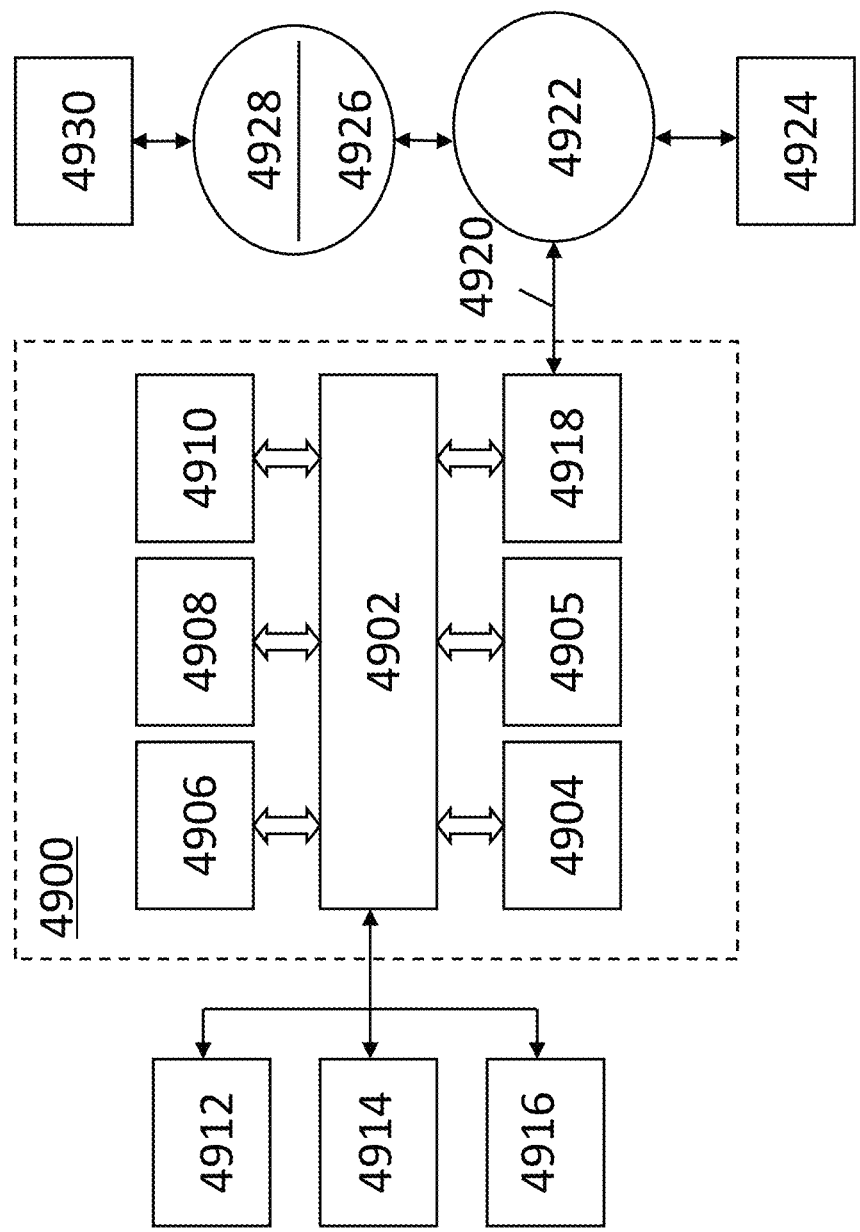
FIG. 49 is a schematic diagram of a generic computer architecture on which the disclosure can be implemented.

Referring to FIG. 49, a computer system 4900 is shown. In an embodiment, the computer system 4900 is the host 4750. In an embodiment, the computer system 4900 is a computing system including the native tensor processor 4710. The computer system 4900 includes a bus 4902 or other communication mechanism to communicate information, and a processor 4904 (or multiple processors 4904 and 4905) coupled with bus 4902 to process information. In an embodiment, the processor 4904 is the native tensor processor 4710. In an embodiment, the computer system 4900 includes a main memory 4906, such as a random access memory (RAM) or other dynamic storage device, coupled to the bus 4902 to store information and instructions to be executed by the processor 4904. The main memory 4906 may be used to store temporary variables or other intermediate information during execution of instructions to be executed by the processor 4904. In an embodiment, the computer system 4900 includes a read only memory (ROM) 4908 or other static storage device coupled to the bus 4902 to store essentially static information and instructions for the processor 4904. In an embodiment, a storage device 4910, such as a solid state drive, magnetic disk or optical disk, is provided and coupled to the bus 4902 to store information and instructions.

The computer system 4900 may be coupled via the bus 4902 to a display 4912, such as a cathode ray tube (CRT) or flat panel or touch panel display, to display information to a computer user. In an embodiment, an input device 4914, including or providing alphanumeric and other keys, is coupled to the bus 4902 to communicate information and command selections to the processor 4904. Another type of user input device is a cursor control 4916, such as a mouse, a trackball, or cursor direction keys, to communicate direction information and command selections to the processor 4904 and to control cursor movement on the display 4912. A touch panel (screen) display may also be used as an input device.

The computer system 4900 may be suitable to implement methods as described herein in response to the processor 4904 executing one or more sequences of one or more instructions contained in, e.g., the main memory 4906. Such instructions may be read into main memory 4906 from another computer-readable medium, such as the storage device 4910. In an embodiment, execution of sequences of instructions contained in the main memory 4906 causes the processor 4904 to perform process steps described herein. One or more processors in a multi-processing arrangement may be employed to execute the sequences of instructions contained in the main memory 4906. In an embodiment, a hard-wired circuitry may be used in place of or in combination with software instructions. Thus, embodiments are not limited to any specific combination of hardware circuitry and software.

The term "computer-readable medium" as used herein refers to any medium that participates in providing instructions to the processor 4904 for execution. Such a medium may take many forms, including but not limited to, non-volatile media, volatile media, and transmission media. Non-volatile media include, for example, solid state, optical or magnetic disks, such as the storage device 4910. Volatile media include dynamic memory, such as the main memory 4906. Non-volatile and volatile media are considered non-transitory. Non-transitory transmission media include coaxial cables, copper wire and fiber optics, including the wires that comprise the bus 4902. Transmission media can also take the form of acoustic or light waves, such as those generated during RF and infrared (IR) data communications. Common forms of computer-readable media include, for example, a floppy disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, a solid state disk or any other memory chip or cartridge, a carrier wave as described herein, or any other medium from which a computer can read.

Various forms of computer readable media may be involved in carrying one or more sequences of one or more instructions to the processor 4904 for execution. For example, the instructions may initially be borne on a magnetic disk of a remote computer. The remote computer can load the instructions into its dynamic memory and send the instructions over communications medium (e.g., by line or wireless). The computer system 4900 can receive the transmitted data and place the data on the bus 4902. The bus 4902 carries the data to the main memory 4906, from which the processor 4904 retrieves and executes the instructions. The instructions received by the main memory 4906 may optionally be stored on the storage device 4910 either before or after execution by the processor 4904.

The computer system 4900 may also include a communication interface 4918 coupled to the bus 4902. The communication interface 4918 provides a two-way data communication coupling to a network link 4920 that is connected to a local network 4922. For example, the communication interface 4918 may be an integrated services digital network (ISDN) card or a modem to provide a data communication connection to a corresponding type of line. As another example, the communication interface 4918 may be a local area network (LAN) card to provide a data communication connection to a compatible LAN. Wireless links may also be implemented. In any such implementation, the communication interface 4918 sends and receives electrical, electromagnetic or optical signals that carry digital data streams representing various types of information.

The network link 4920 typically provides data communication through one or more networks to other data devices. For example, the network link 4920 may provide a connection through the local network 4922 to a host computer 4924 or to data equipment operated by an Internet Service Provider (ISP) 4926. The ISP 4926 in turn provides data communication services through the worldwide packet data communication network, commonly referred to as the internet 4928. The local network 4922 and the internet 4928 both use electrical, electromagnetic or optical signals that carry digital data streams. The signals through the various networks and the signals on the network link 4920 and through the communication interface 4918, which carry the digital data to and from the computer system 4900, are exemplary forms of carrier waves transporting the information.

The computer system 4900 can send messages and receive data, including program code, through the network(s), the network link 4920, and the communication interface 4918. In the internet example, a server 4930 might transmit a requested code for an application program through the internet 4928, the ISP 4926, the local network 4922 and the communication interface 4918. In accordance with one or more embodiments, one such downloaded application implements a method as described herein. The received code may be executed by the processor 4904 as it is received, and/or stored in the storage device 4910, or other non-volatile storage for later execution. In this manner, the computer system 4900 may obtain application code. In an embodiment, the communication interface 4918 is the user interfaces 807, 4007.

An embodiment may take the form of a computer program containing one or more sequences of machine-readable instructions describing a method as disclosed herein, or a data storage medium (e.g. semiconductor memory, magnetic or optical disk) having such a computer program stored therein. Further, the machine readable instruction may be embodied in two or more computer programs. The two or more computer programs may be stored on one or more different memories and/or data storage media.

Any controllers described herein may each or in combination be operable when the one or more computer programs are read by one or more computer processors located within at least one component of the optical vector analyzer. The controllers may each or in combination have any suitable configuration for receiving, processing, and sending signals. One or more processors are configured to communicate with the at least one of the controllers. For example, each controller may include one or more processors for executing the computer programs that include machine-readable instructions for the methods described above. The controllers may include data storage medium for storing such computer programs, and/or hardware to receive such medium. So the controller(s) may operate according the machine readable instructions of one or more computer programs.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A long bit-width multiplier for calculating a multiplication of a first fixed point number and a second fixed point number, the first fixed point number being associated with a pixel of an input feature map corresponding to one of a plurality of channels with respect to a layer of a neural network having a plurality of layers, and the second fixed point number being associated with a filter corresponding to the one of the plurality of channels with respect to the layer of the neural network, the long bit-width multiplier comprising:

a first converter configured to convert the first fixed point number to a first sign, a first mantissa, and a first exponent, wherein at least one of a bit width of the first sign, a bit width of the first mantissa and a bit width of the first exponent is dynamically configured based on one or more factors selected from a group consisting of a first relative position of the layer in the neural network, a second relative position of the pixel in the input feature map, and the one of the plurality of channels; and a restoration circuit configured to calculate and output the multiplication of the first fixed point number and the second fixed point number based on the first sign, the first mantissa, the first exponent, and the second fixed point number.

2. The long bit-width multiplier of claim 1, wherein the bit width of the first mantissa, the bit width of the first exponent, and the bit width of the first fixed point number satisfy a following relationship:

$$E \geq E_{min} = \lfloor \log_W(I-S-M) \rfloor,$$

wherein E is a first integer representing the bit width of the first exponent, wherein $E_{min}$ is a second integer representing a minimal bit width of the first exponent, wherein W is a third integer representing a base number of the first fixed point number and B is no less than two, wherein I is a fourth integer representing the bit width of the first fixed point number, wherein M is a fifth integer representing the bit width of the first mantissa, wherein S is a sixth integer representing a bit width of the sign and S is no less than 1, and wherein $\lfloor \log_B (I-S-M) \rfloor$ is a nearest integer that a value of $\log_B(I-S-M)$ rounds up to.

3. The long bit-width multiplier of claim 2, wherein the long bit-width multiplier further comprises a second converter configured to convert the second fixed point number to a second sign, a second mantissa, and a second exponent, the second exponent being different than the first exponent, the second mantissa being different than the first mantissa, and at least one of a bit width of the second sign, a bit width of the second mantissa, and a bit width of the second exponent being dynamically configured based on one or more factors selected from a group consisting of the first relative position of the layer in the neural network, a third relative position of a data point having a value of the second fixed point number in the filter, and the one of the plurality of channels.

4. The long bit-width multiplier of claim 3, wherein the bit width of the first mantissa is longer than that of a third mantissa converted from a third fixed point number associated with an earlier layer of the neural network with respect to the layer of the neural network, and wherein the bit width of the first mantissa is shorter than that of a fourth mantissa converted from a fourth fixed point number associated with a later layer of the neural network with respect the layer of the neural network.

5. The long bit-width multiplier of claim 4, wherein the bit width of the first mantissa is longer than that of a fifth mantissa converted from a fifth fixed point number associated with a second pixel of the input feature map that is farther than the pixel to a center of the input feature map, and wherein the bit width of the first mantissa is shorter than that of a sixth mantissa converted from a sixth fixed point number associated with a third pixel of the input feature map that is closer than the pixel to the center of the input feature map.

6. The long bit-width multiplier of claim 5, further comprising:
a short bit-width multiplier coupled to the first converter and the second converter, the short bit-width multiplier being configured to calculate a product of a first combination of the first sign and the first mantissa and a second combination of the second sign and the second mantissa; and
an adder coupled to the first converter and the second converter, the adder being configured to calculate an addition of the first exponent and the second exponent,
wherein the restoration circuit is coupled to the short bit-width multiplier and the adder, wherein the restoration circuit is configured to calculate the multiplication of the first fixed point number and the second fixed point number by left shifting the product of the first combination and the second combination by a first number of bits equal to the addition of the first exponent and the second exponent, and wherein the restoration circuit is a left shifter.

7. The long bit-width multiplier of claim 6, wherein the first converter comprises:
a bit sampler configured to output the first sign by sampling a left most bit of the first fixed point number;
an absolute value generator configured to generate an absolute value of the first fixed point number;
a leading-1 detector coupled to the absolute value generator, the leading-1 detector configured to designate a left most non-zero bit of the absolute value of the first fixed point number as a leading-1 bit, and determine a position of the leading-1 bit in the absolute value of the first fixed point number;
an exponent generator coupled to the absolute value generator and the leading-1 detector, the exponent generator configured to determine the first exponent and a mantissa of the absolute value of the first fixed point number; and
a mantissa generator coupled to the bit sampler and the exponent generator, the mantissa generator configured to determine the first mantissa based on the mantissa of the absolute value of the first fixed point number and the first sign obtained from the bit sampler.

8. The long bit-width multiplier of claim 7, wherein the first converter further comprises a multiplexer coupled to the bit sampler and the mantissa generator, and wherein the multiplexer is configured to provide the first combination of the first sign and the first mantissa.

9. The long bit-width multiplier of claim 8, wherein the exponent generator is configured to determine a number of steps it takes until the leading-1 bit is among the lowest M bits of the absolute value of the first fixed point number with each step the absolute value of the first fixed point number right shifted by a second number of bits equal to a stride number, wherein the stride number is an integer no less than 1.

10. The long bit-width multiplier of claim 9, wherein the stride number depends on one or more factors selected from the group consisting of the first relative position of the layer in the neural network, the second relative position of the pixel in the input feature map, and the one of the plurality of channels, wherein the stride number is equal to 1 and $E=E_{min}$ when the long bit-width multiplier operates in a fine grain mode, wherein the stride number is greater than 1 and $E>E_{min}$ when the long bit-width multiplier operates in a coarse grain mode, and wherein the first exponent is represented by a representation number of bits less than $E_{min}$ when the long bit-width multiplier operates in the coarse grain mode, a mapping relationship between the first exponent and the representation number being stored in a memory.

11. The long bit-width multiplier of claim 10, wherein the exponent generator comprises a step-to-exponent convertor configured to generate the first exponent based on the number of steps, the stride number, and one or more look-up tables stored in the memory accessible by the exponent generator.

12. The long bit-width multiplier of claim 8, wherein the exponent generator is configured to:
initiate a window covering lowest M bits of the absolute value of the first fixed point number; and
determine a number of steps it takes until the leading-1 bit is included in the window with each step the window sliding to left a second number of bits equal to a stride number,
wherein the stride number is an integer no less than 1, and the stride number depends on the one or more factors selected from the group consisting of the first relative position of the layer in the neural network, the second relative position of the pixel in the input feature map, and the one of the plurality of channels.

13. The long bit-width multiplier of claim 12, wherein the exponent generator is further configured to:
generate the first exponent, wherein the first exponent is equal to a product of the number of steps and the stride number; and
output M bits included in the window as the mantissa of the absolute value of the first fixed point number.

14. The long bit-width multiplier of claim 8, wherein the exponent generator comprises:
a look-up table matcher configured to determine the first exponent based on one or more look-up tables stored in a memory, the position of the leading-1 bit and the absolute value of the first fixed point number;
a right shifter coupled to the look-up table matcher, the right shifter configured to right shift the absolute value of the first fixed point number by a second number of bits equal to the first exponent; and
a lowest M-bit selector coupled to the right shifter, the lowest M-bit selector configured to output the lowest M bits of the absolute value of the first fixed point number after right shifted as the mantissa of the absolute value of the first fixed point number.

15. The long bit-width multiplier of claim 5, further comprising:
a first short bit-width multiplier coupled to the first converter and the second converter, the short bit-width multiplier being configured to calculate a product of the first mantissa and the second mantissa; and
an adder coupled to the first converter and the second converter, the adder being configured to calculate an addition of the first exponent and the second exponent,
wherein the restoration circuit is coupled to the short bit-width multiplier and the adder, wherein the restoration circuit is configured to calculate the multiplication of the first fixed point number and the second fixed point number based on the first sign, the second sign, the product of the first mantissa and the second mantissa, and the addition of the first exponent and the second exponent.

16. The long bit-width multiplier of claim 15, wherein the first converter comprises:
a bit sampler configured to output the first sign by sampling a left most bit of the first fixed point number;

an absolute value generator configured to generate an absolute value of the first fixed point number;

a leading-1 detector coupled to the absolute value generator, the leading-1 detector configured to designate a left most non-zero bit of the absolute value of the first fixed point number as a leading-1 bit, and determine a position of the leading-1 bit in the absolute value of the first fixed point number; and an exponent generator coupled to the absolute value generator and the leading-1 detector, the exponent generator configured to determine the first exponent and the first mantissa, wherein the first mantissa is a mantissa of the absolute value of the first fixed point number.

17. The long bit-width multiplier of claim 16, the restoration circuit comprising an XOR gate configured to provide an XOR bit based on the first sign and the second sign, wherein the XOR bit is 1 when the first sign is different than the second sign, and the XOR bit is 0 when the first sign is not different than the second sign.

18. The long bit-width multiplier of claim 17, the restoration circuit further comprising a conditional selector coupled to the XOR gate, wherein the condition selector is configured to output a sign value based on the XOR bit, and wherein the sign value is equal to 1 when the XOR bit is 0, and the sign value is equal to −1 when the XOR bit is 1.

19. The long bit-width multiplier of claim 18, the restoration circuit further comprising a second short bit-width multiplier coupled to the first short bit-width multiplier and the conditional selector, wherein the second short bit-width multiplier is configured to output a multiplication of the sign value and the product of the first mantissa and the second mantissa.

20. The long bit-width multiplier of claim 19, the restoration circuit further comprising a left shifter coupled to the second short bit-width multiplier and the adder, wherein the left shifter is configured to calculate and output the multiplication of the first fixed point number and the second fixed point number by left shifting the multiplication of the sign value and the product of the first mantissa and the second mantissa by a number of bits equal to the addition of the first exponent and the second exponent.

* * * * *